US009245407B2

(12) United States Patent
Saunders et al.

(10) Patent No.: US 9,245,407 B2
(45) Date of Patent: Jan. 26, 2016

(54) GAMING SYSTEM AND METHOD THAT DETERMINES AWARDS BASED ON QUANTITIES OF SYMBOLS INCLUDED IN ONE OR MORE STRINGS OF RELATED SYMBOLS DISPLAYED ALONG ONE OR MORE PAYLINES

(75) Inventors: Brian F. Saunders, Sunnyvale, CA (US); Scott A. Caputo, Santa Clara, CA (US)

(73) Assignee: IGT, Las Vegas, NV (US)

(*) Notice: Subject to any disclaimer, the term of this patent is extended or adjusted under 35 U.S.C. 154(b) by 598 days.

(21) Appl. No.: 13/543,148

(22) Filed: Jul. 6, 2012

(65) Prior Publication Data

US 2014/0011569 A1 Jan. 9, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ................ *G07F 17/32* (2013.01); *G07F 17/34* (2013.01); *G07F 17/3258* (2013.01)

(58) Field of Classification Search
CPC ............................................ G07F 17/32–17/34
See application file for complete search history.

(56) References Cited

U.S. PATENT DOCUMENTS

| | | | |
|---|---|---|---|
| 3,831,172 | A | 8/1974 | Olliges et al. |
| 4,198,052 | A | 4/1980 | Gauselmann |
| 4,300,225 | A | 11/1981 | Lambl |
| 4,314,236 | A | 2/1982 | Mayer et al. |
| 4,339,798 | A | 7/1982 | Hedges et al. |
| 4,344,345 | A | 8/1982 | Sano |
| 4,363,482 | A | 12/1982 | Goldfarb |
| RE31,441 | E | 11/1983 | Nutting et al. |

(Continued)

FOREIGN PATENT DOCUMENTS

| | | |
|---|---|---|
| EP | 0 060 019 | 9/1982 |
| EP | 0 238 289 A3 | 9/1987 |

(Continued)

OTHER PUBLICATIONS

Mattel Games, Uno (2001) ("Uno Rules").*

(Continued)

*Primary Examiner* — Milap Shah
*Assistant Examiner* — Jason Pinheiro
(74) *Attorney, Agent, or Firm* — Neal, Gerber & Eisenberg LLP

(57) ABSTRACT

Various embodiments of the present disclosure are directed to a gaming system and method for determining one or more awards based on quantities of symbols included in one or more strings of related symbols. The gaming system is configured to operate a game associated with a plurality of symbols each associated with one of a plurality of first characteristics and one of a plurality of second characteristics. The gaming system displays a plurality of the symbols. The gaming system determines whether a set of the symbols displayed along a payline path associated with a payline forms a string of related symbols. Symbols are related if the symbols share at least one of: (a) a same one of the set of first characteristics, and (b) a same one of the set of second characteristics. The gaming system determines any award based on a length of the string of related symbols.

35 Claims, 27 Drawing Sheets

(56) References Cited

U.S. PATENT DOCUMENTS

| | | | |
|---|---|---|---|
| 4,448,419 | A | 5/1984 | Telnaes |
| 4,496,149 | A | 1/1985 | Schwartzberg |
| 4,508,353 | A | 4/1985 | Meyer et al. |
| 4,582,324 | A | 4/1986 | Koza et al. |
| 4,618,150 | A | 10/1986 | Kimura |
| 4,624,459 | A | 11/1986 | Kaufman |
| 4,660,107 | A | 4/1987 | Chippendale, Jr. |
| 4,695,053 | A | 9/1987 | Vazquez, Jr. et al. |
| 4,712,189 | A | 12/1987 | Mohri |
| 4,732,386 | A | 3/1988 | Rayfiel |
| 4,733,593 | A | 3/1988 | Rothbart |
| 4,756,531 | A | 7/1988 | DiRe et al. |
| 4,775,155 | A | 10/1988 | Lees |
| 4,791,558 | A | 12/1988 | Chaitin et al. |
| 4,826,169 | A | 5/1989 | Bessho et al. |
| 4,836,546 | A | 6/1989 | Dire et al. |
| 4,838,552 | A | 6/1989 | Hagiwara |
| 4,874,173 | A | 10/1989 | Kishishita |
| 4,876,937 | A | 10/1989 | Suzuki |
| 4,961,575 | A | 10/1990 | Perry |
| 4,974,483 | A | 12/1990 | Luzzatto |
| 4,974,857 | A | 12/1990 | Beall et al. |
| 4,991,848 | A | 2/1991 | Greenwood et al. |
| 5,019,973 | A | 5/1991 | Wilcox et al. |
| 5,046,735 | A | 9/1991 | Hamano et al. |
| 5,072,946 | A | 12/1991 | Miller |
| 5,085,436 | A | 2/1992 | Bennett |
| 5,096,195 | A | 3/1992 | Gimmon |
| 5,102,134 | A | 4/1992 | Smyth |
| 5,102,137 | A | 4/1992 | Ekiert |
| 5,119,465 | A | 6/1992 | Jack |
| 5,179,517 | A | 1/1993 | Sarbin et al. |
| 5,205,555 | A | 4/1993 | Hamano |
| 5,209,479 | A | 5/1993 | Nagao et al. |
| 5,221,801 | A | 6/1993 | Bruti et al. |
| 5,223,828 | A | 6/1993 | McKiel, Jr. |
| 5,242,163 | A | 9/1993 | Fulton |
| 5,258,574 | A | 11/1993 | Kawano |
| 5,266,736 | A | 11/1993 | Saito |
| 5,275,400 | A | 1/1994 | Weingardt et al. |
| 5,287,102 | A | 2/1994 | McKiel, Jr. |
| 5,308,065 | A | 5/1994 | Bridgeman et al. |
| 5,324,041 | A | 6/1994 | Boylan et al. |
| 5,331,112 | A | 7/1994 | Sato et al. |
| 5,332,228 | A | 7/1994 | Schultz |
| 5,342,047 | A | 8/1994 | Heidel et al. |
| 5,344,144 | A | 9/1994 | Canon |
| 5,371,345 | A | 12/1994 | LeStrange et al. |
| 5,390,938 | A | 2/1995 | Takeya |
| 5,393,061 | A | 2/1995 | Manship et al. |
| 5,393,070 | A | 2/1995 | Best |
| 5,395,111 | A | 3/1995 | Inoue |
| 5,413,342 | A | 5/1995 | Kaplan |
| 5,423,539 | A | 6/1995 | Nagao |
| 5,429,507 | A | 7/1995 | Kaplan |
| 5,430,835 | A | 7/1995 | Williams et al. |
| 5,431,408 | A | 7/1995 | Adams |
| 5,446,902 | A | 8/1995 | Islam |
| 5,449,173 | A | 9/1995 | Thomas et al. |
| 5,469,511 | A | 11/1995 | Lewis et al. |
| 5,470,233 | A | 11/1995 | Fruchterman et al. |
| 5,472,197 | A | 12/1995 | Gwiasda et al. |
| 5,508,699 | A | 4/1996 | Silverman |
| 5,511,781 | A | 4/1996 | Wood et al. |
| 5,515,764 | A | 5/1996 | Rosen |
| 5,531,441 | A | 7/1996 | Dabrowski et al. |
| 5,536,016 | A | 7/1996 | Thompson |
| 5,542,669 | A | 8/1996 | Charron et al. |
| 5,560,603 | A | 10/1996 | Seelig et al. |
| 5,569,084 | A | 10/1996 | Nicastro et al. |
| 5,577,253 | A | 11/1996 | Blickstein |
| 5,580,053 | A | 12/1996 | Crouch |
| 5,580,055 | A | 12/1996 | Hagiwara |
| 5,584,764 | A | 12/1996 | Inoue |
| 5,606,144 | A | 2/1997 | Dabby |
| 5,607,162 | A | 3/1997 | Boylan et al. |
| 5,609,524 | A | 3/1997 | Inoue |
| 5,611,535 | A | 3/1997 | Tiberio |
| 5,625,845 | A | 4/1997 | Allran |
| 5,668,996 | A | 9/1997 | Radinsky |
| 5,695,188 | A | 12/1997 | Ishibashi |
| 5,697,843 | A | 12/1997 | Manship et al. |
| 5,703,310 | A | 12/1997 | Kurakake et al. |
| 5,704,835 | A | 1/1998 | Dietz, II |
| 5,707,286 | A | 1/1998 | Carlson |
| 5,715,459 | A | 2/1998 | Celi |
| 5,722,891 | A | 3/1998 | Inoue |
| 5,745,761 | A | 4/1998 | Celi |
| 5,745,762 | A | 4/1998 | Celi |
| 5,752,881 | A | 5/1998 | Inoue |
| 5,758,875 | A | 6/1998 | Giacalone, Jr. |
| 5,762,552 | A | 6/1998 | Vuong et al. |
| 5,766,074 | A | 6/1998 | Cannon et al. |
| 5,769,716 | A | 6/1998 | Saffari et al. |
| 5,772,509 | A | 6/1998 | Weiss |
| 5,775,692 | A | 7/1998 | Watts et al. |
| 5,778,231 | A | 7/1998 | Van Hoff |
| 5,788,573 | A | 8/1998 | Baerlocher et al. |
| 5,792,972 | A | 8/1998 | Houston |
| 5,802,364 | A | 9/1998 | Senator |
| 5,807,172 | A | 9/1998 | Piechowiak |
| 5,809,303 | A | 9/1998 | Senator |
| 5,810,361 | A | 9/1998 | Kadlic |
| 5,823,873 | A | 10/1998 | Moody |
| 5,823,874 | A | 10/1998 | Adams |
| 5,833,536 | A | 11/1998 | Davids et al. |
| 5,833,537 | A | 11/1998 | Barrie |
| 5,833,538 | A | 11/1998 | Weiss |
| 5,839,958 | A | 11/1998 | Ozarow |
| 5,848,932 | A | 12/1998 | Adams |
| 5,851,148 | A | 12/1998 | Brune et al. |
| 5,854,927 | A | 12/1998 | Gelissen |
| 5,868,619 | A | 2/1999 | Wood et al. |
| 5,876,284 | A | 3/1999 | Acres et al. |
| 5,880,386 | A | 3/1999 | Wachi et al. |
| 5,882,261 | A | 3/1999 | Adams |
| 5,889,990 | A | 3/1999 | Coleman |
| 5,890,962 | A | 4/1999 | Takemoto |
| 5,892,171 | A | 4/1999 | Ide |
| 5,902,184 | A | 5/1999 | Bennett et al. |
| 5,908,354 | A | 6/1999 | Okuniewicz |
| 5,910,048 | A | 6/1999 | Feinberg |
| 5,911,071 | A | 6/1999 | Jordan |
| 5,911,418 | A | 6/1999 | Adams |
| 5,919,088 | A | 7/1999 | Weiss |
| 5,919,091 | A | 7/1999 | Bell et al. |
| 5,920,720 | A | 7/1999 | Toutonghi |
| 5,920,842 | A | 7/1999 | Cooper et al. |
| 5,923,878 | A | 7/1999 | Marsland |
| 5,923,880 | A | 7/1999 | Rose |
| 5,927,714 | A | 7/1999 | Kaplan |
| 5,930,509 | A | 7/1999 | Yates |
| 5,935,002 | A | 8/1999 | Falciglia |
| 5,937,193 | A | 8/1999 | Evoy |
| 5,944,314 | A | 8/1999 | Stavinsky |
| 5,946,487 | A | 8/1999 | Dangelo |
| 5,946,489 | A | 8/1999 | Yellin |
| 5,947,820 | A | 9/1999 | Morro et al. |
| 5,951,397 | A | 9/1999 | Dickinson |
| 5,964,843 | A | 10/1999 | Eisler |
| 5,966,535 | A | 10/1999 | Benedikt |
| 5,967,894 | A | 10/1999 | Kinoshita et al. |
| 5,970,249 | A | 10/1999 | Holzle |
| 5,976,016 | A | 11/1999 | Moody et al. |
| 5,978,585 | A | 11/1999 | Crelier |
| 5,980,384 | A | 11/1999 | Barrie |
| 5,984,781 | A | 11/1999 | Sunaga |
| 5,984,782 | A | 11/1999 | Inoue |
| 5,988,643 | A | 11/1999 | Awada |
| 5,989,121 | A | 11/1999 | Sakamoto |
| 5,996,997 | A | 12/1999 | Kamille |
| 5,997,400 | A | 12/1999 | Seelig et al. |
| 5,997,401 | A | 12/1999 | Crawford |
| 5,999,731 | A | 12/1999 | Yellin |

(56) References Cited

U.S. PATENT DOCUMENTS

| | | | |
|---|---|---|---|
| 6,003,038 | A | 12/1999 | Chen |
| 6,004,207 | A | 12/1999 | Wilson, Jr. et al. |
| 6,004,208 | A | 12/1999 | Takemoto et al. |
| 6,015,346 | A | 1/2000 | Bennett |
| D421,277 | S | 2/2000 | McGahn et al. |
| 6,021,272 | A | 2/2000 | Cahill |
| 6,021,273 | A | 2/2000 | Griesemer |
| 6,026,238 | A | 2/2000 | Bond |
| 6,027,115 | A | 2/2000 | Griswold et al. |
| 6,029,000 | A | 2/2000 | Woolsey |
| 6,031,993 | A | 2/2000 | Andrews |
| 6,033,307 | A | 3/2000 | Vancura |
| 6,035,120 | A | 3/2000 | Ravichandran |
| 6,052,527 | A | 4/2000 | Delcourt et al. |
| 6,056,642 | A | 5/2000 | Bennett |
| 6,059,289 | A | 5/2000 | Vancura |
| 6,059,658 | A | 5/2000 | Mangano et al. |
| 6,062,979 | A | 5/2000 | Inoue |
| 6,062,980 | A | 5/2000 | Luciano |
| 6,066,181 | A | 5/2000 | DeMaster |
| 6,071,192 | A | 6/2000 | Weiss |
| 6,074,432 | A | 6/2000 | Guccione |
| 6,075,940 | A | 6/2000 | Gosling |
| 6,084,169 | A | 7/2000 | Hasegawa et al. |
| 6,089,976 | A | 7/2000 | Schneider et al. |
| 6,089,977 | A | 7/2000 | Bennett |
| 6,089,978 | A | 7/2000 | Adams |
| 6,092,147 | A | 7/2000 | Levy |
| 6,093,102 | A | 7/2000 | Bennett |
| 6,095,921 | A | 8/2000 | Walker et al. |
| 6,096,095 | A | 8/2000 | Halstead |
| 6,102,400 | A | 8/2000 | Scott et al. |
| 6,102,798 | A | 8/2000 | Bennett |
| 6,103,964 | A | 8/2000 | Kay |
| 6,105,962 | A | 8/2000 | Malavazos et al. |
| 6,106,393 | A | 8/2000 | Sunaga et al. |
| 6,110,041 | A | 8/2000 | Walker et al. |
| 6,110,043 | A | 8/2000 | Olsen |
| 6,110,226 | A | 8/2000 | Bothner |
| 6,113,098 | A | 9/2000 | Adams |
| 6,113,495 | A | 9/2000 | Walker |
| 6,117,009 | A | 9/2000 | Yoseloff |
| 6,120,031 | A | 9/2000 | Adams |
| 6,120,377 | A | 9/2000 | McGinnis, Sr. et al. |
| 6,120,378 | A | 9/2000 | Moody |
| 6,123,333 | A | 9/2000 | McGinnis, Sr. et al. |
| 6,126,165 | A | 10/2000 | Sakamoto |
| 6,126,542 | A | 10/2000 | Fier |
| 6,129,355 | A | 10/2000 | Hahn et al. |
| 6,131,191 | A | 10/2000 | Cierniak |
| 6,138,273 | A | 10/2000 | Sturges |
| 6,141,794 | A | 10/2000 | Dice |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,146,276 | A | 11/2000 | Okuniewicz |
| 6,149,521 | A | 11/2000 | Sanduski |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,164,652 | A | 12/2000 | Lauretta et al. |
| 6,165,070 | A | 12/2000 | Nolte et al. |
| 6,168,520 | B1 | 1/2001 | Baerlocher et al. |
| 6,173,955 | B1 | 1/2001 | Perrie et al. |
| 6,174,233 | B1 | 1/2001 | Sunaga et al. |
| 6,174,234 | B1 | 1/2001 | Seibert, Jr. et al. |
| 6,174,235 | B1 | 1/2001 | Walker et al. |
| 6,175,632 | B1 | 1/2001 | Marx |
| 6,186,894 | B1 | 2/2001 | Mayeroff |
| 6,190,254 | B1 | 2/2001 | Bennett |
| 6,190,255 | B1 | 2/2001 | Thomas et al. |
| 6,198,395 | B1 | 3/2001 | Sussman |
| 6,200,217 | B1 | 3/2001 | Osawa |
| 6,203,429 | B1 | 3/2001 | Demar et al. |
| 6,203,430 | B1 | 3/2001 | Walker et al. |
| 6,217,448 | B1 | 4/2001 | Olsen |
| 6,220,959 | B1 | 4/2001 | Holmes, Jr. et al. |
| 6,224,483 | B1 | 5/2001 | Mayeroff |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,233,731 | B1 | 5/2001 | Bond et al. |
| 6,234,897 | B1 | 5/2001 | Frohm et al. |
| 6,238,288 | B1 | 5/2001 | Walker et al. |
| 6,241,607 | B1 | 6/2001 | Payne et al. |
| 6,241,612 | B1 | 6/2001 | Heredia |
| 6,251,013 | B1 | 6/2001 | Bennett |
| 6,254,481 | B1 | 7/2001 | Jaffe |
| 6,261,177 | B1 | 7/2001 | Bennett |
| 6,261,178 | B1 | 7/2001 | Bennett |
| 6,270,409 | B1 | 8/2001 | Shuster |
| 6,270,411 | B1 | 8/2001 | Gura et al. |
| 6,287,197 | B1 | 9/2001 | Dickinson et al. |
| 6,293,869 | B1 | 9/2001 | Kwan et al. |
| 6,295,638 | B1 | 9/2001 | Brown et al. |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,305,686 | B1 | 10/2001 | Perrie et al. |
| 6,306,034 | B1 | 10/2001 | Sakamoto et al. |
| 6,309,299 | B1 | 10/2001 | Weiss |
| 6,309,300 | B1 | 10/2001 | Glavich |
| 6,309,301 | B1 | 10/2001 | Sano |
| 6,311,976 | B1 | 11/2001 | Yoseloff et al. |
| 6,311,982 | B1 | 11/2001 | Lebensfeld et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,319,124 | B1 | 11/2001 | Baerlocher et al. |
| 6,321,323 | B1 | 11/2001 | Nugroho et al. |
| 6,322,078 | B1 | 11/2001 | Adams |
| 6,328,648 | B1 | 12/2001 | Walker et al. |
| 6,328,649 | B1 | 12/2001 | Randall et al. |
| 6,334,814 | B1 | 1/2002 | Adams |
| 6,336,860 | B1 | 1/2002 | Webb |
| 6,346,043 | B1 | 2/2002 | Colin et al. |
| 6,347,996 | B1 | 2/2002 | Gilmore et al. |
| 6,358,144 | B1 | 3/2002 | Kaddlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,375,570 | B1 | 4/2002 | Poole |
| 6,390,923 | B1 | 5/2002 | Yoshitomi et al. |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,409,596 | B1 | 6/2002 | Hayashida et al. |
| 6,409,602 | B1 | 6/2002 | Wiltshire et al. |
| 6,413,162 | B1 | 7/2002 | Baerlocher et al. |
| 6,416,411 | B1 | 7/2002 | Tsukahara |
| 6,419,579 | B1 | 7/2002 | Bennett |
| 6,439,943 | B1 | 8/2002 | Aoki et al. |
| 6,439,993 | B1 | 8/2002 | O'Halloran |
| 6,454,266 | B1 | 9/2002 | Breeding et al. |
| 6,461,241 | B1 | 10/2002 | Webb et al. |
| 6,464,581 | B1 | 10/2002 | Yoseloff et al. |
| 6,485,366 | B1 | 11/2002 | Rowe |
| 6,491,584 | B2 | 12/2002 | Graham et al. |
| 6,494,454 | B2 | 12/2002 | Adams |
| 6,504,089 | B1 | 1/2003 | Negishi et al. |
| 6,516,466 | B1 | 2/2003 | Jackson |
| 6,517,074 | B1 | 2/2003 | Moody et al. |
| 6,517,432 | B1 | 2/2003 | Jaffe |
| 6,537,152 | B2 | 3/2003 | Seelig et al. |
| 6,544,122 | B2 | 4/2003 | Araki et al. |
| 6,547,242 | B1 | 4/2003 | Sugiyama et al. |
| 6,551,187 | B1 | 4/2003 | Jaffe |
| 6,554,703 | B1 | 4/2003 | Bussick et al. |

(56) References Cited

U.S. PATENT DOCUMENTS

| | | | |
|---|---|---|---|
| 6,558,254 | B2 | 5/2003 | Baerlocher et al. |
| 6,561,900 | B1 | 5/2003 | Baerlocher et al. |
| 6,561,902 | B1 | 5/2003 | Walker et al. |
| 6,561,908 | B1 | 5/2003 | Hoke |
| 6,572,471 | B1 | 6/2003 | Bennett |
| 6,592,457 | B1 | 7/2003 | Frohm et al. |
| 6,599,195 | B1 | 7/2003 | Araki et al. |
| 6,602,137 | B2 | 8/2003 | Kaminkow et al. |
| 6,604,740 | B1 | 8/2003 | Singer et al. |
| 6,604,999 | B2 | 8/2003 | Ainsworth |
| 6,605,002 | B2 | 8/2003 | Baerlocher |
| 6,609,971 | B2 | 8/2003 | Vancura |
| 6,616,142 | B2 | 9/2003 | Adams |
| 6,616,531 | B1 | 9/2003 | Mullins |
| 6,632,139 | B1 | 10/2003 | Baerlocher |
| 6,634,945 | B2 | 10/2003 | Glavich et al. |
| 6,638,169 | B2 | 10/2003 | Wilder et al. |
| 6,656,046 | B1 | 12/2003 | Yoseloff et al. |
| 6,669,559 | B1 | 12/2003 | Baerlocher et al. |
| 6,672,958 | B2 | 1/2004 | Bennett |
| 6,676,511 | B2 | 1/2004 | Payne et al. |
| 6,676,512 | B2 | 1/2004 | Fong et al. |
| 6,708,975 | B1 | 3/2004 | Fox et al. |
| 6,726,427 | B2 | 4/2004 | Jarvis et al. |
| 6,729,618 | B1 | 5/2004 | Koenig et al. |
| 6,739,973 | B1 | 5/2004 | Lucchesi et al. |
| 6,746,328 | B2 | 6/2004 | Cannon et al. |
| 6,749,502 | B2 | 6/2004 | Baerlocher |
| 6,769,985 | B1 | 8/2004 | Laakso et al. |
| 6,780,104 | B2 | 8/2004 | Fox |
| 6,805,349 | B2 | 10/2004 | Baerlocher et al. |
| 6,810,517 | B2 | 10/2004 | Bond et al. |
| 6,848,996 | B2 | 2/2005 | Hecht et al. |
| 6,855,053 | B2 | 2/2005 | Baerlocher |
| 6,869,357 | B2 | 3/2005 | Adams et al. |
| 6,878,061 | B2 | 4/2005 | Baerlocher et al. |
| 6,896,615 | B2 | 5/2005 | Berman |
| 6,929,952 | B2 | 8/2005 | Baerlocher |
| 6,935,955 | B1 | 8/2005 | Kaminkow et al. |
| 6,939,229 | B2 | 9/2005 | McClintic |
| 6,960,133 | B1 | 11/2005 | Marks et al. |
| 6,964,416 | B2 | 11/2005 | McClintic et al. |
| 6,966,835 | B2 | 11/2005 | Graham |
| 6,969,316 | B2 | 11/2005 | Jarvis et al. |
| 7,001,274 | B2 | 2/2006 | Baerlocher et al. |
| 7,014,560 | B2 | 3/2006 | Glavich et al. |
| 7,040,983 | B2 | 5/2006 | Dolloff et al. |
| 7,056,209 | B2 | 6/2006 | Baerlocher et al. |
| 7,059,967 | B2 | 6/2006 | Baerlocher |
| 7,128,646 | B2 | 10/2006 | Baerlocher et al. |
| 7,156,736 | B2 | 1/2007 | Adams et al. |
| 7,252,591 | B2 | 8/2007 | Van Asdale |
| 7,294,055 | B2 | 11/2007 | Baerlocher et al. |
| 7,329,180 | B2 * | 2/2008 | Strom ............................ 463/20 |
| 7,329,182 | B2 | 2/2008 | Adams et al. |
| 7,341,512 | B2 | 3/2008 | Dolloff et al. |
| 7,393,277 | B2 | 7/2008 | Jackson |
| 7,399,226 | B2 | 7/2008 | Mishra |
| 7,448,948 | B2 | 11/2008 | Hughs-Baird et al. |
| 7,494,412 | B2 | 2/2009 | Baerlocher |
| 7,494,413 | B2 | 2/2009 | Singer et al. |
| 7,588,496 | B2 | 9/2009 | Van Asdale |
| 7,594,849 | B2 | 9/2009 | Cannon |
| 7,601,061 | B2 | 10/2009 | Jackson |
| 7,601,062 | B2 | 10/2009 | Cole et al. |
| 7,874,908 | B2 | 1/2011 | Walker et al. |
| 7,874,910 | B2 | 1/2011 | Berman |
| 8,092,292 | B1 * | 1/2012 | White ............................ 463/13 |
| 8,128,480 | B2 | 3/2012 | Muir |
| 2001/0029542 | A1 | 10/2001 | Nishimura |
| 2001/0054794 | A1 | 12/2001 | Cole et al. |
| 2002/0014740 | A1 | 2/2002 | Ainsworth |
| 2002/0025844 | A1 | 2/2002 | Casey et al. |
| 2002/0025847 | A1 | 2/2002 | Thomas et al. |
| 2002/0034974 | A1 | 3/2002 | Wood et al. |
| 2002/0055382 | A1 | 5/2002 | Meyer |
| 2002/0077165 | A1 | 6/2002 | Bansemer et al. |
| 2002/0090990 | A1 | 7/2002 | Joshi et al. |
| 2002/0094857 | A1 | 7/2002 | Meyer |
| 2002/0109718 | A1 | 8/2002 | Mansour et al. |
| 2002/0119814 | A1 | 8/2002 | Fong et al. |
| 2002/0137559 | A1 | 9/2002 | Baerlocher |
| 2003/0013518 | A1 | 1/2003 | Graham |
| 2003/0045345 | A1 | 3/2003 | Berman |
| 2003/0064773 | A1 | 4/2003 | Baerlocher et al. |
| 2003/0064798 | A1 | 4/2003 | Grauzer et al. |
| 2003/0064808 | A1 | 4/2003 | Hecht et al. |
| 2003/0069068 | A1 | 4/2003 | Kaminkow |
| 2003/0073489 | A1 | 4/2003 | Hecht et al. |
| 2003/0073490 | A1 | 4/2003 | Hecht et al. |
| 2003/0073491 | A1 | 4/2003 | Hecht et al. |
| 2003/0092475 | A1 | 5/2003 | Fox |
| 2003/0092480 | A1 | 5/2003 | White et al. |
| 2003/0114215 | A1 | 6/2003 | Adams et al. |
| 2003/0130024 | A1 | 7/2003 | Darby |
| 2003/0203752 | A1 | 10/2003 | Kaminkow et al. |
| 2003/0216165 | A1 | 11/2003 | Singer et al. |
| 2004/0009803 | A1 | 1/2004 | Bennett et al. |
| 2004/0023714 | A1 | 2/2004 | Asdale |
| 2004/0048650 | A1 | 3/2004 | Mierau et al. |
| 2004/0053695 | A1 | 3/2004 | Mattice et al. |
| 2004/0058727 | A1 | 3/2004 | Marks et al. |
| 2004/0063483 | A1 | 4/2004 | Wolf et al. |
| 2004/0063489 | A1 | 4/2004 | Crumby |
| 2004/0097280 | A1 | 5/2004 | Gauselmann |
| 2004/0097282 | A1 | 5/2004 | Baerlocher et al. |
| 2004/0142739 | A1 | 7/2004 | Loose et al. |
| 2004/0142747 | A1 | 7/2004 | Pryzby |
| 2004/0192431 | A1 | 9/2004 | Singer et al. |
| 2004/0195773 | A1 | 10/2004 | Masci et al. |
| 2004/0209685 | A1 | 10/2004 | Lucchesi et al. |
| 2004/0242314 | A1 | 12/2004 | Casey |
| 2005/0043080 | A1 * | 2/2005 | Strom ............................ 463/20 |
| 2005/0043090 | A1 | 2/2005 | Pryzby et al. |
| 2005/0054420 | A1 | 3/2005 | Cregan et al. |
| 2005/0054429 | A1 | 3/2005 | Baerlocher et al. |
| 2005/0054436 | A1 | 3/2005 | Frizzell et al. |
| 2005/0054440 | A1 | 3/2005 | Anderson et al. |
| 2005/0054442 | A1 | 3/2005 | Anderson et al. |
| 2005/0064935 | A1 | 3/2005 | Blanco |
| 2005/0107154 | A1 | 5/2005 | Pacey |
| 2005/0124406 | A1 | 6/2005 | Cannon |
| 2005/0148384 | A1 | 7/2005 | Marks et al. |
| 2005/0170876 | A1 | 8/2005 | Masci et al. |
| 2005/0192081 | A1 | 9/2005 | Marks et al. |
| 2005/0192099 | A1 * | 9/2005 | Nguyen et al. .................. 463/42 |
| 2005/0233795 | A1 | 10/2005 | Wolf |
| 2005/0277469 | A1 | 12/2005 | Pryzby et al. |
| 2005/0282631 | A1 | 12/2005 | Bonney et al. |
| 2006/0084497 | A1 | 4/2006 | Marks et al. |
| 2006/0089191 | A1 | 4/2006 | Singer et al. |
| 2006/0121969 | A1 | 6/2006 | Marks et al. |
| 2006/0183535 | A1 | 8/2006 | Marks et al. |
| 2007/0026923 | A1 | 2/2007 | Muir |
| 2007/0129134 | A1 | 6/2007 | Barrie |
| 2007/0191087 | A1 | 8/2007 | Thomas et al. |
| 2007/0202941 | A1 * | 8/2007 | Miltenberger et al. ......... 463/25 |
| 2007/0218975 | A1 * | 9/2007 | Iddings et al. .................. 463/25 |
| 2007/0243925 | A1 * | 10/2007 | LeMay et al. ................... 463/20 |
| 2008/0045322 | A1 | 2/2008 | Berman |
| 2008/0045323 | A1 | 2/2008 | Berman |
| 2008/0111309 | A1 * | 5/2008 | Nicely et al. .................. 273/292 |
| 2008/0113771 | A1 * | 5/2008 | Baerlocher et al. ............. 463/25 |
| 2008/0161096 | A1 | 7/2008 | Jackson |
| 2008/0200238 | A1 | 8/2008 | Mishra |
| 2008/0272541 | A1 | 11/2008 | Walker et al. |
| 2008/0274789 | A1 | 11/2008 | Singer et al. |
| 2009/0005145 | A1 * | 1/2009 | White ............................ 463/16 |
| 2009/0124326 | A1 | 5/2009 | Caputo et al. |
| 2009/0233705 | A1 * | 9/2009 | LeMay et al. ................... 463/25 |

(56) References Cited

U.S. PATENT DOCUMENTS

| | | | |
|---|---|---|---|
| 2012/0135797 | A1 | 5/2012 | Muir |
| 2012/0142407 | A1 | 6/2012 | Muir |

FOREIGN PATENT DOCUMENTS

| | | | |
|---|---|---|---|
| EP | 0 410 789 | A2 | 7/1990 |
| EP | 0 945 837 | A2 | 9/1999 |
| EP | 0 978 809 | A2 | 2/2000 |
| EP | 0 984 408 | A2 | 3/2000 |
| EP | 0 997 856 | A2 | 5/2000 |
| EP | 0 997 857 | A2 | 5/2000 |
| EP | 1 079 345 | A1 | 2/2001 |
| EP | 1 205 894 | A2 | 10/2001 |
| EP | 1 225 565 | A2 | 7/2002 |
| EP | 1 439 507 | A3 | 3/2005 |
| GB | 2 090 690 | A | 7/1982 |
| GB | 2 096 376 | A | 10/1982 |
| GB | 2 097 160 | A | 10/1982 |
| GB | 2 100 905 | A | 1/1983 |
| GB | 2 105 891 | A | 3/1983 |
| GB | 2 117 155 | A | 10/1983 |
| GB | 2 137 392 | A | 10/1984 |
| GB | 2 161 008 | A | 1/1986 |
| GB | 2 170 636 | | 2/1986 |
| GB | 2 170 643 | A | 8/1986 |
| GB | 2 181 589 | A | 4/1987 |
| GB | 2 183 882 | A | 6/1987 |
| GB | 2 191 030 | A | 12/1987 |
| GB | 2 201 279 | A | 8/1988 |
| GB | 2 222 712 | A | 3/1990 |
| GB | 2 225 889 | A | 6/1990 |
| GB | 2 226 436 | A | 6/1990 |
| GB | 2 226 907 | A | 7/1990 |
| GB | 2 242 300 | A | 9/1991 |
| GB | 2 262 642 | A | 6/1993 |
| GB | 2 316 214 | A | 2/1998 |
| GB | 2 328 311 | A | 2/1999 |
| GB | 2 335 524 | | 9/1999 |
| GB | 2 393 019 | A | 3/2004 |
| GB | 2 393 021 | | 3/2004 |
| GB | 2 396 566 | | 6/2004 |
| GB | 2 402 256 | A | 12/2004 |
| WO | WO 96/08799 | | 3/1996 |
| WO | WO 97/32285 | | 9/1997 |
| WO | WO 00/12186 | | 3/2000 |
| WO | WO 00/66235 | | 11/2000 |
| WO | WO 00/76606 | A1 | 12/2000 |
| WO | WO 01/19476 | | 3/2001 |
| WO | WO 01/34261 | A1 | 5/2001 |
| WO | WO 01/87441 | | 11/2001 |
| WO | WO 03/049055 | | 3/2003 |
| WO | WO 03/026758 | | 4/2003 |
| WO | WO 2004/025584 | | 3/2004 |
| WO | WO 2004/082779 | | 9/2004 |
| WO | WO 2005/026883 | A2 | 3/2005 |
| WO | WO 2005/027059 | A2 | 3/2005 |
| WO | WO 2005/028045 | A2 | 3/2005 |
| WO | WO 2005113089 | A1 | 12/2005 |
| WO | WO 2005113091 | A1 | 12/2005 |
| WO | WO 2005114598 | A1 | 12/2005 |
| WO | WO 2005117647 | A1 | 12/2005 |
| WO | WO 2005120127 | A1 | 12/2005 |

OTHER PUBLICATIONS

IGT, Uno Video Slots (2003), available at http://media.igt.com/marketing/PromotionalLiterature/GamePromoLit_A10C-1C28D.pdf ("Uno Slots").*

Original Uno Rules, available at http://www.unorules.com, printed on Jul. 5, 2012 (4 pages).

* cited by examiner 2116,2118

2116,2118

GAMING SYSTEM AND METHOD THAT DETERMINES AWARDS BASED ON QUANTITIES OF SYMBOLS INCLUDED IN ONE OR MORE STRINGS OF RELATED SYMBOLS DISPLAYED ALONG ONE OR MORE PAYLINES

CROSS REFERENCE TO RELATED APPLICATIONS

This application relates to the following commonly owned co-pending patent application: "GAMING SYSTEM AND METHOD CONFIGURED TO OPERATE A GAME ASSOCIATED WITH A REFLECTOR SYMBOL," U.S. patent application Ser. No. 13/543,127.

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on an amount of the wager (e.g., the higher the amount of the wager, the higher the award). Winning symbols or winning symbol combinations that are less likely to occur typically result in higher awards being provided when they do occur.

For such known gaming machines, an amount of a wager placed on a primary game by a player may vary. For instance, a gaming machine may enable a player to wager a minimum quantity of credits, such as one credit (e.g., one cent, nickel, dime, quarter, or dollar), up to a maximum quantity of credits, such as five credits. The gaming machine may enable the player to place this wager a single time or multiple times for a single play of the primary game. For instance, a gaming machine configured to operate a slot game may have one or more paylines, and the gaming machine may enable a player to place a wager on each of the paylines for a single play of the slot game. Thus, it is known that a gaming machine, such as one configured to operate a slot game, may enable players to place wagers of substantially different amounts on each play of a primary game. For example, the amounts of the wagers may range from one credit up to 125 credits (e.g., five credits on each of twenty-five separate paylines). This is also true for other wagering games, such as video draw poker, in which players can place wagers of one or more credits on each hand, and in which multiple hands can be played simultaneously. Accordingly, it should be appreciated that different players play at substantially different wager amounts or levels and substantially different rates of play.

Various known slot-type games employ typical payline, multiway, and/or scatter evaluations to determine any winning symbol combinations associated with a plurality of generated and displayed symbols. There is a continuing need to provide new and exciting manners of evaluating symbols to determine winning symbol combinations to increase player enjoyment and excitement.

SUMMARY

Various embodiments of the present disclosure are directed to a gaming system and method for determining one or more awards based on quantities of symbols included in one or more strings of related symbols displayed along one or more paylines. In one embodiment, the gaming system is configured to operate a game associated with a plurality of symbols. A plurality of the symbols are each associated with one of a set of a plurality of different first characteristics and one of a set of a plurality of different second characteristics. That is, a plurality of the symbols are each associated with a characteristic of each of a plurality of different sets of characteristics. The symbols are displayable at a plurality of symbol display areas. The game is also associated with a plurality of different paylines. Each of the paylines is associated with a different payline path extending along a plurality of the symbol display areas.

For a play of the game in this embodiment, the gaming system displays a plurality of the symbols at the symbol display areas. For each of at least one of the paylines, the gaming system determines whether a set of a plurality of the symbols displayed along the payline path associated with that payline forms a string of related symbols. The gaming system determines that a set of the symbols displayed along the payline path associated with that payline forms a string of related symbols when, for each displayed symbol of the set, that displayed symbol is related to at least one other symbol of the set displayed adjacent to that displayed symbol. Put differently, each symbol of a string of related symbols is displayed adjacent to at least one other symbol of the string to which that symbol is related. Symbols are related if the symbols share at least one of: (a) a same one of the set of first characteristics, and (b) a same one of the set of second characteristics. In other words, two adjacently displayed symbols must share either a same one of the set of first characteristics or a same one of the set of second characteristics to be related and form a string of related symbols. If the gaming system determines that the set of the displayed symbols forms a string of related symbols, the gaming system determines any awards based on a quantity of symbols in the string of related symbols, and displays and provides any determined awards.

In various embodiments, the plurality of symbols includes one or more skip symbols. In these embodiments, each skip symbol is associated with a characteristic of each of one or more of the different sets of characteristics. In one embodiment in which the plurality of symbols includes one or more skip symbols, when one of the skip symbols is included in a string of related symbols, the gaming system does not count the skip symbol when determining how many symbols are included in that string for award determination purposes. In another embodiment in which the plurality of symbols includes one or more skip symbols, when one of the skip symbols is displayed along a payline path associated with a wagered-on payline, the gaming system disregards another one of the symbols displayed along the payline path associated with the payline when determining whether a set of the symbols displayed along that payline path forms a string of related symbols.

In certain embodiments, the plurality of symbols includes one or more wild symbols. In these embodiments, the wild symbols are associated with each characteristic of each of the different sets of characteristics such that a displayed wild symbol relates to any adjacently displayed symbol. That is, in operation, each wild symbol acts as the symbol that would most benefit the player in a given situation.

In various embodiments, the plurality of symbols includes one or more draw symbols. In these embodiments, each draw symbol is associated with a characteristic of each of one or more of the different sets of characteristics. Additionally, each draw symbol is associated with a draw count value. In one such embodiment, when one of the draw symbols is included in a string of related symbols displayed along the payline path associated with a payline, the gaming system adds the draw count value associated with that displayed draw symbol to the quantity of symbols included in the string of related symbols for award determination purposes.

In another such embodiment, when one of the draw symbols is included in a string of related symbols displayed along the payline path associated with a payline, the gaming system adds a quantity of symbols equal to the draw count value associated with the displayed draw symbol to the payline path associated with that payline. In certain embodiments, when one of the additional symbols added along the payline path associated with a payline is itself a draw symbol, if that draw symbol is included in a string of related symbols, the gaming system adds a quantity of symbols equal to the draw count value associated with that displayed draw symbol to the payline path associated with that payline.

In another such embodiment, when one of the draw symbols is included in a string of related symbols displayed along the payline path associated with a payline, the gaming system adds an additional column of symbol display areas to the matrix of symbol display areas, and generates and displays a quantity of symbols equal to the draw count value associated with the displayed draw symbol at the added symbol display areas.

In another such embodiment, when one of the draw symbols is included in a string of related symbols displayed along the payline path associated with a payline, the gaming system adds an additional row of symbol display areas to the matrix of symbol display areas, and generates and displays a quantity of symbols equal to the draw count value associated with the displayed draw symbol at the added symbol display areas.

In various embodiments, a draw symbol is combined with a wild symbol to form a wild/draw symbol that is associated with: (a) each characteristic of each of the different sets of characteristics, and (b) a draw count value.

In certain embodiments, the plurality of symbols includes one or more reflector or reverse symbols. In these embodiments, each reflector symbol is associated with a characteristic of each of one or more of the different sets of characteristics. In one embodiment including the reflector symbol, when the reflector symbol is displayed along the payline path associated with a payline, the gaming system determines a reflected payline path associated with that payline, wherein the reflected payline path extends along that payline path to the displayed reflector symbol and back along that payline path. The gaming system then determines whether a set of the symbols displayed along that reflected payline path forms a string of related symbols.

Further embodiments of the present disclosure are directed to a gaming system and method employing the reflector symbol without employing award determinations based on lengths of strings of related symbols. In one such embodiment, the gaming system is configured to operate a game associated with a plurality of symbols including a reflector symbol. The symbols are displayable at a plurality of symbol display areas. The game is also associated with a plurality of different paylines. Each of the paylines is associated with a different payline path extending along a plurality of the symbol display areas.

For a play of the game in this embodiment, the gaming system displays a plurality of the symbols at the symbol display areas. For each of at least one of the paylines, the gaming system determines whether the reflector symbol is displayed at one of the symbol display areas along the payline path associated with that payline. If the reflector symbol is displayed at one of the symbol display areas along the payline path associated with that payline, the gaming system determines a reflected payline path associated with that payline. The reflected payline path extends along the payline path associated with that payline to the displayed reflector symbol and back along the payline path. The gaming system determines whether the symbols displayed at the symbol display areas along the reflected payline path form one of a plurality of winning symbol combinations, and displays and provides any awards associated with any winning symbol combination displayed along the reflected payline path.

If the reflector symbol is not displayed at one of the symbol display areas along the payline path associated with that payline, the gaming system determines whether the symbols displayed at the symbol display areas along the payline path form one of the winning symbol combinations. The gaming system displays and provides any awards associated with any displayed winning symbol combination.

Thus, in various embodiments, the gaming system of the present disclosure is configured to employ new manners of evaluating symbols to determine winning symbol combinations, thereby increasing player enjoyment and excitement.

Additional features and advantages are described herein, and will be apparent from, the following Detailed Description and the Figures.

DETAILED DESCRIPTION

Determining Awards Based on Quantities of Symbols Included in One or More Strings of Related Symbols Displayed Along One or More Paylines Various embodiments of the present disclosure are directed to a gaming system and method for determining one or more awards based on quantities of symbols included in one or more strings of related symbols displayed along one or more paylines. In one embodiment, the gaming system is configured to operate a game associated with a plurality of symbols. A plurality of the symbols are each associated with one of a set of a plurality of different first characteristics and one of a set of a plurality of different second characteristics. The symbols are displayable at a plurality of symbol display areas. The game is also associated with a plurality of different paylines. Each of the paylines is associated with a different payline path extending along a plurality of the symbol display areas.

For a play of the game in this embodiment, the gaming system displays a plurality of the symbols at the symbol display areas. For each of at least one of the paylines, the gaming system determines whether a set of a plurality of the symbols displayed along the payline path associated with that payline forms a string of related symbols. The gaming system determines that a set of the symbols displayed along the payline path associated with that payline forms a string of related symbols when, for each displayed symbol of the set, that displayed symbol is related to at least one other symbol of the set displayed adjacent to that displayed symbol. Put differently, each symbol of a string of related symbols is displayed adjacent to at least one other symbol of the string to which that symbol is related. Symbols are related if the symbols share at least one of: (a) a same one of the set of first characteristics, and (b) a same one of the set of second characteristics. If the gaming system determines that the set of the displayed symbols forms a string of related symbols, the gaming system determines any awards based on a quantity of symbols in the string of related symbols, and displays and provides any determined awards.

While the embodiments described below are directed to a primary wagering game, it should be appreciated that the present disclosure may additionally or alternatively be employed in association with a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1A:
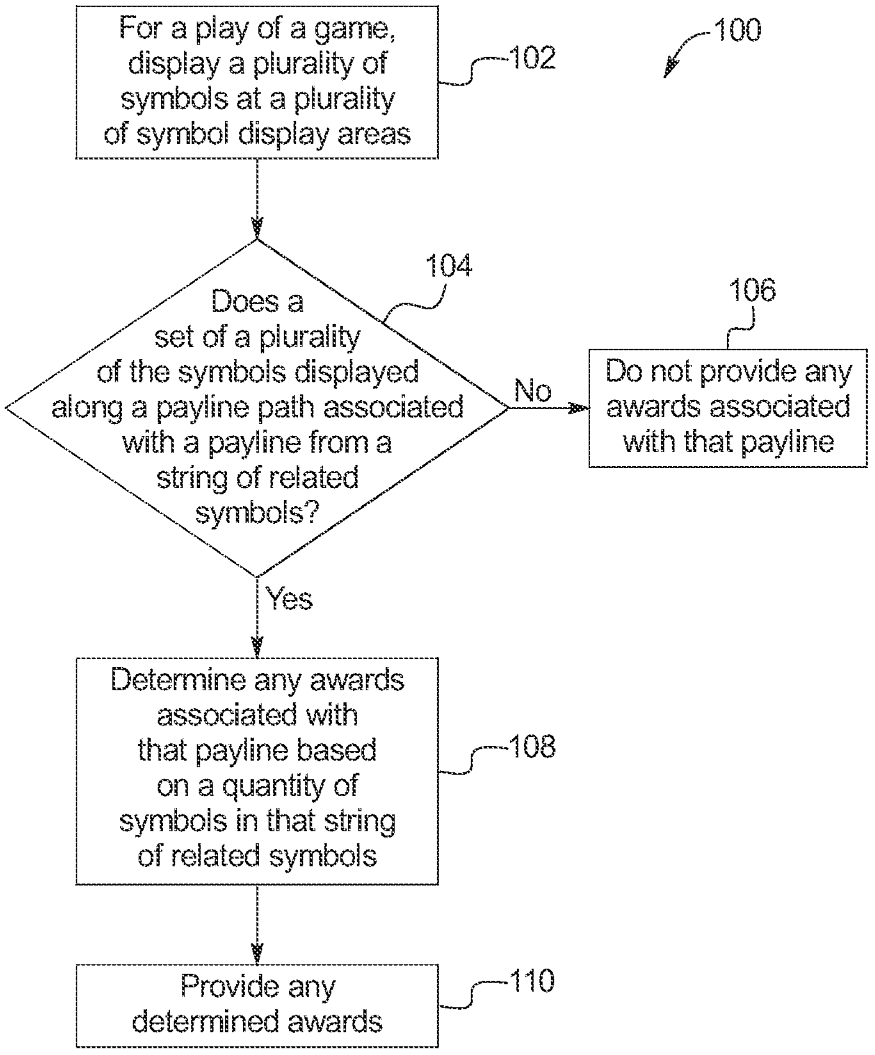
FIG. 1A is a flowchart illustrating an example method of operating an embodiment of the gaming system of the present disclosure configured to determine one or more awards based on quantities of symbols included in one or more strings of related symbols displayed along one or more paylines.

FIG. 1A illustrates a flowchart of a process or method 100 for operating an example embodiment of the gaming system of the present disclosure. In various embodiments, process 100 is represented by a set of instructions stored in one or more memories and executed by one or more processors. Although process 100 is described with reference to the flowchart shown in FIG. 1A, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, for a play of a game associated with a plurality of symbols, the gaming system displays a plurality of the symbols at a plurality of symbol display areas, as indicated by block 102. The gaming system also displays a plurality of different paylines. Each of the displayed paylines is associated with a different payline path along a different plurality of the symbol display areas. For one of the paylines, the gaming system determines whether a set of a plurality of the symbols displayed along the payline path associated with that payline forms a string of related symbols, as indicated by diamond 104. The gaining system determines that a set of the symbols displayed along the payline path associated with that payline forms a string of related symbols when, for each displayed symbol of the set, that displayed symbol is related to at least one other symbol of the set displayed adjacent to that displayed symbol.

If the gaming system determines that a set of the symbols displayed along the payline path associated with that payline does not form a string of related symbols, the gaming system does not provide any awards associated with that payline, as indicated by block 106. If the gaming system determines that a set of the symbols displayed along the payline path associated with that payline forms a string of related symbols, the gaming system determines any awards associated with that payline based on a quantity of symbols in that string of related symbols, as indicated by block 108. The gaming system provides any determined awards, as indicated by block 110.

Figure 2:
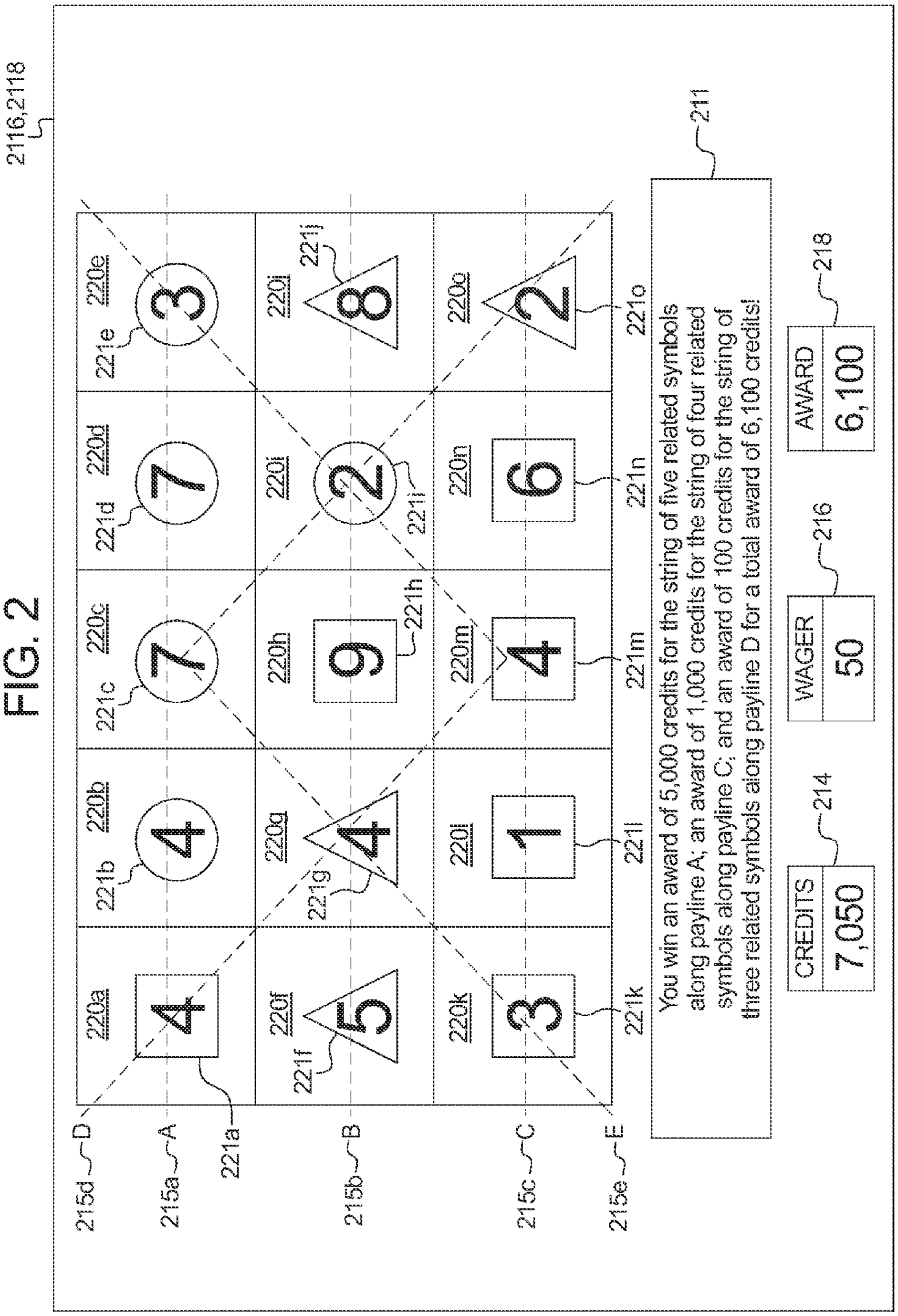
FIG. 2 illustrates a screen shot of an example of an embodiment of the gaming system of the present disclosure configured to operate a slot-type game in which one or more awards are determined based on quantities of symbols included in one or more strings of related symbols displayed along one or more paylines.

FIG. 2 illustrates a screen shot of an example embodiment of the gaming system of the present disclosure. In this example, the gaming system is configured to operate a primary slot-type wagering game associated with a plurality of symbols. Each of a plurality of the symbols is associated with: (a) one of a set of a plurality of different first characteristics, and (b) one of a set of a plurality of different second characteristics. That is, in this example, each of the symbols is associated with a characteristic of each of the two different sets of characteristics. In this example, the set of first characteristics is a set of numbers including the following numbers: 1, 2, 3, 4, 5, 6, 7, 8, and 9, and the set of second characteristics is a set of shapes including the following shapes: a circle shape, a square shape, and a triangle shape.

It should be appreciated that any suitable set of characteristics may be employed, such as: (a) a set of different colors; (b) a set of different patterns; (c) a set of different letters; (d) a set of different phrases; (e) a set of different logos; (f) a set of different playing card suits (such as spades, hearts, clubs, and diamonds); (g) a set of playing card ranks (such as two through ace); (h) a set of Mahjong tiles; (i) a set of different but related pictures (such as pictures of presidents); (j) a set of buildings of different sizes (such as shack, bungalow, house, mansion, duplex, apartment building, skyscraper); (k) a set of fish of different sizes and/or types (such as goldfish, trout, salmon, shark, and whale); (l) a set of animals of different sizes and/or types (such as Chihuahua, Poodle, Bulldog, Golden Retriever, and St. Bernard); (m) a set of different sizes (such as small, medium, large, and extra-large); (n) a set of different numbers of a symbol (such as single bar, double bar, and triple bar); (o) a set of different orientations (such as pointing left, pointing up, pointing right, and pointing down); (p) a set of different categories (such as human, animal, and robot); (q) a set of different borders (such as a black border, a dotted border, a dashed border, and an oval border); (r) a set of different poses (such as a mug shot, a profile shot, and a full body shot); (s) a set of different artistic types (such as a photograph, a watercolor painting, and a cartoon); (t) a set of different genders (such as a man or a woman); (u) a set of different ages (such as an infant, a child, a teenager, and an adult); (v) a set of different outfits (such as a bathing suit, a casual outfit, a suit, and a tuxedo); and (w) a set of different accessories (such as jewelry, a hat, a scarf, and gloves).

In one embodiment, the game is associated with a plurality of symbols including: a first plurality of symbols (such as seventy-two symbols) each associated with one of the numbers 1 through 9, one of four different colors; a second plurality of symbols (such as four symbols) each associated with the number 0 and one of each of the four different colors; a third plurality of skip symbols (such as eight symbols) (described below) each associated with one of the four different colors; a fourth plurality of draw symbols (such as eight symbols) (described below) each associated with one of the four different colors; a fifth plurality of reverse symbols (such as eight symbols) (described below) each associated with one of the four different colors; a sixth plurality of wild symbols (such as four wild symbols) (described below); and a seventh plurality of wild/draw symbols (such as four wild/draw symbols) (described below) each associated with one of the four different colors.

It should also be appreciated that any suitable quantity of different sets of characteristics may be employed. For example, the primary wagering game may employ three sets of characteristics and one of each of the sets of characteristics per symbol, such as a value, color, and shape, or a value and two shapes. It should further be appreciated that each of the symbols may be associated with one or more of each of any suitable quantity of the characteristics. In one example, certain of the symbols are associated with one of each of all of the characteristics, while certain other of the symbols are associated with one of each of fewer than all of the characteristics. In another example, at least one of the symbols is associated with a plurality of one of the characteristics (such as both a circle and a square).

The gaming system displays (such as on a display device 2116 or 2118, described below) a plurality of symbol display areas 220*a*, 220*b*, 220*c*, 220*d*, 220*e*, 220*f*, 220*g*, 220*h*, 220*i*, 220*j*, 220*k*, 220*l*, 220*m*, 220*n*, and 220*o* arranged in a 3×5 matrix. The symbols are displayable at the symbol display areas. The gaming system also displays a plurality of different paylines for the primary wagering game. Each of the paylines is associated with a different payline path along a plurality of the symbol display areas. In this example, payline A 215*a* is associated with a payline path along symbol display areas 220*a*, 220*b*, 220*c*, 220*d*, and 220*e*; payline B 215*b* is associated with a payline path along symbol display areas 220*f*, 220*g*, 220*h*, 220*i*, and 220*j*; payline C 215*c* is associated with a payline path along symbol display areas 220*k*, 220*l*, 220*m*, 220*n*, and 220*o*; payline D 215*d* is associated with a payline path along symbol display areas 220*a*, 220*g*, 220*m*, 220*i*, and 220*e*; and payline E 215*e* is associated with a payline path along symbol display areas 220*k*, 220*g*, 220*c*, 220*i*, and 220*o*. Payline A 215*a*, payline B 215*b*, payline C 215*c*, payline D 215*d*, and payline E 215*e* are sometimes referred to herein as paylines A, B, C, D, and E.

The gaming system employs a paytable (not shown) for the primary wagering game that includes a plurality of related symbol string lengths and the credit payout associated with each respective related symbol string length. Specifically, in this example, the paytable includes a credit payout associated with each respective related symbol string length when the maximum wager, which is 50 credits in this example (but could be any suitable amount), is placed for a play of the primary wagering game. Specifically, a related symbol string length of:

(a) five is associated with an award of 5,000 credits;
(b) four is associated with an award of 1,000 credits; and
(c) three is associated with an award of 100 credits.

It should be appreciated that, in certain embodiments, different characteristics are associated with different awards. In one example, a string length of five symbols that each share a first characteristic is associated with a first award, and a string length of five symbols that each share a second different characteristic (such as a rarer characteristic) is associated with a second greater award. It should be appreciated that any suitable string length may be associated with any suitable award.

Additionally, in this example, the gaming system displays: a message display area 211, which displays information, notifications, and/or messages before, during, or after play of the primary wagering game; a credit meter 214, which displays a player's credit balance in the form of an amount of credits; a wager indicator 216, which displays the player's wager for a play of the primary wagering game in the form of an amount of credits; and an award meter 218, which displays any awards provided to the player in the form of an amount of credits. While in this illustrated example the gaming system indicates the player's credit balance, the player's wager, and any awards provided to the player in the form of amounts of credits, it should be appreciated that such indications may alternatively or additionally be made in the form of amounts of currency.

As illustrated in FIG. 2, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed:

(a) symbol 221*a*, which is associated with the number 4 (i.e., one of the set of first characteristics) and the square shape (i.e., one of the set of second characteristics), at symbol display area 220*a;*

(b) symbol 221*b*, which is associated with the number 4 (i.e., one of the set of first characteristics) and the circle shape (i.e.; one of the set of second characteristics), at symbol display area 220*b;*

(c) symbol 221*c*, which is associated with the number 7 (i.e., one of the set of first characteristics) and the circle shape (i.e., one of the set of second characteristics), at symbol display area 220*c;*

(d) symbol 221*d*, which is associated with the number 7 (i.e., one of the set of first characteristics) and the circle shape (i.e., one of the set of second characteristics), at symbol display area 220*d;*

(e) symbol 221*e*, which is associated with the number 3 (i.e., one of the set of first characteristics) and the circle shape (i.e., one of the set of second characteristics), at symbol display area 220*e;*

(f) symbol 221*f*, which is associated with the number 5 (i.e., one of the set of first characteristics) and the triangle shape (i.e., one of the set of second characteristics), at symbol display area 220*f;*

(g) symbol 221*g*, which is associated with the number 4 (i.e., one of the set of first characteristics) and the triangle shape (i.e., one of the set of second characteristics), at symbol display area 220*g;*

(h) symbol 221*h*, which is associated with the number 9 (i.e., one of the set of first characteristics) and the square shape (i.e., one of the set of second characteristics), at symbol display area 220*h;*

(i) symbol 221*i*, which is associated with the number 2 (i.e., one of the set of first characteristics) and the circle shape (i.e., one of the set of second characteristics), at symbol display area 220*i;*

(j) symbol 221*j*, which is associated with the number 8 (i.e., one of the set of first characteristics) and the triangle shape (i.e., one of the set of second characteristics), at symbol display area 220*j;*

(k) symbol 221*k*, which is associated with the number 3 (i.e., one of the set of first characteristics) and the square shape (i.e., one of the set of second characteristics), at symbol display area 220*k;*

(l) symbol 221*l*, which is associated with the number 1 (i.e., one of the set of first characteristics) and the square shape (i.e., one of the set of second characteristics), at symbol display area 220*l;*

(m) symbol 221*m*, which is associated with the number 4 (i.e., one of the set of first characteristics) and the square shape (i.e., one of the set of second characteristics), at symbol display area 220*m;*

(n) symbol 221*n*, which is associated with the number 6 (i.e., one of the set of first characteristics) and the square shape (i.e., one of the set of second characteristics), at symbol display area 220*n*; and (o) symbol 221*o*, which is associated with the number 2 (i.e., one of the set of first characteristics) and the triangle shape (i.e., one of the set of second characteristics), at symbol display area 220*o*.

In this example, for each wagered-on payline, the gaming system determines any awards associated with that payline based on a length of a string of related symbols (if any) displayed along the payline path associated with that payline. More specifically, for each wagered-on payline, the gaming system determines whether a set of a plurality of the symbols displayed along the payline path associated with that payline forms a string of related symbols by determining whether, for each displayed symbol of the set, that displayed symbol is related to at least one other symbol of the set displayed adjacent to that displayed symbol. Symbols are related in this example embodiment if the symbols share a designated quantity of at least one of: (a) a same one of the set of first characteristics, and (b) a same one of the set of second characteristics. If the gaming system determines that the set of the displayed symbols forms a string of related symbols, the gaming system determines any awards associated with that payline based on a quantity of symbols in the string of related symbols, and displays and provides any determined awards.

Additionally, in this example, the gaming system determines whether a set of the symbols displayed along the payline path associated with a wagered-on payline forms a string of related symbols by evaluating the symbols displayed along the payline path from left to right. More specifically, in this example, the gaming system determines whether the first symbol displayed along the payline path (i.e., the leftmost symbol in this example) and the second symbol displayed along the payline path (i.e., the symbol displayed along the payline path immediately to the right of the leftmost symbol) are related. If not, the gaming system determines that a string of related symbols is not displayed along the payline path. If so, the gaming system: (a) determines that a string of at least two related symbols is displayed along the payline path; and (b) determines whether the second symbol displayed along the payline path and the third symbol displayed along the payline path (i.e., the symbol displayed along the payline path immediately to the right of the second symbol) are related. If not, the gaming system determines that a string of two related symbols is displayed along the payline path, and determines and provides any awards associated with that string of two related symbols.

If so, the gaming system: (a) determines that a string of at least three related symbols is displayed along the payline path; and (b) determines whether the third symbol displayed along the payline path and the fourth symbol displayed along the payline path (i.e., the symbol displayed along the payline path immediately to the right of the third symbol) are related. If not, the gaming system determines that a string of three related symbols is displayed along the payline path, and determines and provides any awards associated with that string of three related symbols. If so, the gaming system: (a) determines that a string of at least four related symbols is displayed along the payline path; and (b) determines whether the fourth symbol displayed along the payline path and the fifth symbol displayed along the payline path (i.e., the symbol displayed along the payline path immediately to the right of the fourth symbol) are related. If not, the gaming system determines that a string of four related symbols is displayed along the payline path, and determines and provides any awards associated with that string of four related symbols. If so, the gaining system determines that a string of five related symbols is displayed along the payline path, and determines and provides any awards associated with that string of five related symbols. It should be appreciated that, in this example, if a string of related symbols is displayed along a payline path, one of the symbols of that string is displayed at the leftmost symbol display area along the payline path.

It should be appreciated that, in other embodiments, the gaming system determines whether a set of the symbols displayed along the payline path associated with a wagered-on payline forms a string of related symbols by evaluating the symbols displayed along the payline path in a manner similar to that described above, but from right to left rather than from left to right. It should be appreciated that, in these embodiments, if a string of related symbols is displayed along a payline path, one of the symbols of that string is displayed at the rightmost symbol display area along the payline path. In further embodiments, the gaming system does not determine whether a set of the symbols displayed along the payline path associated with a wagered-on payline forms a string of related symbols using a directional evaluation. That is, in these embodiments, a set of a plurality of the symbols displayed along the payline path associated with a wagered-on payline may form a string of related symbols regardless of where the string of related symbols is displayed along the payline path. In other embodiments, the gaming system evaluates the symbols vertically, such as from top to bottom or from bottom to top. In another embodiment, the gaming system employs a scatter-type evaluation associated with each payline. That is, in this embodiment, the gaming system determines whether a plurality of the symbols displayed along the payline path associated with a payline share at least one characteristic, regardless of whether those symbols are adjacent to one another. In this embodiment, any awards are determined (at least in part) based upon the quantity of the symbols displayed along the payline path associated with the payline that share at least one characteristic.

It should also be appreciated that, in other embodiments, symbols are related if the symbols share at least a designated quantity of a plurality of a same one of each of the sets of characteristics. For instance, symbols are related if the symbols share a same one of a set of first characteristics and a same one of a set of second characteristics.

Returning to FIG. 2, in this example, the gaming system determined that a set of five symbols 221*a*, 221*b*, 221*c*, 221*d*, and 221*e* displayed along the payline path associated with payline A formed a string of related symbols along the payline path associated with payline A. Specifically, the gaming system determined that each of symbols 221*a*, 221*b*, 221*c*, 221*d*, and 221*e* of the set was related to at least one other symbol of the set displayed adjacent to that displayed symbol. That is, the gaming system determined that each of symbols 221*a*, 221*b*, 221*c*, 221*d*, and 221*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that:

(a) symbol 221*a* shared the number 4 with adjacently displayed symbol 221*b;*

(b) symbol 221*b* shared the circle shape with adjacently displayed symbol 221*c;*

(c) symbol 221*c* shared the number 7 and the circle shape with adjacently displayed symbol 221*d*; and (d) symbol 221*d* shared the circle shape with adjacently displayed symbol 221*e*.

Accordingly, the gaming system determined an award associated with payline A based on the quantity of five symbols in the string of related symbols displayed along the payline path associated with payline A. In this example, the gaming system determined an award of 5,000 credits associated with payline A (according to the paytable described above).

Turning to payline B, in this example, the gaming system determined that a set of two symbols 221*f* and 221*g* displayed along the payline path associated with payline B formed a string of related symbols along the payline path associated with payline B. Specifically, the gaming system determined that each of symbols 221*f* and 221*g* of the set was related to at least one other symbol of the set displayed adjacent to that displayed symbol. That is, the gaming system determined that each of symbols 221*f* and 221*g* of the set shared at least one of: (a) a same one of the set of numbers (i.e., a same one of the set of first characteristics): and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline B from left to right and determined that:

(a) symbol 221*f* shared the triangle shape with adjacently displayed symbol 221*g*; and (b) symbol 221*g* did not share a same one of the set of numbers or the set of shapes with adjacently displayed symbol 221*h*, at which point the gaming system stopped evaluating the symbols displayed along the payline path associated with payline B.

In this example, the gaming system does not provide any awards for strings of related symbols including fewer than three symbols. Thus, in this instance, the gaming system did not determine or provide any awards for the string of two related symbols displayed along the payline path associated with payline B.

Turning to payline C, in this example, the gaming system determined that a set of four symbols 221*k*, 221*l*, 221*m*, and 221*n* displayed along the payline path associated with payline C formed a string of related symbols along the payline path associated with payline C. Specifically, the gaming system determined that each of symbols 221*k*, 221*l*, 221*m*, and 221*n* of the set was related to at least one other symbol of the set displayed adjacent to that displayed symbol. That is, the gaming system determined that each of symbols 221*k*, 221*l*, 221*m*, and 221*n* of the set shared at least one of: (a) a same one of the set of numbers (i.e., a same one of the set of first characteristics): and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline C from left to right and determined that:

(a) symbol 221*k* shared the square shape with adjacently displayed symbol 221*l;*

(b) symbol 221*l* shared the square shape with adjacently displayed symbol 221*m;*

(c) symbol 221*m* shared the square shape with adjacently displayed symbol 221*n*; and (d) symbol 221*n* did not share a same one of the set of numbers or the set of shapes with adjacently displayed symbol 221*o*, at which point the gaming system stopped evaluating the symbols displayed along the payline path associated with payline C.

Accordingly, the gaming system determined an award associated with payline C based on the quantity of four symbols in the string of related symbols displayed along the payline path associated with payline C. In this example, the gaming system determined an award of 1,000 credits associated with payline C (according to the paytable described above).

Turning to payline D, in this example, the gaming system determined that a set of three symbols 221*a*, 221*g*, and 221*m* displayed along the payline path associated with payline D formed a string of related symbols along the payline path associated with payline D. Specifically, the gaming system determined that each of symbols 221*a*, 221*g*, and 221*m* of the set was related to at least one other symbol of the set displayed adjacent to that displayed symbol. That is, the gaming system determined that each of symbols 221*a*, 221*g*, and 221*m* of the set shared at least one of: (a) a same one of the set of numbers i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline D from left to right and determined that:

(a) symbol 221*a* shared the number 4 with adjacently displayed symbol 221*g;*

(b) symbol 221*g* shared the number 4 with adjacently displayed symbol 221*m*; and (c) symbol 221*m* did not share a same one of the set of numbers or the set of shapes with adjacently displayed symbol 221*i*, at which point the gaming system stopped evaluating the symbols displayed along the payline path associated with payline D.

Accordingly, the gaming system determined an award associated with payline D based on the quantity of three symbols in the string of related symbols displayed along the payline path associated with payline D. In this example, the gaming system determined an award of 100 credits associated with payline D (according to the paytable described above).

Turning to payline E, in this example, the gaming system determined that no set of the symbols displayed along the payline path associated with payline E formed a string of related symbols along the payline path associated with payline E. More particularly, the numbers or the set of shapes with adjacently displayed symbol 221*g*, at which point the gaming system stopped evaluating the symbols displayed along the payline path associated with payline E.

The gaming system displayed the total award of 6,100 credits in award meter 218, and updated the player's credit balance in credit meter 214 to reflect the 6,100 credit award.

In one embodiment, rather than displaying all of the characteristics associated with the displayed symbols at once, the gaming system first displays, for each displayed symbol, a designated quantity of fewer than all of the characteristics associated with that displayed symbol. The gaming system then enables the player to choose whether to discard those characteristics or keep those characteristics. If the player chooses to keep those characteristics, the gaming system makes an award determination and does not display any other characteristics associated with those displayed symbols. If the player chooses to discard those characteristics, the gaming system replaces the displayed characteristics with any non-displayed characteristics associated with the displayed symbols. The gaming system then makes an award determination. It should thus be appreciated that, in this embodiment, the gaming system enables the player to determine which characteristics associated with the displayed symbols will be evaluated for award determination purposes.

Figure 3A:
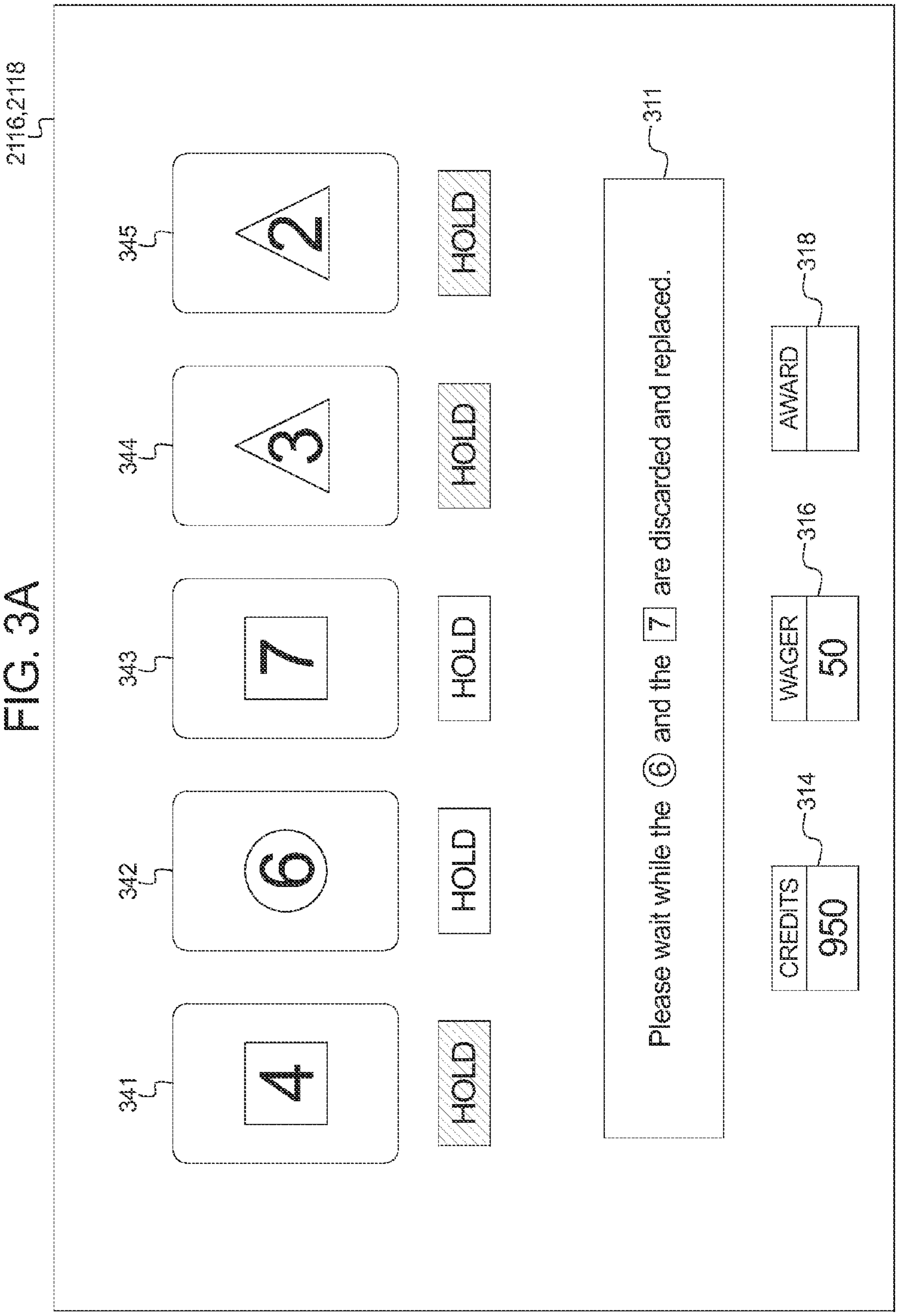
FIGS. 3A and 3B illustrate screen shots of an example of an embodiment of the gaming system of the present disclosure configured to operate a draw poker game in which an award is determined based on a quantity of symbols included in one or more strings of related symbols associated with a final hand of cards.
Figure 3B:
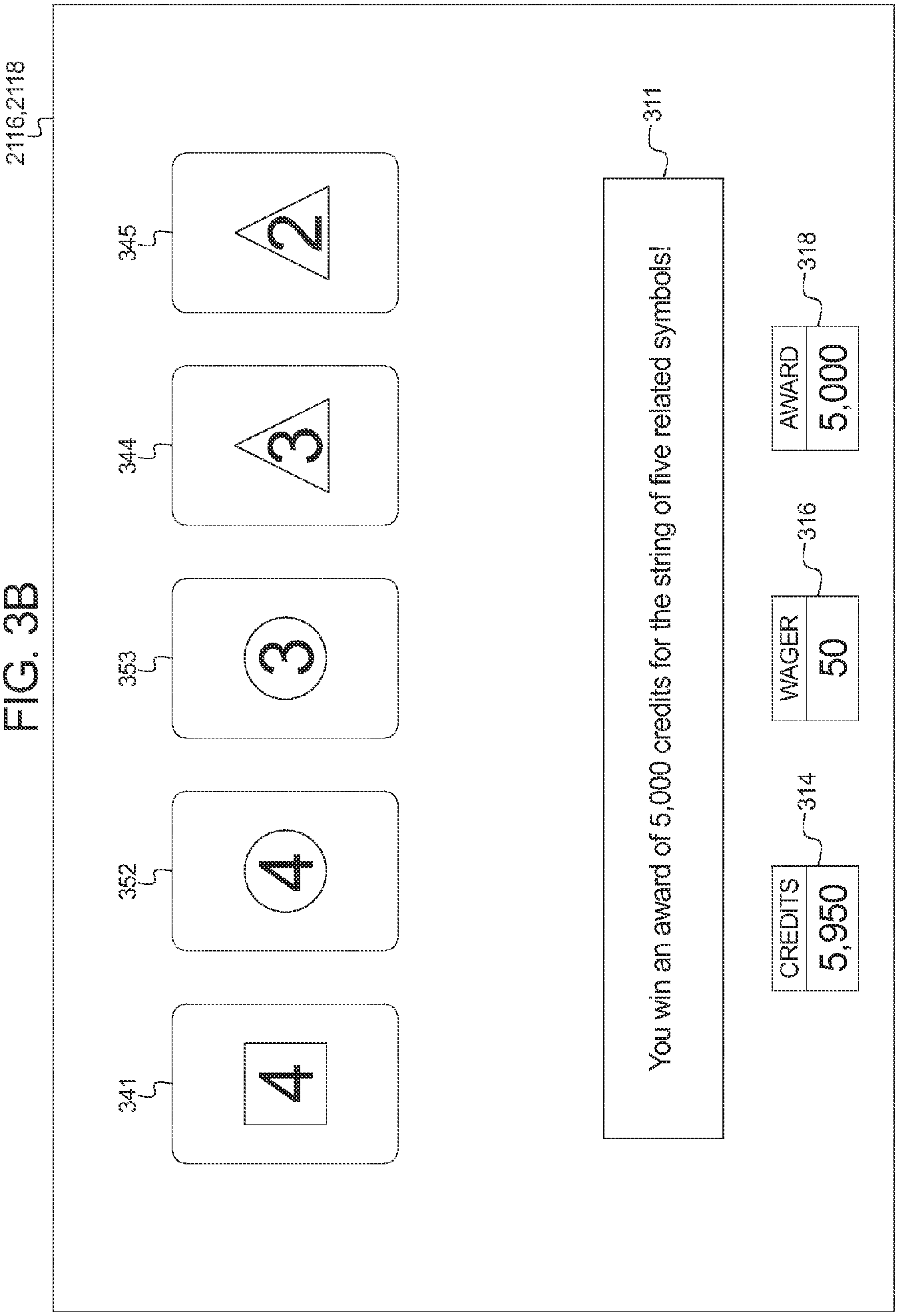

In certain embodiments, the primary wagering game is a draw poker game. FIGS. 3A and 3B illustrate screen shots of an example of such an embodiment of the gaming system of the present disclosure. In this example, the gaming system is configured to operate a draw poker game associated with a plurality of cards, each of which is associated with one of the symbols described above with respect to FIG. 2. In other embodiments, the plurality of cards is a plurality of standard playing cards. In such embodiments, the suit of a card (i.e., spade, club, heart, or diamond) is a characteristic, and the value of a card (i.e., 2, 3, 4, 5, 6, 7, 8, 9, 10, J, Q, K, or A) is another characteristic. That is, in these embodiments, the set of first characteristics includes the four different card suits, and the set of second characteristics includes the thirteen different card values.

In this example, for a play of the draw poker game, the gaming system deals the player an initial player hand of five of the cards, enables the player to choose which of the five cards (if any) to hold, replaces any non-held cards with replacement cards from the plurality of cards to form a final player hand, and makes an award determination for the final player hand by determining whether the symbols associated with the cards of the final player hand form a string of related symbols. It should be appreciated that the gaming system determines whether the symbols associated with the cards of the final player hand in a manner similar to how the gaming system evaluates an individual payline in the slot-type game describe above with respect to FIG. 2.

As illustrated in FIG. 3A, upon initiation of a play of the draw poker game for the maximum wager of 50 credits, the gaming system determined and displayed an initial player hand of five cards. In this example, the initial player hand included:

(a) card 341, which is associated with the number 4 and the square shape;

(b) card 342, which is associated with the number 6 and the circle shape;

(c) card 343, which is associated with the number 7 and the square shape;

(d) card 344, which is associated with the number 3 and the triangle shape; and (e) card 345, which is associated with the number 2 and the triangle shape.

The gaming system enabled the player to hold zero, one, or more than one of the cards of the initial player hand. As shown in FIG. 3A, the gaming system received instructions from the player to hold cards 341, 344, and 345. Accordingly, as illustrated in FIG. 3B, the gaming system discarded cards 342 and 343 and replaced cards 342 and 343 with replacement cards 352 and 353, respectively, to form a final player hand. Replacement card 352 is associated with the number 4 and the circle shape and replacement card 353 is associated with the number 3 and the circle shape.

In this example, the gaming system determined that the symbols associated with cards 341, 352, 353, 344, and 345 formed a string of related symbols. Specifically, the gaming system determined that each of the symbols associated with cards 341, 352, 353, 344, and 345 was related to at least one other symbol associated with an adjacent card. That is, the gaming system determined that each of the symbols associated with cards 341, 352, 353, 344, and 345 shared at least one of: (a) a same one of the set of numbers (i.e., a same one of the set of first characteristics); and (b) a same one of the set of shapes (i.e., a same one of the set of second characteristics) with at least one other symbol associated with an adjacent card.

More particularly, the gaming system evaluated the symbols associated with the cards of the final player hand from left to right and determined that:

(a) the symbol associated with card 341 shared the number 4 with the symbol associated with adjacent card 352;

(b) the symbol associated with card 352 shared the circle shape with the symbol associated with adjacent card 353;

(c) the symbol associated with card 353 shared the number 3 with the symbol associated with adjacent card 344; and (d) the symbol associated with card 344 shared the triangle shape with the symbol associated with adjacent card 345.

Accordingly, the gaming system determined an award for the final player hand based on the quantity of five symbols in the string of related symbols associated with the cards of the final player hand. In this example, the gaming system determined an award of 5,000 associated with the string of five related symbols.

It should be appreciated that, in certain embodiments, the draw poker game is a multi-hand draw poker game. In one embodiment, for a play of the multi-hand poker game, the gaming system deals the player a plurality of initial player hands and enables the player to hold and discard cards from each initial player hand to form final player hands as described above. The gaming system separately evaluates each final player hand for award determination purposes as described above with respect to the single hand draw poker game.

In certain embodiments in which the game is a poker game, the gaming system determines awards for one or more standard winning poker hands, such as a pair, two pair, three of a kind, a straight, a flush, a full house, four of a kind, and a straight flush, in addition to determining any awards based on strings of related symbols displayed along payline paths associated with paylines. In various embodiments in which the game is a poker game, the gaming system enables the player to re-order the cards in the initial player hand and/or the final player hand, while in other embodiments in which the game is a poker game, the gaming system does not enable the player to re-order the cards in the initial player hand or the final player hand. In one embodiment, the gaming system enables the player to re-order the cards in the initial player hand instead of replacing one or more cards of the initial player hand. In another embodiment, the game is a Texas Hold 'Em poker game in which the gaming system deals five community cards and deals each player a hand including two cards.

In various embodiments in which the game is a poker game, a plurality of players play against one another rather than against a paytable. In certain such embodiments, the gaming system employs additional hand rankings. In one example, hands including cards associated with three of a given characteristic rank higher than hands including cards associated with two of that same characteristic. In another example, certain characteristics are more favorable than other characteristics.

In various embodiments, the plurality of symbols includes one or more skip symbols. In these embodiments, each skip symbol is associated with a characteristic of each of one or more of the different sets of characteristics. In one embodiment including the skip symbol, when the skip symbol is included in a string of related symbols, the gaming system does not count the skip symbol when determining how many symbols are included in that string for award determination purposes. For example, the gaming system considers a string of four related symbols including one skip symbol as a string of three related symbols for award determination purposes. That is, in this example, the gaming system determines and provides an award associated with a string of three related symbols rather than a string of four related symbols due to the inclusion of the skip symbol in the string.

Figure 4A:
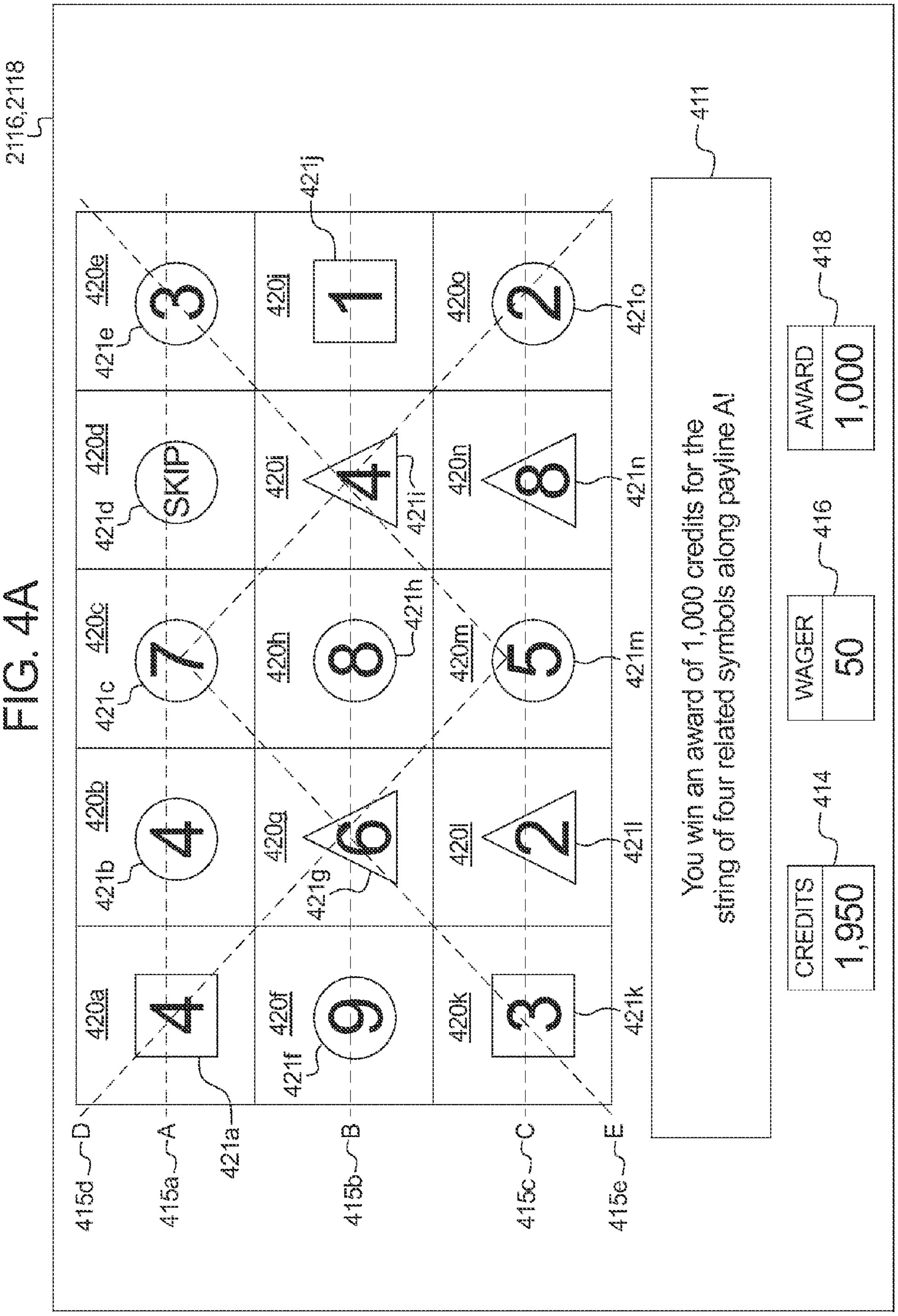
FIGS. 4A and 4B illustrate screen shots of example embodiments of the gaming system of the present disclosure configured to operate a slot-type game in which one or more awards are determined based on quantities of symbols included in one or more strings of related symbols displayed along one or more paylines, wherein the slot-type game is associated with a plurality of symbols including skip symbols.

FIG. 4A illustrates a screen shot of an example of such an embodiment of the gaming system of the present disclosure. In this example, the gaming system is configured to operate a primary slot-type wagering game associated with a plurality of symbols as described above with respect to FIG. 2. In this example, the plurality of symbols includes a plurality of skip symbols that are each associated with a different one of the set of shapes.

As illustrated in FIG. 4A, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed, among other symbols:

(a) symbol 421*a*, which is associated with the number 4 and the square shape, at symbol display area 420*a;*

(b) symbol 421*b*, which is associated with the number 4 and the circle shape, at symbol display area 420*b;*

(c) symbol 421*c*, which is associated with the number 7 and the circle shape, at symbol display area 420*c;*

(d) skip symbol 421*d*, which is associated with the circle shape, at symbol display area 420*d*; and (e) symbol 421*e*, which is associated with the number 3 and the circle shape, at symbol display area 420*e*.

Turning to payline A, in this example, the gaming system determined that a set of five symbols 421*a*, 421*b*, 421*c*, 421*d*, and 421*e* displayed along the payline path associated with payline A formed a string of related symbols along the payline path associated with payline A. Specifically, the gaming system determined that each of symbols 421*a*, 421*b*, 421*c*, 421*d*, and 421*e* of the set was related to at least one other symbol of the set displayed adjacent to that displayed symbol. That is, the gaming system determined that each of symbols 421*a*, 421*b*, 421*c*, 421*d*, and 421*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that:

(a) symbol 421*a* shared the number 4 with adjacently displayed symbol 421*b;*

(b) symbol 421*b* shared the circle shape with adjacently displayed symbol 421*c;*

(c) symbol 421*c* shared the circle shape with adjacently displayed skip symbol 421*d*; and (d) skip symbol 421*d* shared the circle shape with adjacently displayed symbol 421*e*.

As explained above, in this example, when the skip symbol is included in a string of related symbols displayed along the payline path associated with a payline, the gaming system does not count the skip symbol when determining how many symbols are in that string for award determination purposes. Thus, in this example, the gaming system determined and provided an award associated with payline A based on the quantity of non-skip symbols included in the string of related symbols displayed along payline A. Accordingly, the gaining system determined and displayed an award of 1,000 credits associated with the quantity of four non-skip symbols included in the string of related symbols displayed along the payline path associated with payline A (according to the paytable described above in conjunction with FIG. 2).

In another embodiment in which the plurality of symbols includes one or more skip symbols, when a skip symbol is displayed along a payline path associated with a wagered-on payline, the gaming system disregards one of the symbols displayed along the payline path associated with the payline when determining whether a set of the symbols displayed along that payline path forms a string of related symbols.

Figure 4B:
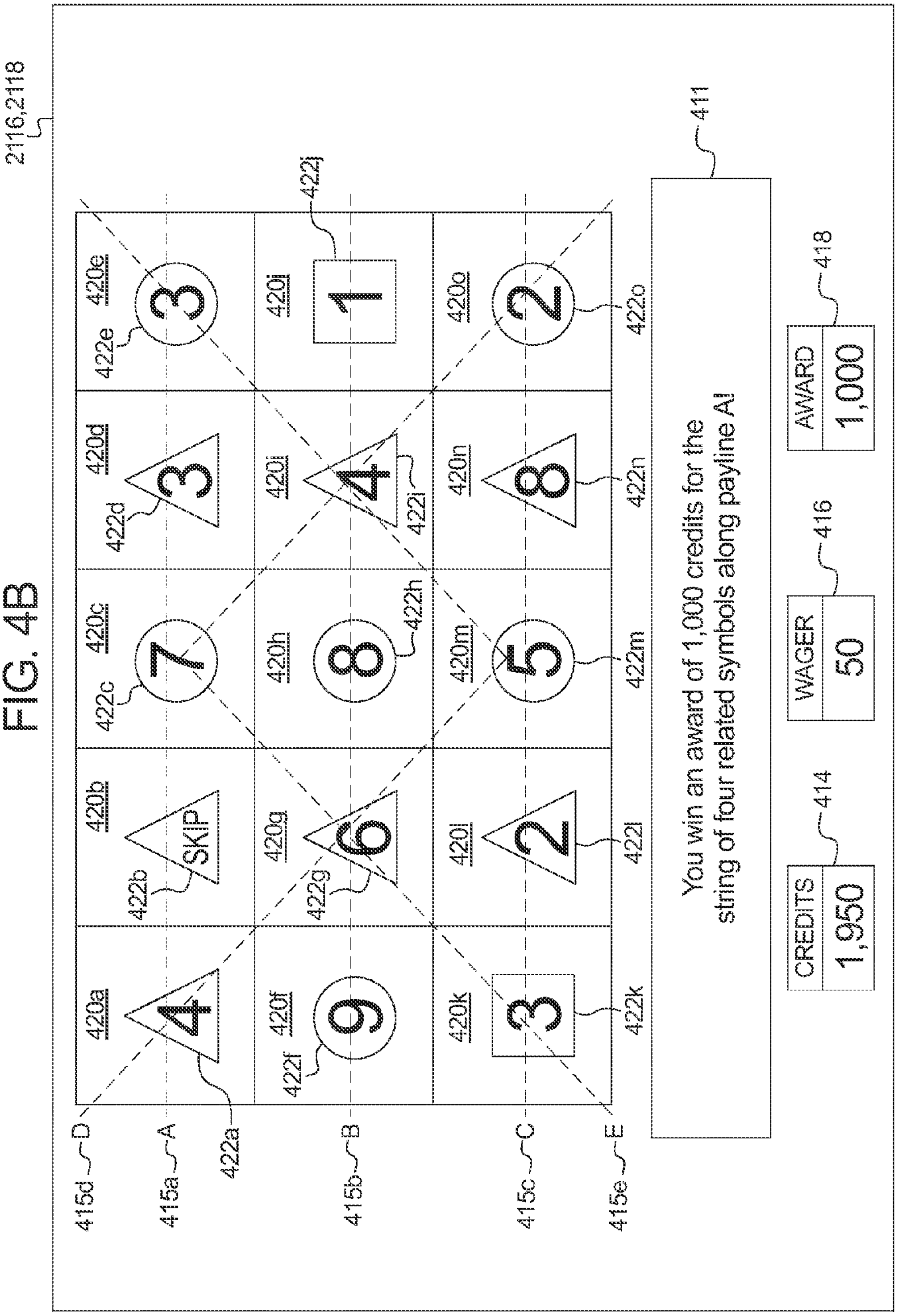

FIG. 4B illustrates a screen shot of an example of such an embodiment of the gaming system of the present disclosure. In this example, the gaming system is configured to operate a primary slot-type wagering game associated with a plurality of symbols as described above with respect to FIG. 2. In this example, the plurality of symbols includes a plurality of skip symbols that are each associated with a different one of the set of shapes.

As illustrated in FIG. 4B, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed, among other symbols:

(a) symbol 422*a*, which is associated with the number 4 and the square shape, at symbol display area 420*a;*

(b) skip symbol 422*b*, which is associated with the triangle shape, at symbol display area 420*b;*

(c) symbol 422*c*, which is associated with the number 7 and the circle shape, at symbol display area 420*c;*

(d) symbol 422*d*, which is associated with the number 3 and the triangle shape, at symbol display area 420*d*; and (e) symbol 422*e*, which is associated with the number 3 and the circle shape, at symbol display area 420*e*.

In this example, when a skip symbol is displayed along the payline path associated with a wagered-on payline, the gaming system disregards and does not evaluate the symbol displayed along that payline path immediately to the right of that displayed skip symbol when determining whether a set of the symbols displayed along that payline path forms a string of related symbols. Thus, in this example, when determining whether a set of the symbols displayed along the payline path associated with payline A formed a string of related symbols, the gaming system disregarded and did not evaluate symbol 422*c* because it was displayed immediately to the right of skip symbol 422*b*.

It should be appreciated that, in various embodiments, when a skip symbol is displayed along the payline path associated with a payline, the gaming system disregards and does not evaluate one or more of: (a) the symbol displayed along the payline path immediately to the right of that displayed symbol (as in this example); (b) the symbol displayed along the payline path immediately to the left of that displayed symbol; (c) a randomly determined one of the symbols displayed along the payline path; (d) a predetermined one of the symbols displayed along the payline path; (e) a player-selected one of the symbols displayed along the payline path; (f) one of the symbols displayed along the payline path associated with a different payline: (g) one of the symbols displayed along the payline path associated with a different payline that passes through the skip symbol; and (h) any symbols displayed along the payline path in the direction of evaluation that do not share at least one characteristic with the skip symbol (i.e., evaluation is suspended until a symbol along the payline path shares at least one characteristic with the skip symbol). In one example of embodiment (h), when the skip symbol has a circle characteristic, the gaming system skips all symbols to the right of that skip symbol along the payline path until a symbol along the payline path (if any) has the circle characteristic.

In this example, the gaming system determined that a set of four symbols 422*a*, 422*b*, 422*d*, and 422*e* displayed along the payline path associated with payline A formed a string of related symbols along the payline path associated with payline A. Specifically, the gaming system determined that each of symbols 422*a*, 422*b*, 422*d*, and 422*e* of the set was related to at least one other symbol of the set displayed adjacent to that displayed symbol. That is, the gaming system determined that each of symbols 422*a*, 422*b*, 422*d*, and 422*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that:

(a) symbol 422_a_ shared the triangle shape with adjacently displayed skip symbol 422_b;_

(b) skip symbol 422_b_ shared the triangle shape with adjacently displayed symbol 422_d_; and (c) symbol 422_d_ shared the number 3 with adjacently displayed symbol 422_e._

It should be appreciated that because skip symbol 422_b_ caused the gaming system to disregard and not evaluate symbol 422_c_ when determining whether a set of the symbols displayed along the payline path associated with payline A formed a string of related symbols, symbol 422_b_ and symbol 422_d_ were considered adjacent, consecutively displayed symbols for award determination purposes.

Accordingly, the gaming system determined an award associated with payline A based on the quantity of four symbols included in the string of related symbols displayed along the payline path associated with payline A. In this example, the gaming system determined an award of 1,000 credits associated with payline A (according to the paytable described above in conjunction with FIG. 2).

In certain embodiments, the plurality of symbols includes one or more wild symbols. In these embodiments, the wild symbols are associated with each characteristic of each of the different sets of characteristics such that a displayed wild symbol will relate to any adjacently displayed symbol. That is, in operation, each wild symbol acts as the symbol that would most benefit the player in a given situation. It should be appreciated that, in certain embodiments, for a play of the game, a single wild symbol may act as a first symbol during the evaluation of a first payline, and may act as a second different symbol during the evaluation of a second different payline.

Figure 5:
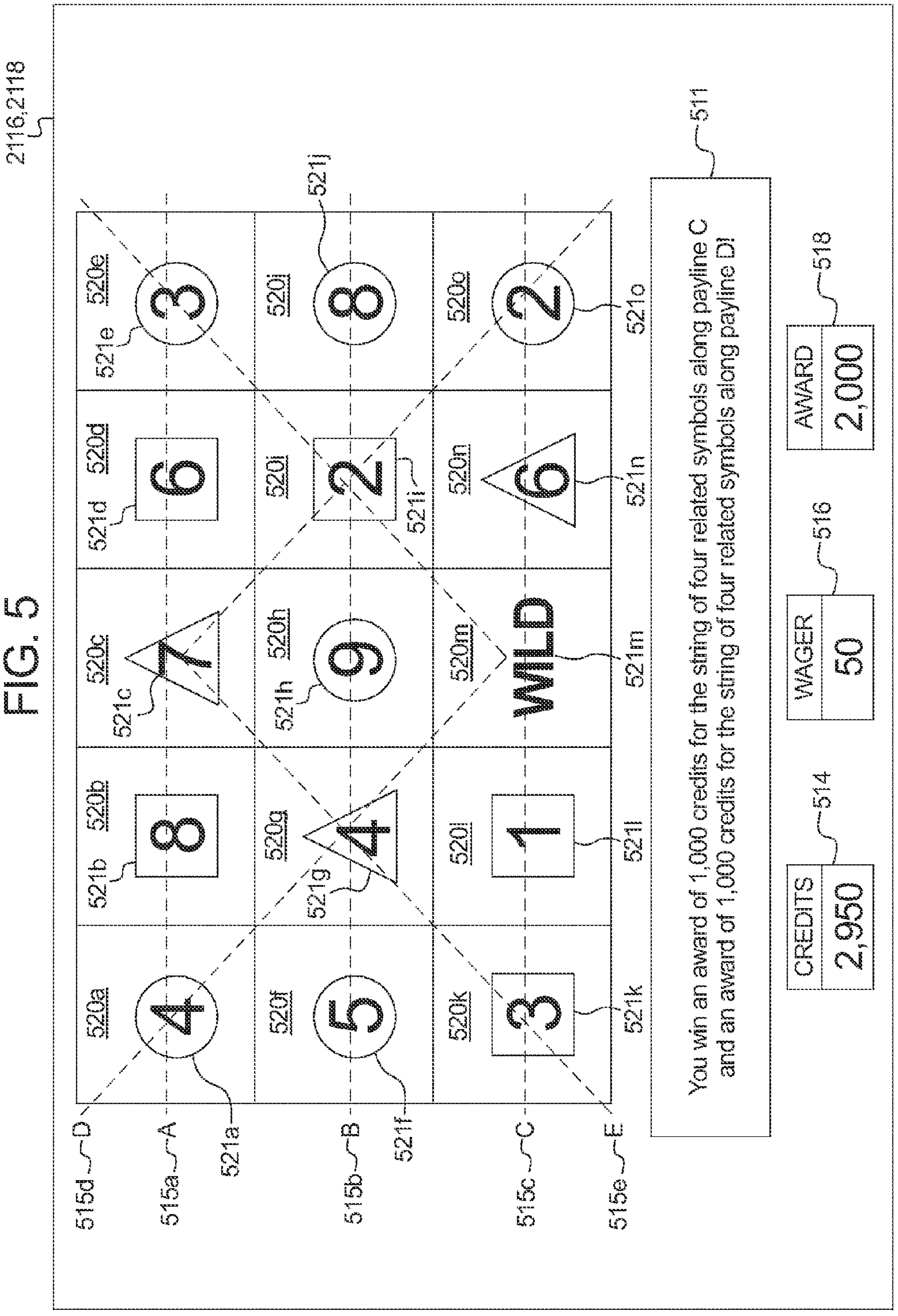
FIG. 5 illustrates a screen shot of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including wild symbols.

FIG. 5 illustrates a screen shot of an example of such an embodiment of the gaming system of the present disclosure. In this example, the gaming system is configured to operate a primary slot-type wagering game associated with a plurality of symbols as described above with respect to FIG. 2. In this example, the plurality of symbols includes a wild symbol that is associated with each of the set of numbers (i.e., the set of first characteristics in this example) and each of the set of shapes (i.e., the set of second characteristics in this example).

As illustrated in FIG. 5, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed:

(a) symbol 521_a_, which is associated with the number 4 and the circle shape, at symbol display area 520_a;_

(b) symbol 521_b_, which is associated with the number 8 and the square shape, at symbol display area 520_b;_

(c) symbol 521_c_, which is associated with the number 7 and the triangle shape, at symbol display area 520_c;_

(d) symbol 521_d_, which is associated with the number 6 and the square shape, at symbol display area 520_d;_

(e) symbol 521_e_, which is associated with the number 3 and the circle shape, at symbol display area 520_e;_

(f) symbol 521_f_, which is associated with the number 5 and the circle shape, at symbol display area 520_f;_

(g) symbol 521_g_, which is associated with the number 4 and the triangle shape, at symbol display area 520_g;_

(h) symbol 521_h_, which is associated with the number 9 and the circle shape, at symbol display area 520_h;_

(i) symbol 521_i_, which is associated with the number 2 and the square shape, at symbol display area 520_i;_

(j) symbol 521_j_, which is associated with the number 8 and the circle shape, at symbol display area 520_j;_

(k) symbol 521_k_, which is associated with the number 3 and the square shape, at symbol display area 520_k;_

(l) symbol 521_l_, which is associated with the number 1 and the square shape, at symbol display area 520_l;_

(m) wild symbol 521_m_, which is associated with each of the set of numbers and each of the set of shapes, at symbol display area 520_m;_

(n) symbol 521_n_, which is associated with the number 6 and the triangle shape, at symbol display area 520_n_; and (o) symbol 521_o_, which is associated with the number 2 and the circle shape, at symbol display area 520_o._

Turning to payline C, in this example, the gaming system determined that a set of four symbols 521_k_, 521_l_, 521_m_, and 521_n_ displayed along the payline path associated with payline C formed a string of related symbols along the payline path associated with payline C. Specifically, the gaming system determined that each of symbols 521_k_, 521_l_, 521_m_, and 521_n_ of the set was related to at least one other symbol of the set displayed adjacent to that displayed symbol. That is, the gaming system determined that each of symbols 521_k_, 521_l_, 521_m_, and 521_n_ of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline C from left to right and determined that:

(a) symbol 521_k_ shared the square shape with adjacently displayed symbol 521_l;_

(b) symbol 521_l_ shared either the number 1 or the circle shape with adjacently displayed wild symbol 521_m;_

(c) wild symbol 521_m_ shared either the number 6 or the triangle shape with adjacently displayed symbol 521_n_; and (d) symbol 521_n_ did not share a same one of the set of numbers or the set of shapes with adjacently displayed symbol 521_o_, at which point the gaming system stopped evaluating the symbols displayed along the payline path associated with payline C.

As explained above, in this example, when the wild symbol is included in a string of related symbols, the wild symbol acts as whichever symbol most benefits the player. In this example, wild symbol 521_m_ acts as either: (a) a symbol associated with the number 1 and the triangle shape, or (b) a symbol associated with the number six and the square shape such that wild symbol 521_m_ relates to both symbols displayed adjacent to it along the payline path associated with payline C (i.e., symbols 521_l_ and 521_n_ in this example). Accordingly, the gaming system determined an award associated with payline C based on the quantity of four symbols in the string or related symbols displayed along the payline path associated with payline C. In this example, the gaming system determines an award of 1,000 credits associated with payline C (according to the paytable described above in conjunction with FIG. 2).

Turning to payline D, in this example, the gaming system determined that a set of four symbols 521_a_, 521_g_, 521_m_, and

521*i* displayed along the payline path associated with payline D formed a string of related symbols along the payline path associated with payline D. Specifically, the gaming system determined that each of symbols 521*a*, 521*g*, 521*m*, and 521*i* of the set was related to at least one other symbol of the set displayed adjacent to that displayed symbol. That is, the gaming system determined that each of symbols 521*a*, 521*g*, 521*m*, and 521*i* of the set shared at least one of: (a) a same one of the set of numbers (i.e., a same one of the set of first characteristics): and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline D from left to right and determined that:

(a) symbol 521*a* shared the number 4 with adjacently displayed symbol 521*g;*

(b) symbol 521*g* shared either the number 4 or the triangle shape with adjacently displayed wild symbol 521*m;*

(c) wild symbol 521*m* shared either the number 2 or the square shape with adjacently displayed symbol 521*i*; and (d) symbol 521*i* did not share a same one of the set of first or second characteristics with adjacently displayed symbol 521*e*, at which point the gaming system stopped evaluating the symbols displayed along the payline path associated with payline D.

As explained above, in this example, when the wild symbol is included in a string of related symbols, the wild symbol acts as whichever symbol most benefits the player. In this example, wild symbol 521*m* acts as either: (a) a symbol associated with the number 2 and the triangle shape, or (b) a symbol associated with the number 4 and the square shape such that wild symbol 521*m* relates to both symbols displayed adjacent to it along the payline path associated with payline D (i.e., symbols 521*g* and 521*i* in this example). Accordingly, the gaming system determined an award associated with payline D based on the quantity of four symbols in the string or related symbols displayed along the payline path associated with payline D. In this example, the gaming system determines an award of 1,000 credits associated with payline D (according to the paytable described above in conjunction with FIG. 2).

In certain embodiments, the plurality of symbols includes one or more draw symbols. In these embodiments, each draw symbol is associated with a characteristic of each of one or more of the different sets of characteristics. Additionally, each draw symbol is associated with a draw count value. In one embodiment including a plurality of draw symbols having different draw count values, when one of the draw symbols is included in a string of related symbols displayed along the payline path associated with a payline, the gaming system adds the draw count value associated with that displayed draw symbol to the quantity of symbols included in the string of related symbols for award determination purposes. For example, if a draw symbol associated with a draw count value of five is included in a string of five related symbols displayed along the payline path associated with a payline, the gaming system considers the string to include ten related symbols for award determination purposes (i.e., five symbols included in the string plus the draw count value of five).

Figure 6:
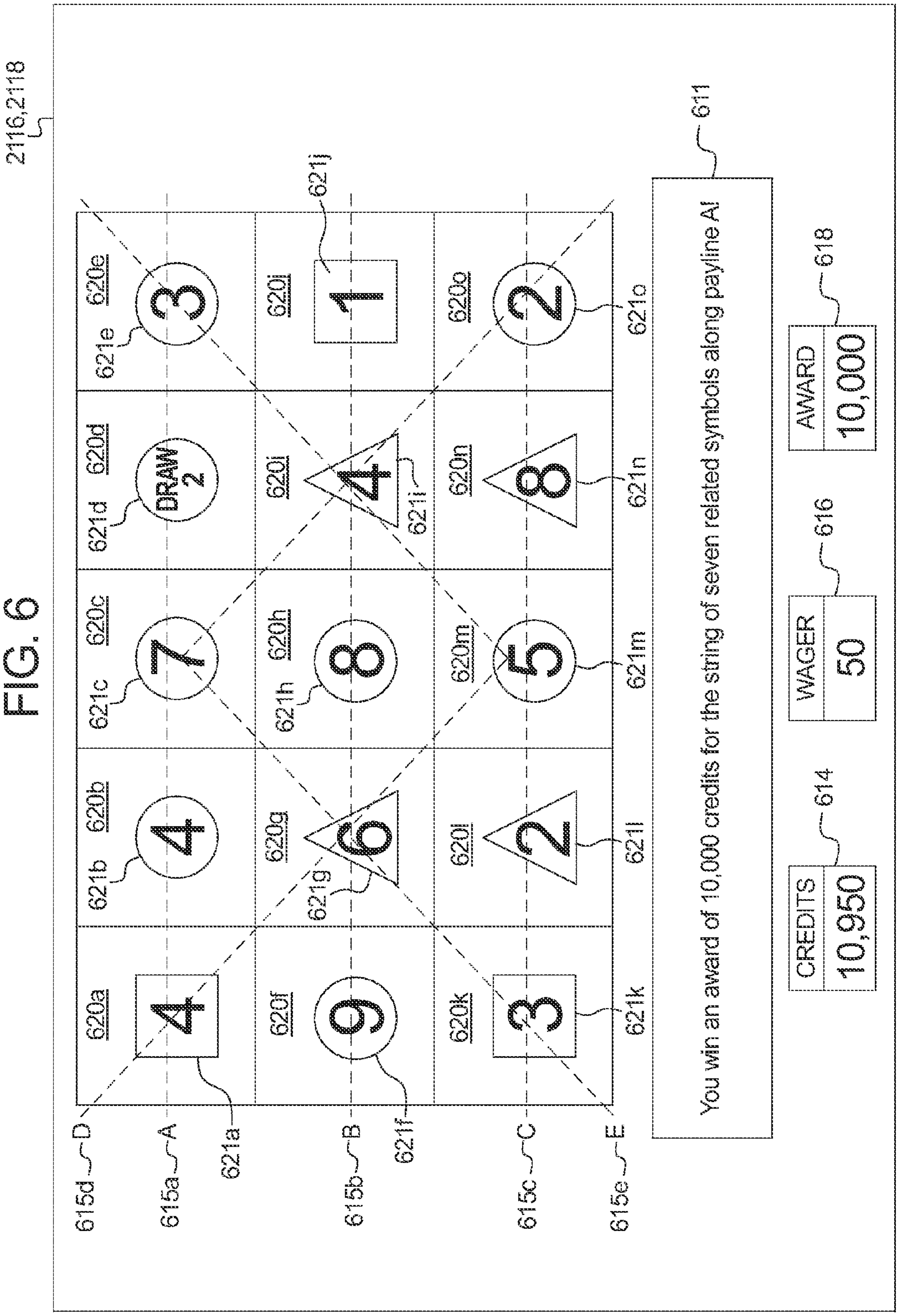
FIG. 6 illustrates a screen shot of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including draw symbols configured to increase the quantity of symbols in a string of related symbols.

FIG. 6 illustrates a screen shot of an example of such an embodiment of the gaming system of the present disclosure. In this example, the gaming system is configured to operate a primary slot-type wagering game associated with a plurality of symbols as described above with respect to FIG. 2. In this example, the plurality of symbols includes a plurality of draw symbols that are each associated with: (a) one of the set of shapes (i.e., the set of second characteristics in this example); and (b) a different draw count value.

As illustrated in FIG. 6, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed, among other symbols:

(a) symbol 621*a*, which is associated with the number 4 and the square shape, at symbol display area 620*a;*

(b) symbol 621*b*, which is associated with the number 4 and the circle shape, at symbol display area 620*b;*

(c) symbol 621*c*, which is associated with the number 7 and the circle shape, at symbol display area 620*c;*

(d) draw symbol 621*d*, which is associated with the circle shape and a draw count value of two, at symbol display area 620*d*; and (e) symbol 621*e*, which is associated with the number 3 and the circle shape, at symbol display area 620*e*.

Turning to payline A, in this example, the gaming system determined that a set of five symbols 621*a*, 621*b*, 621*c*, 621*d*, and 621*e* displayed along the payline path associated with payline A formed a string of related symbols along the payline path associated with payline A. Specifically, the gaming system determined that each of symbols 621*a*, 621*b*, 621*c*, 621*d*, and 621*e* of the set was related to at least one other symbol of the set displayed adjacent to that displayed symbol. That is, the gaming system determined that each of symbols 621*a*, 621*b*, 621*c*, 621*d*, and 621*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that;

(a) symbol 621*a* shared the number 4 with adjacently displayed symbol 621*b;*

(b) symbol 621*b* shared the circle shape with adjacently displayed symbol 621*c;*

(c) symbol 621*c* shared the circle shape with adjacently displayed draw symbol 621*d*; and (d) draw symbol 621*d* shared the circle shape adjacently displayed symbol 621*e*.

As explained above, in this example, when the draw symbol is included in a string of related symbols displayed along the payline path associated with a payline, the gaming system adds the draw count value associated with that displayed draw symbol to the quantity of symbols included in the string of related symbols. Thus, in this example, the gaming system determined and provided an award for payline A based on a related symbol string length of seven (i.e., five symbols in the string plus the draw count value of two associated with draw symbol 621*d*). Accordingly, the gaming system determined and displayed an award of 10,000 credits associated with the related symbol string length of seven associated with the string of related symbols displayed along the payline path associated with payline A.

In certain embodiments, the gaming system adds the draw count value associated with a draw symbol displayed along the payline path associated with a payline to the quantity of symbols included in any string of related symbols displayed along the payline path associated with that payline regardless of whether that draw symbol is included in that string of related symbols.

In other embodiments, for a play of the primary wagering game, the gaming system sums the draw count values associated with each displayed draw symbol that is included in a string of related symbols. In these embodiments, the gaming system creates a bonus payline including a bonus payline path extending along a quantity of bonus symbol display areas, wherein the quantity of bonus symbol display areas is equal to the sum of the draw count values. The gaming system generates and displays a plurality of the symbols at the bonus symbol display areas, and evaluates the bonus payline in one of the manners described above. It should be appreciated that, in one embodiment, the gaming system sums the draw count values associated with each displayed draw symbol regardless of whether those draw symbols are included in any strings of related symbols.

In certain embodiments, for a play of the primary wagering game, the gaming system sums the draw count values associated with each displayed draw symbol that is included in a string of related symbols. In these embodiments, the gaming system adds the sum of the draw count values to an accumulator value. When the accumulator value reaches a target accumulator value, the gaming system provides an additional award opportunity, such as a play of a bonus game. It should be appreciated that, in one embodiment, the gaming system sums the draw count values associated with each displayed draw symbol regardless of whether those draw symbols are included in any strings of related symbols.

In further embodiments, for a play of the primary wagering game, the gaming system sums the draw count values associated with each displayed draw symbol that is included in a string of related symbols. In these embodiments, the gaming system adds the sum of the draw count values to an accumulator value. When the accumulator value reaches a target accumulator value that is equal to a quantity of bonus symbol display areas in a bonus matrix, the gaming system triggers a play of a bonus game employing the bonus matrix. In one example, the bonus game includes fifteen bonus symbol display areas arranged in a 3×5 bonus matrix. In this example, when the accumulator value reaches fifteen (i.e., the total quantity of bonus symbol display areas in the bonus matrix), the gaming system initiates a play of the bonus game employing the bonus matrix. It should be appreciated that, in one embodiment, the gaming system sums the draw count values associated with each displayed draw symbol regardless of whether those draw symbols are included in any strings of related symbols.

In certain embodiments, a draw symbol is combined with a wild symbol to form a wild/draw symbol that is associated with: (a) each characteristic of each of the different sets of characteristics, and (b) a draw count value.

In one embodiment including a plurality of draw symbols having different draw count values, when one of the draw symbols is included in a string of related symbols displayed along the payline path associated with a payline, the gaming system adds a quantity of symbols equal to the draw count value associated with the displayed draw symbol to the payline path associated with that payline. For example, if a draw symbol associated with a draw count value of five is included in a string of five related symbols displayed along the payline path associated with a payline, the gaming system adds five additional symbols along the payline path associated with that payline and evaluates those additional symbols to determine whether they extend the string of related symbols.

Figure 7A:
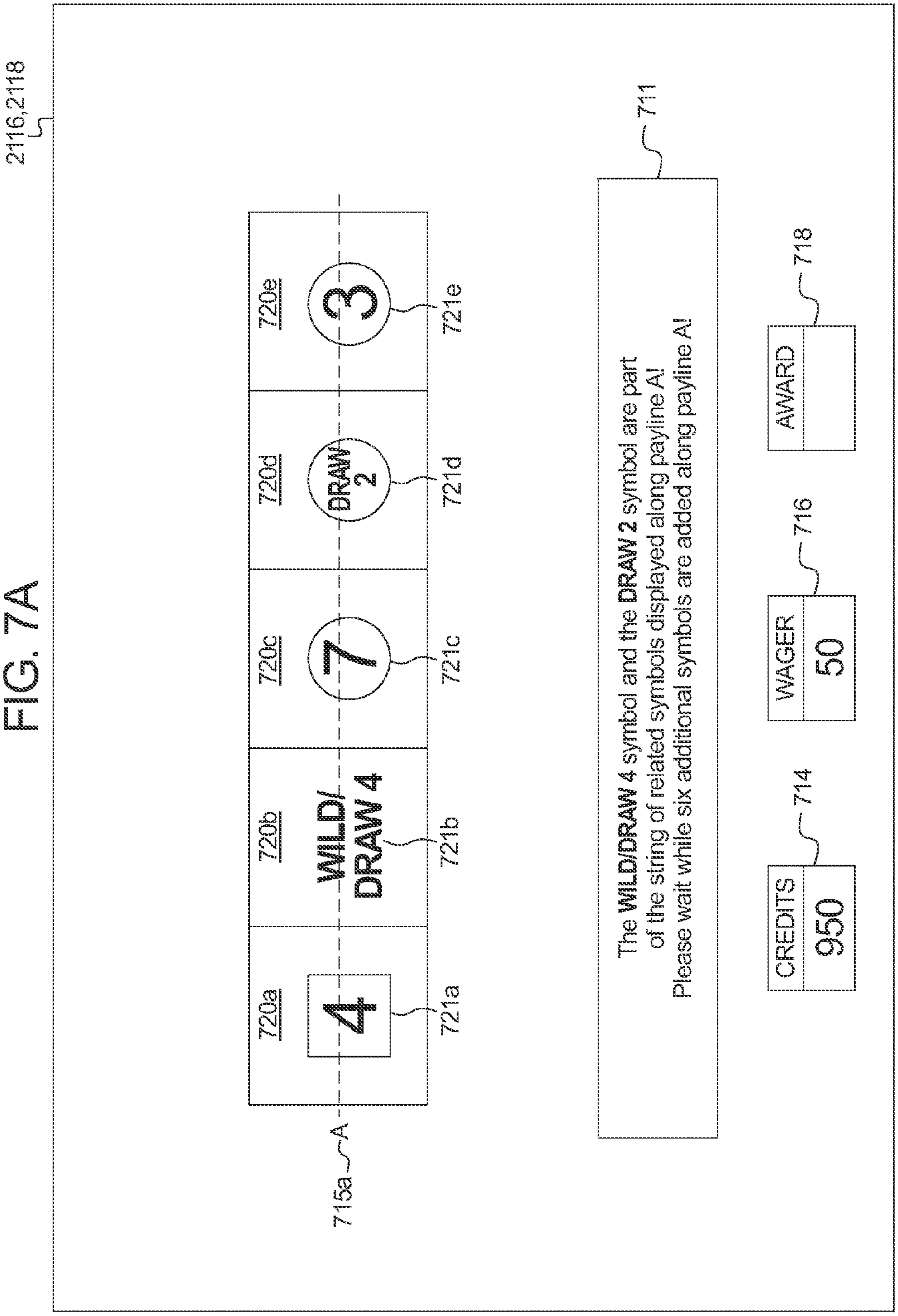
FIGS. 7A and 7B illustrate screen shots of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including draw symbols configured to cause the gaming system to generate and display additional symbols along the payline path associated with a payline.
Figure 7B:
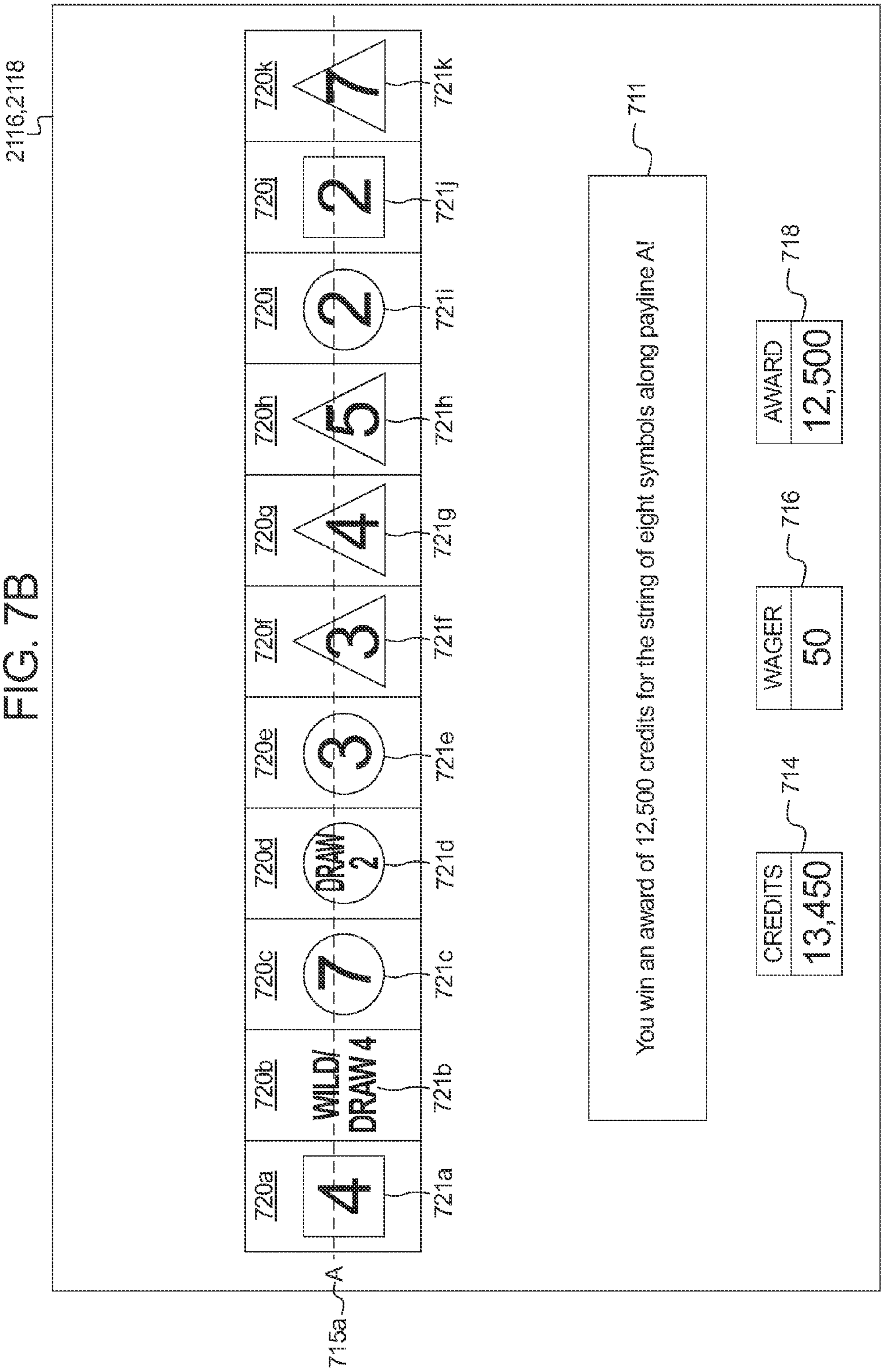

FIGS. 7A and 7B illustrate screen shots of an example of such an embodiment of the gaming system of the present disclosure. In this example, the gaming system is configured to operate a primary slot-type wagering game associated with a plurality of symbols as described above with respect to FIG. 2. In this example, the primary wagering game is associated with a single payline, payline A. In this example, the plurality of symbols includes: (a) a plurality of draw symbols that are each associated with: (i) one of the set of shapes; and (ii) a different draw value, and (b) a plurality of wild/draw symbols that are each associated with: (i) each of the set of shapes; (ii) each of the set of numbers; and (iii) a different draw count value.

As illustrated in FIG. 1A, upon initiation of a play of the primary wagering game for the maximum wager of 50 credits (i.e., a 50 credit wager on the single payline), the gaming system determined and displayed an outcome for the play of the primary wagering game by generating and displaying a plurality of the symbols at the symbol display areas. Specifically, the gaming system generated and displayed:

(a) symbol 721*a*, which is associated with the number 4 and the square shape, at symbol display area 720*a;*

(b) wild/draw symbol 721*b*, which is associated with each of the numbers, each of the shapes, and a draw count value of four, at symbol display area 720*b;*

(c) symbol 721*c*, which is associated with the number 7 and the circle shape, at symbol display area 720*c;*

(d) draw symbol 721*d*, which is associated with the circle shape and a draw count value of two, at symbol display area 720*d;*

(e) symbol 721*e*, which is associated with the number 3 and the circle shape, at symbol display area 720*e*.

Turning to payline A, in this example, the gaming system determined that a set of five symbols 721*a*, 721*b*, 721*c*, 721*d*, and 721*e* displayed along the payline path associated with payline A formed a string of related symbols along the payline path associated with payline A. Specifically, the gaming system determined that each of symbols 721*a*, 721*b*, 721*c*, 721*d*, and 721*e* of the set was related to at least one other symbol of the set displayed adjacent to that displayed symbol. That is, the gaming system determined that each of symbols 721*a*, 721*b*, 721*c*, 721*d*, and 721*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that:

(a) symbol 721*a* shared either the number 4 or the square shape with adjacently displayed wild/draw symbol 721*b;*

(b) wild/draw symbol 721*b* shared either the number 7 or the circle shape with adjacently displayed symbol 721*c;*

(c) symbol 721*c* shared the circle shape with adjacently displayed draw symbol 721*d*; and (d) draw symbol 721*d* shared the circle shape with adjacently displayed symbol 721*e*.

As explained above, in this example, when the draw symbol is included in a string of related symbols displayed along the payline path associated with a payline, the gaming system adds a quantity of symbols equal to the draw count value associated with the displayed draw symbol along the payline path associated with that payline. In this example, wild/draw symbol 721*b* is associated with a draw count value of four and draw symbol 721*d* is associated with a draw count value of two. Thus, in this example, the gaming system adds six symbols along the payline path associated with payline A.

FIG. 7B illustrates the symbols added due to the inclusion of wild/draw symbol 721*b* and draw symbol 721*d* in the string of related symbols displayed along the payline path associated with payline A. Specifically, the gaming system generated and displayed:

(a) symbol 721*f*, which is associated with the number 3 and the triangle shape, at symbol display area 720*f;*

(b) wild/draw symbol 721*g*, which is associated with the number 4 and the triangle shape, at symbol display area 720*g;*

(c) symbol 721*h*, which is associated with the number 5 and the triangle shape, at symbol display area 720*h;*

(d) draw symbol 721*i*, which is associated with the number 2 and the circle shape, at symbol display area 720*i;*

(e) symbol 721*j*, which is associated with the number 2 and the square shape, at symbol display area 720*j*; and (f) symbol 721*k*, which is associated with the number 7 and the triangle shape, at symbol display area 720*k.*

After adding these additional symbols, the gaming system evaluated the symbols to determine whether to extend the string of related symbols displayed along the payline path associated with payline A. More particularly, the gaming system evaluated the additional symbols displayed along the payline path associated with payline A from left to right and determined that:

(a) symbol 721*e* shared the number 3 with adjacently displayed symbol 721*f;*

(b) symbol 721*f* shared the triangle shape with adjacently displayed symbol 721*g*; and (c) symbol 721*g* did not share a same one of the set of numbers or the set of shapes with adjacently displayed symbol 721*h*, at which point the gaming system stopped evaluating the symbols displayed along the payline path associated with payline A.

Thus, in this example, the additional symbols added along the payline path associated with payline A caused three additional symbols to be added to the string of related symbols displayed along the payline path associated with payline A. That is, in this example, the string of related symbols displayed along payline A included eight symbols. Accordingly, the gaming system determined and displayed an award of 12,500 credits associated with the related symbol string length of eight associated with the string of related symbols displayed along the payline path associated with payline A.

In certain embodiments, when one of the additional symbols added along the payline path associated with a payline is itself a draw symbol, if that draw symbol is included in a string of related symbols, the gaming system adds a quantity of symbols equal to the draw count value associated with that displayed draw symbol to the payline path associated with that payline.

Figure 8A:
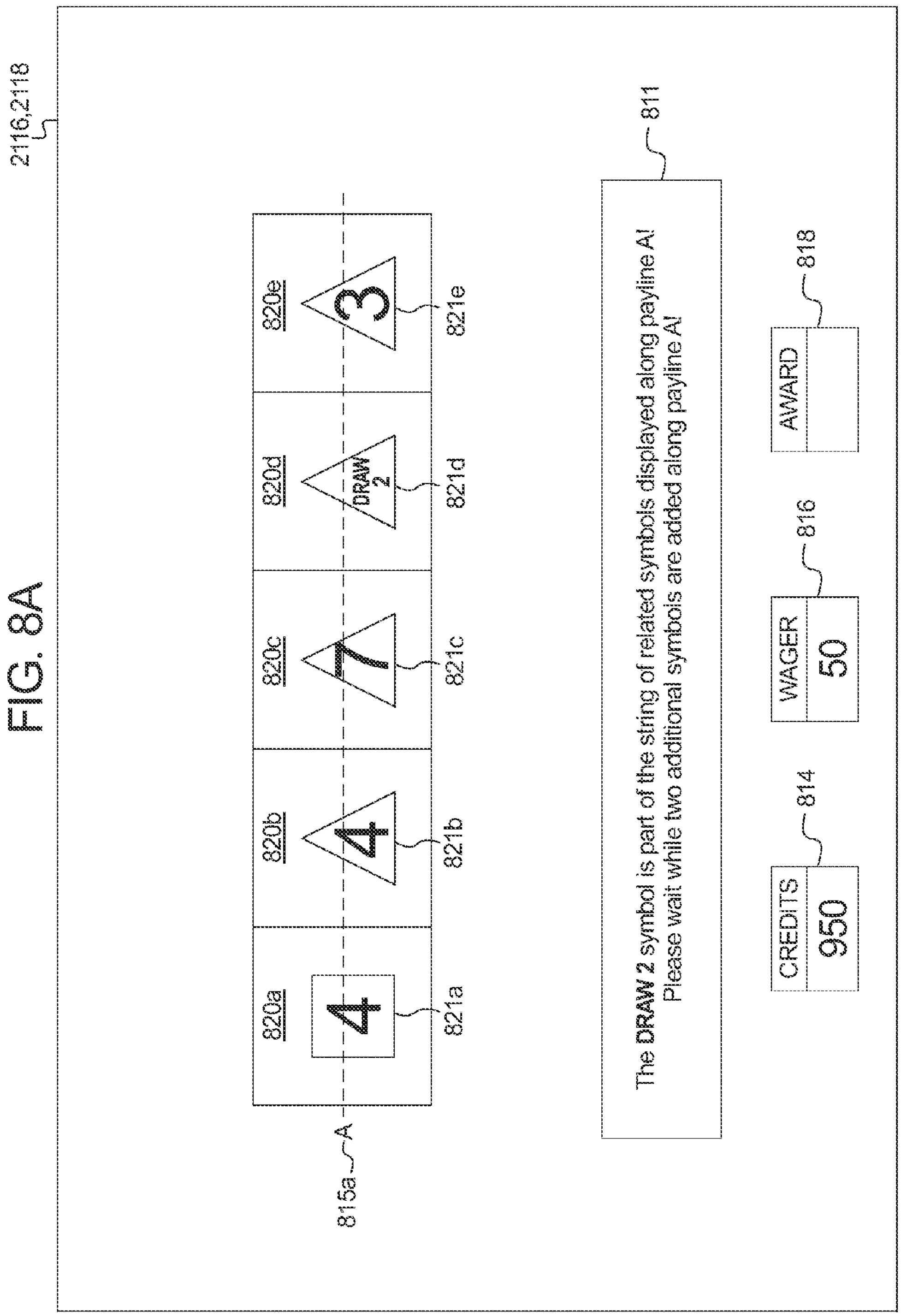
FIGS. 8A, 8B, and 8C illustrate screen shots of an example embodiment of the gaming system of the present disclosure configured to operate a slot-type game in which one or more awards are determined based on quantities of symbols included in one or more strings of related symbols displayed along one or more paylines; wherein the slot-type game is associated with a plurality of symbols including draw symbols configured to cause the gaming system to generate and display additional symbols along the payline path associated with a payline.
Figure 8B:
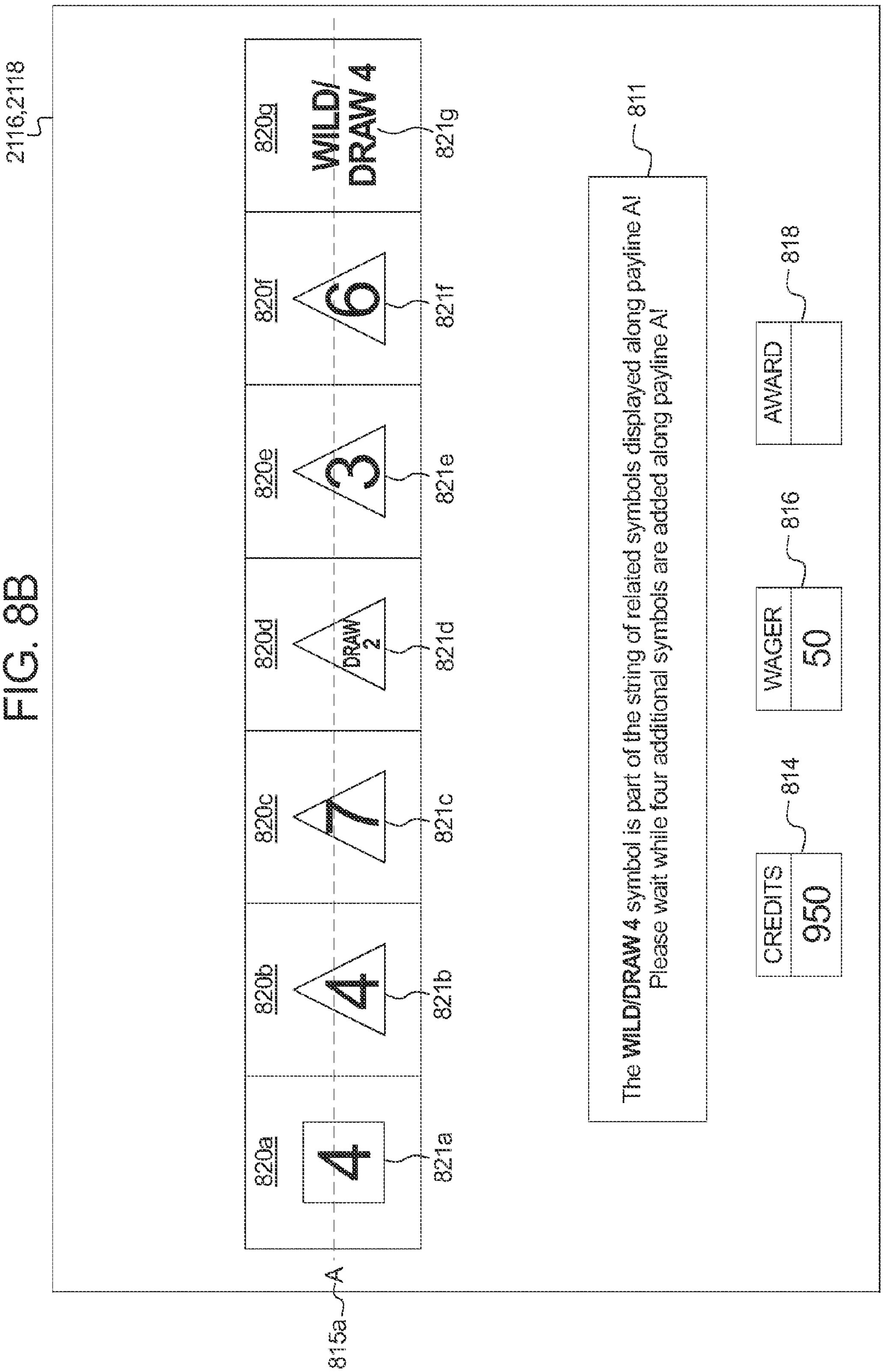
Figure 8C:
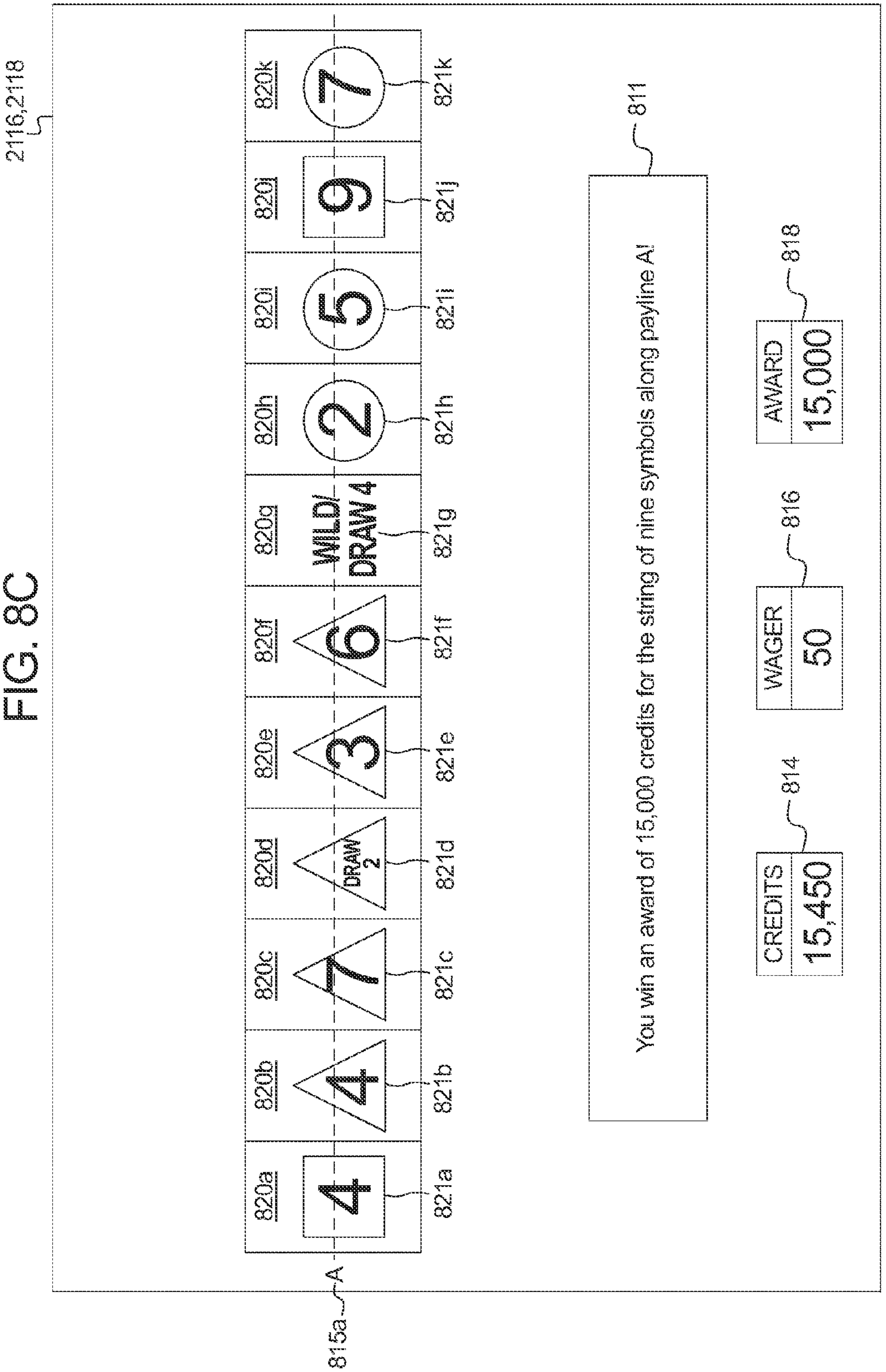

FIGS. 8A, 8B, and 8C illustrate screen shots of an example of such an embodiment of the gaming system of the present disclosure. In this example, the gaming system is configured to operate a primary slot-type wagering game associated with a plurality of symbols as described above with respect to FIG. 2. In this example, the primary wagering game is associated with a single payline, payline A. In this example, the plurality of symbols includes: (a) a plurality of draw symbols that are each associated with: (i) one of the set of shapes; and (ii) a different draw value, and (b) a plurality of wild/draw symbols that are each associated with: (i) each of the set of shapes; (ii) each of the set of numbers; and (iii) a different draw count value.

As illustrated in FIG. 8A, upon initiation of a play of the primary wagering game for the maximum wager of 50 credits (i.e., a 50 credit wager on the single payline), the gaming system determined and displayed an outcome for the play of the primary wagering game by generating and displaying a plurality of the symbols at the symbol display areas. Specifically, the gaming system generated and displayed:

(a) symbol 821*a*, which is associated with the number 4 and the square shape, at symbol display area 820*a;*

(b) symbol 821*b*, which is associated with the number 4 and the triangle shape, at symbol display area 820*b;*

(c) symbol 821*c*, which is associated with the number 7 and the triangle shape, at symbol display area 820*c;*

(d) draw symbol 821*d*, which is associated with the triangle shape and a draw count value of two, at symbol display area 820*d*; and (e) symbol 821*e*, which is associated with the number 3 and the triangle shape, at symbol display area 820*e.*

Turning to payline A, in this example, the gaming system determined that a set of five symbols 821*a*, 821*b*, 821*c*, 821*d*, and 821*e* displayed along the payline path associated with payline A formed a string of related symbols along the payline path associated with payline A. Specifically, the gaming system determined that each of symbols 821*a*, 821*b*, 821*c*, 821*d*, and 821*e* of the set was related to at least one other symbol of the set displayed adjacent to that displayed symbol. That is, the gaming system determined that each of symbols 821*a*, 821*b*, 821*c*, 821*d*, and 821*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that:

(a) symbol 821*a* shared the number 4 with adjacently displayed symbol 821*b;*

(b) symbol 821*b* shared triangle shape with adjacently displayed symbol 821*c;*

(c) symbol 821*c* shared the triangle shape with adjacently displayed draw symbol 821*d*; and (d) draw symbol 821*d* shared the triangle shape with adjacently displayed symbol 821*e.*

As explained above, in this example, when a draw symbol is included in a string of related symbols displayed along the payline path associated with a payline, the gaming system adds a quantity of symbols equal to the draw count value associated with the displayed draw symbol along the payline path associated with that payline. In this example, draw symbol 821*d* is associated with a draw count value of two. Thus, in this example, the gaming system added two symbols along the payline path associated with payline A.

FIG. 8B illustrates the symbols added due to the inclusion of draw symbol 821*d* in the string of related symbols displayed along the payline path associated with payline A. Specifically, the gaming system generated and displayed:

(a) symbol 821*f*, which is associated with the number 6 and the triangle shape, at symbol display area 820*f*; and (b) wild/draw symbol 821*g*, which is associated with each of the numbers, each of the shapes, and a draw value count of four, at symbol display area 820*g.*

After adding such symbols, the gaming system evaluated the symbols to determine whether to extend the string of related symbols displayed along the payline path associated with payline A. More particularly, the gaming system evaluated the additional symbols displayed along the payline path associated with payline A from left to right and determined that:

(a) symbol 821*e* shared the triangle shape with adjacently displayed symbol 821*f*; and (b) symbol 821*f* shared either the number 6 or the triangle shape with wild/draw symbol 821*g*.

That is, the gaming system determined to add symbol 821*f* and wild/draw symbol 821*g* to the string of related symbols displayed along the payline path associated with payline A.

As explained above, in this example, when an additional symbol added along a payline path associated with a payline is a draw symbol, and that draw symbol is included in a string of related symbols, the gaming system adds a quantity of symbols equal to the draw count value associated with that displayed draw symbol along the payline path associated with that payline. In this example, wild/draw symbol 821*g*, which the gaming system added to the string of related symbols displayed along the payline path associated with payline A, is associated with a draw count value of four. Thus, in this example, the gaming system adds four more symbols along the payline path associated with payline A.

FIG. 8C illustrates the symbols added due to the inclusion of wild/draw symbol 821*g* in the string of related symbols displayed along the payline path associated with payline A. Specifically, the gaming system generated and displayed:

(a) symbol 821*h*, which is associated with the number 2 and the circle shape, at symbol display area 820*h*; and (b) symbol 821*i*, which is associated with the number 5 and the circle shape, at symbol display area 820*i*; and (c) symbol 821*j*, which is associated with the number 9 and the square shape, at symbol display area 820*j*; and (d) symbol 821*k*, which is associated with the number 7 and the circle shape, at symbol display area 820*k*; and After adding such symbols, the gaming system evaluated the symbols to determine whether to extend the string of related symbols displayed along the payline path associated with payline A. More particularly, the gaming system evaluated the additional symbols displayed along the payline path associated with payline A from left to right and determined that:

(a) wild/draw symbol 821*g* shared either the number 2 or the circle shape with adjacently displayed symbol 821*h;*

(b) symbol 821*h* shared the circle shape with adjacently displayed symbol 821*i*; and (c) symbol 821*i* did not did not share a same one of the set of numbers or the set of shapes with adjacently displayed symbol 821*j*, at which point the gaming system stopped evaluating the symbols displayed along the payline path associated with payline A.

Thus, in this example, the additional symbols added along the payline path associated with payline A caused a total of four additional symbols to be added to the string of related symbols displayed along the payline path associated with payline A. That is, in this example, the string of related symbols displayed along payline A included nine symbols. Accordingly, the gaming system determined and displayed an award of 15,000 credits associated with the related symbol string length of nine associated with the string of related symbols displayed along the payline path associated with payline A.

In another embodiment including a plurality of draw symbols having different draw values, when one of the draw symbols is included in a string of related symbols displayed along the payline path associated with a payline, the gaming system adds an additional column of symbol display areas to the matrix of symbol display areas, and generates and displays a quantity of symbols equal to the draw count value associated with the displayed draw symbol at the added symbol display areas. For example, if a draw symbol associated with a draw count value of two is included in a string of five related symbols displayed along a payline, the gaming system adds a column of symbol display areas to the matrix and displays two symbols at those symbol display areas.

Figure 9A:
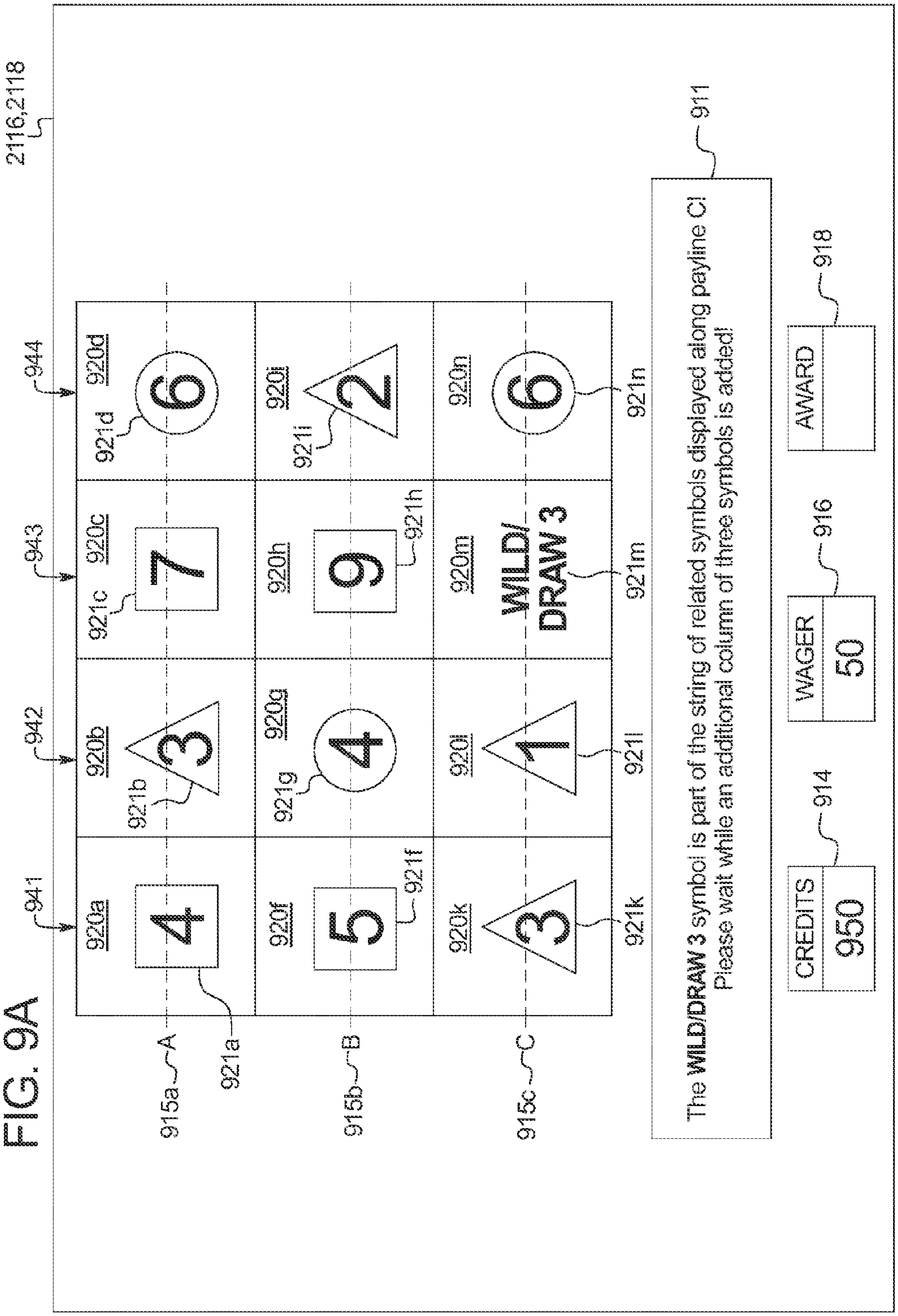
FIGS. 9A and 9B illustrate screen shots of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including draw symbols configured to cause the gaming system to add additional columns of symbol display areas.
Figure 9B:
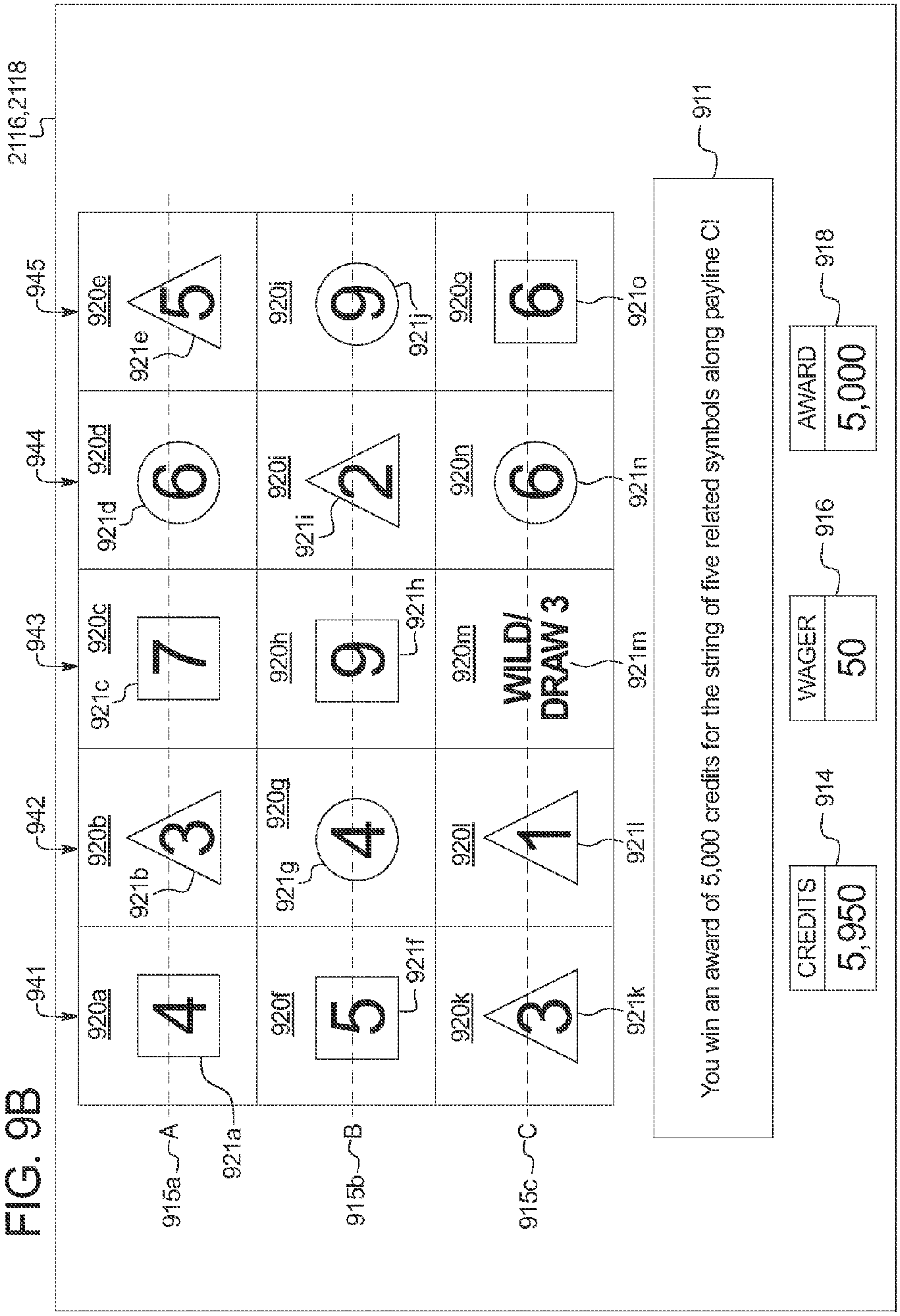

FIGS. 9A and 9B illustrate screen shots of an example of such an embodiment of the gaming system of the present disclosure. In this example, the gaming system is configured to operate a primary slot-type wagering game associated with a plurality of symbols as described above with respect to FIG. 2. In this example, the primary wagering game is associated with three paylines, paylines A, B, and C. Additionally, in this example, the matrix of symbol display areas is initially a 3×4 matrix rather than a 3×5 matrix. In this example, the plurality of symbols includes: (a) a plurality of draw symbols that are each associated with: (i) one of the set of shapes; and (ii) a different draw value, and (b) a plurality of wild/draw symbols that are each associated with: (i) each of the set of shapes; (ii) each of the set of numbers; and (iii) a different draw count value.

As illustrated in FIG. 9A, upon initiation of a play of the primary wagering game for the maximum wager of 50 credits, the gaming system determined and displayed an outcome for the play of the primary wagering game by generating and displaying a plurality of the symbols at the symbol display areas. Specifically, the gaming system generated and displayed, among other symbols:

(a) symbol 921*k*, which is associated with the number 3 and the triangle shape, at symbol display area 920*k;*

(b) symbol 921*l*, which is associated with the number one and the triangle shape, at symbol display area 920*l;*

(c) wild/draw symbol 921*m*, which is associated with each of the numbers, each of the shapes, and a draw count value of three, at symbol display area 920*m*; and (d) symbol 921*n*, which is associated with the number 6 and the circle shape, at symbol display area 920*n*.

Turning to payline C, in this example, the gaming system determined that a set of four symbols 921*k*, 921*l*, 921*m*, and 921*n* displayed along the payline path associated with payline C formed a string of related symbols along the payline path associated with payline C. Specifically, the gaming system determined that each of symbols 921*k*, 921*l*, 921*m*, and 921*n* of the set was related to at least one other symbol of the set displayed adjacent to that displayed symbol. That is, the gaming system determined that each of symbols 921*k*, 921*l*, 921*m*, and 921*n* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline C from left to right and determined that:

(a) symbol 921*k* shared the triangle shape with adjacently displayed symbol 921*l;*

(b) symbol 921*l* shared either the number 1 or the triangle shape with adjacently displayed wild/draw symbol 921*m*; and (c) wild/draw symbol 921*m* shared either the number 6 or the circle shape with adjacently displayed symbol 921*n*.

As explained above, in this example, when one of the draw symbols is included in a string of related symbols displayed along the payline path associated with a payline, the gaming system adds an additional column of symbol display areas to the matrix of symbol display areas, and generates and displays a quantity of symbols equal to the draw count value associated with the displayed draw symbol at the added symbol display areas. In this example, wild/draw symbol 921*m* is associated with a draw count value of three. Thus, in this example, the gaming system adds a column of symbol display areas to the 3×4 matrix to form a 3×5 matrix of symbol display areas, and generates and displays three symbols at those newly added symbol display areas.

FIG. 9B illustrates a column 945 of symbol display areas 920*e*, 920*j*, and 920*o* added due to the inclusion of wild/draw symbol 921*m* in the string of related symbols displayed along the payline path associated with payline C. The gaming system generated and displayed three symbols, one at each of the added symbol display areas. Specifically, the gaming system generated and displayed:

(a) symbol 921*e*, which is associated with the number 5 and the triangle shape, at symbol display area 920*e;*

(b) symbol 921*j*, which is associated with the number 9 and the circle shape, at symbol display area 920*j*; and (c) symbol 921*o*, which is associated with the number 6 and the square shape, at symbol display area 920*o*.

After adding such symbol display areas and displaying such symbols, the gaming system evaluated the symbols to determine whether to extend the string of related symbols displayed along the payline path associated with payline C. More particularly, the gaming system evaluated the additional symbols displayed along the payline path associated with payline C from left to right and determined that symbol 921*n* shared the number 6 with adjacently displayed symbol 921*o*.

Thus, in this example, the addition of the additional column to the matrix and the additional symbols caused an additional symbol to be added to the string of related symbols displayed along the payline path associated with payline C. That is, in this example, the string of related symbols displayed along payline C included five symbols. Accordingly, the gaming system determined and displayed an award of 5,000 credits associated with the related symbol string length of five associated with the string of related symbols displayed along the payline path associated with payline C.

In another embodiment, when one of the draw symbols is included in a string of related symbols displayed along the payline path associated with a payline, the gaming system adds an additional row of symbol display areas to the matrix of symbol display areas, and generates and displays a quantity of symbols equal to the draw count value associated with the displayed draw symbol at the added symbol display areas.

In the embodiments in which the game is associated with one or more draw symbols that, when displayed, cause the gaming system to generate and display additional symbols, it should be appreciated that the additional symbols may be generated and displayed in any suitable manner. In certain such embodiments, the additional symbols are randomly determined, randomly determined from a weighted table, selected from an existing reel strip, or selected from a reel strip that is more beneficial to the player than a standard reel strip. In another such embodiment, the additional symbols are selected such that they share at least one characteristic with at least one of the displayed symbols.

In certain embodiments in which the game is associated with one or more draw symbols, when one of the draw symbols is displayed along the payline path associated with a wagered-on payline, the gaming system only executes the function associated with that displayed draw symbol if the player will win a higher or additional award associated with that function. For example, one of the draw symbols, when displayed along the payline path associated with a wagered-on payline, causes the gaming system to add additional symbols to the payline path. In this example, if such additional symbols will not increase the player's award or cause the player to be provided with an additional award (such as if a string of related symbols ends before the point at which the additional symbols will be added along the payline path), the gaming system does not generate and display any additional symbols.

In other such embodiments, the gaming system ensures that the player always wins a higher or additional award when a draw symbol is generated and displayed along the payline path associated with a wagered-on payline. For example, one of the draw symbols, when displayed along the payline path associated with a wagered-on payline, causes the gaming system to add additional symbols to the payline path. In this example, if such additional symbols will not increase the player's award or cause the player to be provided with an additional award (such as if a string of related symbols ends before the point at which the additional symbols will be added along the payline path), the gaming system triggers a bonus game in which the player wins an award.

In various embodiments, the plurality of symbols includes one or more skip/draw symbols. In these embodiments, each skip/draw symbol is associated with a characteristic or each of one or more of the different sets of characteristics. In one embodiment including the skip/draw symbol, when the skip/draw symbol is displayed along the payline path associated with a payline, the gaming system: (a) generates and displays one or more additional symbols at the end of the payline path associated with the payline, and (b) skips one or more the symbols after the skip/draw symbol. In one such embodiment, the gaming system skips all of the symbols after the skip/draw symbol and re-starts evaluation with the additional symbols generated and displayed as a result of the draw function.

In various embodiments, the plurality of symbols includes one or more reflector or reverse symbols. In these embodiments, each reflector symbol is associated with a characteristic of each of one or more of the different sets of characteristics. In one embodiment including the reflector symbol, when the reflector symbol is displayed along the payline path associated with a payline, the gaming system determines a reflected payline path associated with that payline, wherein the reflected payline path extends along that payline path to the displayed reflector symbol and back along that payline path. The gaming system then determines whether a set of the symbols displayed along that reflected payline path forms a string of related symbols.

Figure 10:
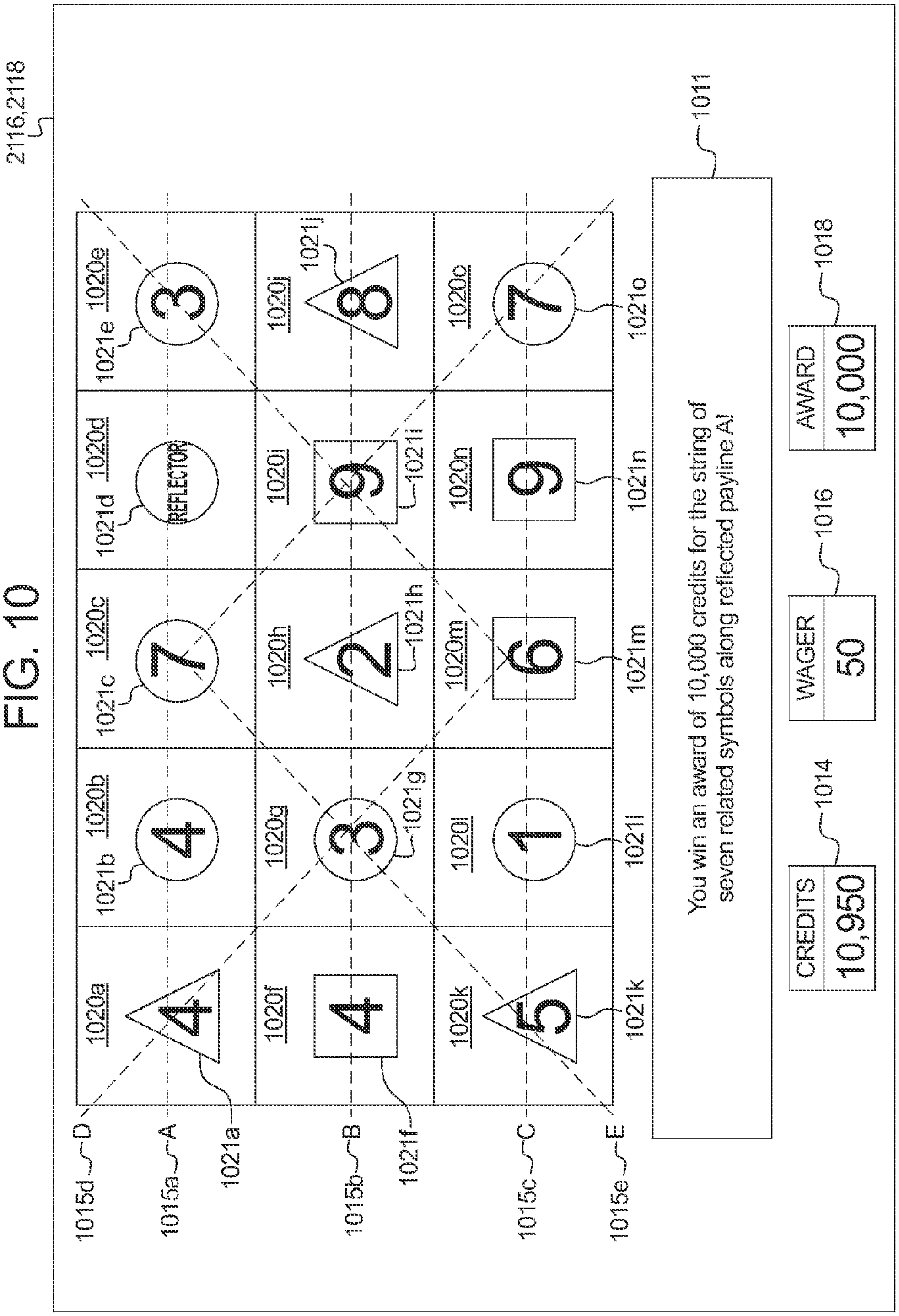
FIG. 10 illustrates a screen shot of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including reflector symbols configured to reverse the direction of evaluation of a payline.

FIG. 10 illustrates a screen shot of an example of such an embodiment of the gaming system of the present disclosure. In this example, the gaming system is configured to operate a primary slot-type wagering game associated with a plurality of symbols as described above with respect to FIG. 2. In this example, the plurality of symbols includes a plurality of reverse symbols that are each associated with a different one of the set of shapes.

As illustrated in FIG. 10, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed, among other symbols:

(a) symbol 1021*a*, which is associated with the number 4 and the triangle shape, at symbol display area 1020*a;*

(b) symbol 1021*b*, which is associated with the number 4 and the circle shape, at symbol display area 1020*b;*

(c) symbol 1021*c*, which is associated with the number 7 and the circle shape, at symbol display area 1020*c;*

(d) reflector symbol 1021*d*, which is associated with the circle shape, at symbol display area 1020*d*; and (e) symbol 1021*e*, which is associated with the number 3 and the circle shape, at symbol display area 1020*e*.

In this example, reflector symbol 1021*d* was generated and displayed along the payline path associated with payline A. Accordingly, as explained above, the gaming system determined a reflected payline path associated with payline A that extends from symbol display area 1020*a* to symbol display area 1020*d* and back to symbol display area 1020*a*. That is, the reflected payline path associated with payline A includes: symbol display area 1020*a*, symbol display area 1020*b*, symbol display area 1020*c*, symbol display area 1020*d*, symbol display area 1020*c*, symbol display area 1020*b*, and symbol display area 1020*a*.

Turning to payline A, in this example, the gaming system determined that a set of seven symbols 1021*a*, 1021*b*, 1021*c*, 1021*d*, 1021*c*, 1021*b*, and 1021*a* displayed along the reflected payline path associated with payline A formed a string of related symbols along the reflected payline path associated with payline A. Specifically, the gaming system determined that each of symbols 1021*a*, 1021*b*, 1021*c*, 1021*d*, 1021*c*, 1021*b*, and 1021*a* of the set was related to at least one other symbol of the set displayed adjacent to that displayed symbol. That is, the gaming system determined that each of symbols 1021*a*, 1021*b*, 1021*c*, 1021*d*, 1021*c*, 1021*b*, and 1021*a* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the reflected payline path associated with payline A from left to right until reaching reflector symbol 1021*d* and then from right to left, and determined that:

(a) symbol 1021*a* shared the number 4 with adjacently displayed symbol 1021*b;*

(b) symbol 1021*b* shared the circle shape with adjacently displayed symbol 1021*c;*

(c) symbol 1021*c* shared the circle shape with adjacently displayed reflector symbol 1021*d;*

(d) reflector symbol 1021*d* shared the circle shape with adjacently displayed symbol 1021*c;*

(e) symbol 1021*c* shared the circle shape with adjacently displayed symbol 1021*b*; and (f) symbol 1021*b* shared the number 4 with adjacently displayed symbol 1021*a*.

Accordingly, the gaming system determined and displayed an award of 10,000 credits associated with the quantity of seven symbols included in the string of related symbols displayed along the reflected payline path associated with payline A.

Figure 11:
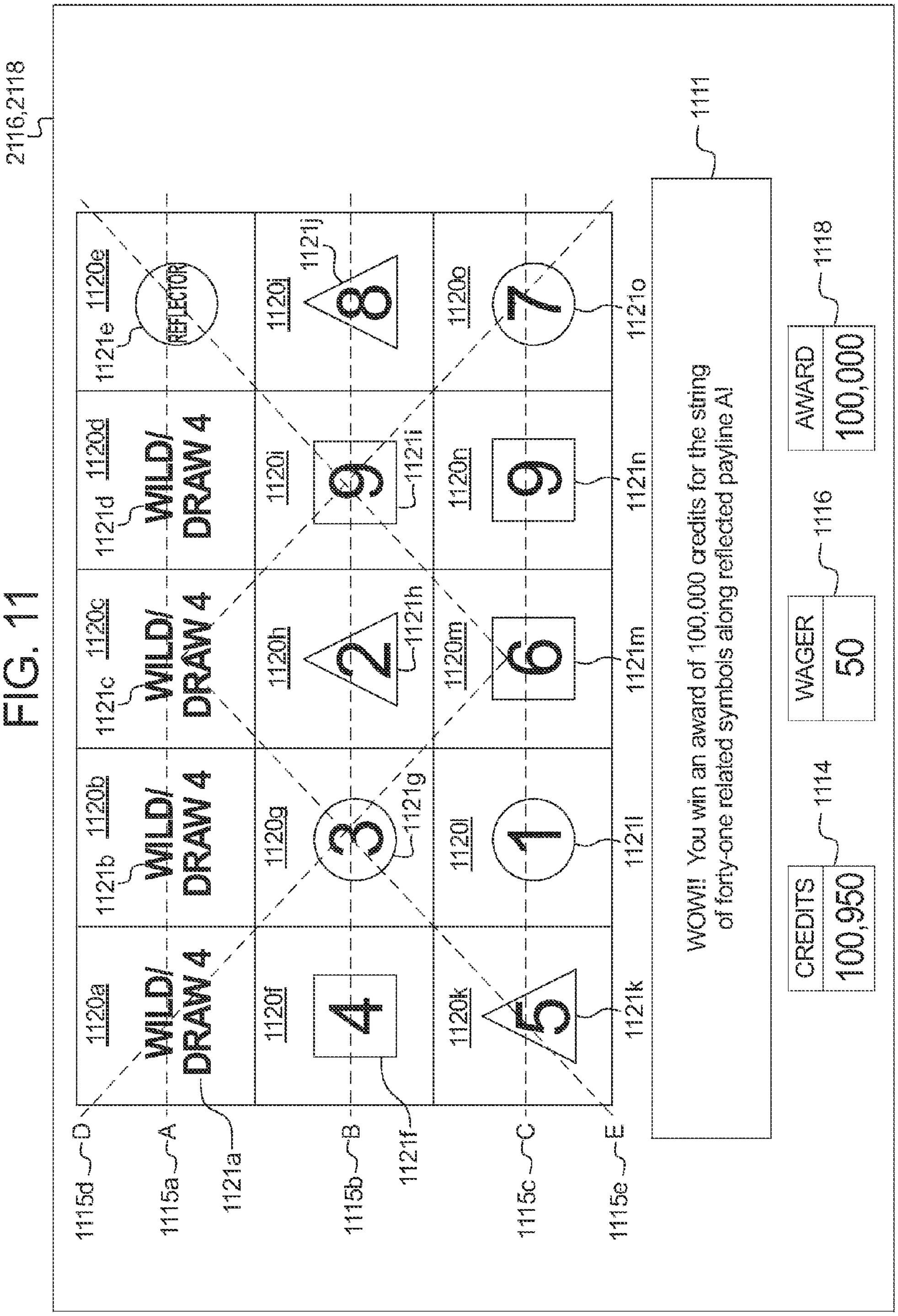
FIG. 11 illustrates a screen shot of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including reflector symbols configured to reverse the direction of evaluation of a payline and wild/draw symbols configured to increase the quantity of symbols in a string of related symbols.

FIG. 11 illustrates a screen shot of an example of the gaming system of the present disclosure in which the gaming system is configured to operate a primary slot-type wagering game associated with a plurality of symbols as described above with respect to FIG. 2. In this example, the plurality of symbols includes: a plurality of wild/draw symbols that are each associated with: (a) one of the set of shapes (i.e., the set of second characteristics in this example); and (b) a different draw count value; and a plurality of reflector symbols that are each associated with one of the set of shapes (i.e., the set of second characteristics in this example). In this example, when one of the wild/draw symbols is included in a string of related symbols displayed along the payline path associated with a payline, the gaming system adds the draw count value associated with that displayed draw symbol to the quantity of symbols included in the string of related symbols for award determination purposes.

As illustrated in FIG. 11, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed, among other symbols:

(a) wild draw symbol 1121*a*, which is associated with a draw count value of four, at symbol display area 1120*a;*

(b) wild/draw symbol 1121*b*, which is associated with a draw count value of four, at symbol display area 1120*b;*

(c) wild/draw symbol 1121*c*, which is associated with a draw count value of four, at symbol display area 1120*c;*

(d) wild/draw symbol 1121*d*, which is associated with a draw count value of four, at symbol display area 1120*d*; and (e) reflector symbol 1121*e*, which is associated with the circle shape, at symbol display area 1120*e*.

In this example, reflector symbol 1121*e* was generated and displayed along the payline path associated with payline A. Accordingly, as explained above, the gaming system determined a reflected payline path associated with payline A that extends from symbol display area 1120*a* to symbol display area 1120*e* and back to symbol display area 1120*a*. That is, the reflected payline path associated with payline. A includes: symbol display area 1120*a*, symbol display area 1120*b*, symbol display area 1120*c*, symbol display area 1120*d*, symbol display area 1120*e*, symbol display area 1120*d*, symbol display area 1120*c*, symbol display area 1120*b*, and symbol display area 1120*a*.

Turning to payline A, in this example, the gaming system determined that a set of nine symbols 1121*a*, 1121*b*, 1121*c*, 1121*d*, 1121*e*, 1121*d*, 1121*c*, 1121*b*, and 1121*a* displayed along the reflected payline path associated with payline A formed a string of related symbols along the reflected payline path associated with payline A. Specifically, the gaming system determined that each of symbols 1121*a*, 1121*b*, 1121*c*, 1121*d*, 1121*e*, 1121*d*, 1121*c*, 1121*b*, and 1121*a* of the set was related to at least one other symbol of the set displayed adjacent to that displayed symbol. That is, the gaming system determined that each of symbols 1121*a*, 1121*b*, 1121*c*, 1121*d*, 1121*e*, 1121*d*, 1121*c*, 1121*b*, and 1121*a* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the reflected payline path associated with payline A from left to right until reaching reflector symbol 1121*e* and then from right to left, and determined that, due to the wild/draw symbols, each symbol along the reflected payline path associated with payline A was related to each symbol adjacent it.

As explained above, in this example, when the wild/draw symbol is included in a string of related symbols displayed along the payline path associated with a payline, the gaming system adds the draw count value associated with that displayed draw symbol to the quantity of symbols included in the string of related symbols. Thus, in this example, the gaming system determined and provided an award for payline A based on a related symbol string length of forty-one (i.e., nine symbols in the string plus the draw count value of four associated with each of: (a) two instances of wild/draw symbol 1121*a*, two instances of wild/draw symbol 1121*b*, two instances of wild/draw symbol 1121*c*, and two instances of wild/draw symbol 1121*d*). Accordingly, the gaming system determined and displayed an award of 100,000 credits associated with the related symbol string length of forty-one associated with the string of related symbols displayed along the reflected payline path associated with payline A.

Figure 12A:
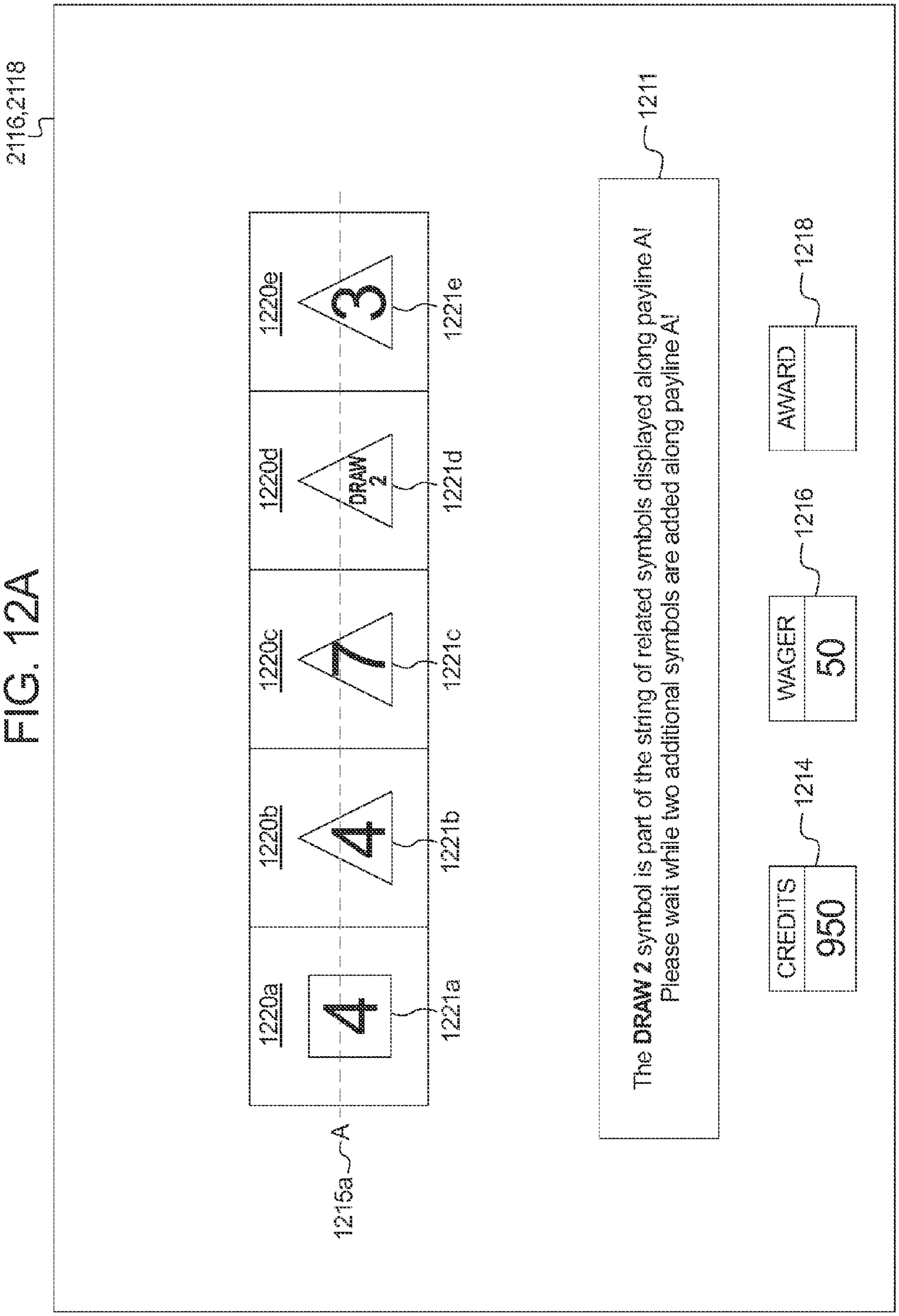
FIGS. 12A and 12B illustrate screen shots of an example embodiment of the gaming system of the present disclosure configured to operate a slot-type game in which one or more awards are determined based on quantities of symbols included in one or more strings of related symbols displayed along one or more paylines, wherein the slot-type game is associated with a plurality of symbols including reflector symbols configured to reverse the direction of evaluation of a payline and draw symbols configured to increase the quantity of symbols in a string of related symbols.
Figure 12B:
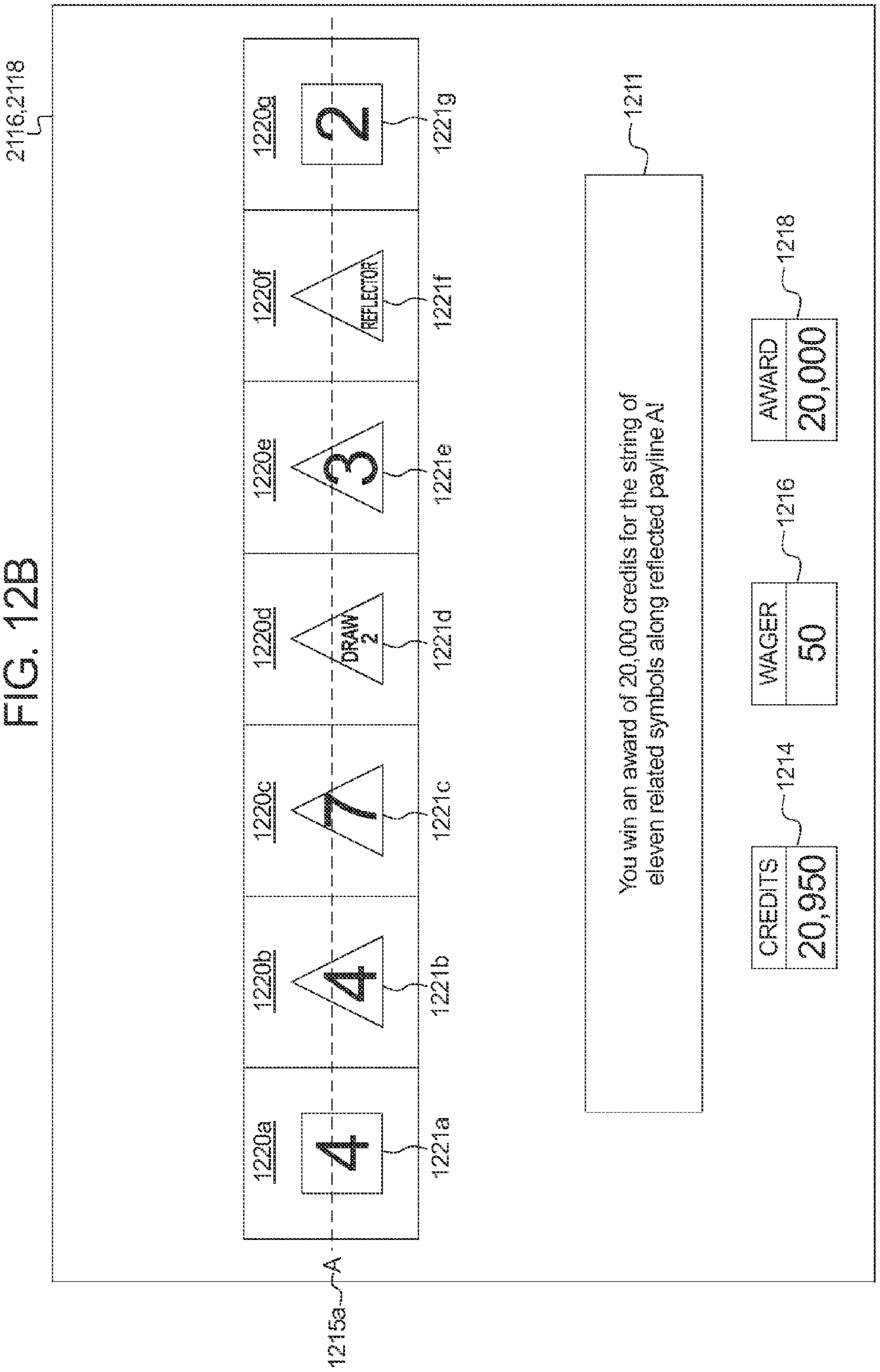

FIGS. 12A and 12B illustrate screen shots of an example embodiment of the gaming system of the present disclosure in which the gaming system is configured to operate a primary slot-type wagering game associated with a plurality of symbols as described above with respect to FIG. 2. In this example, the primary wagering game is associated with a single payline, payline A. In this example, the plurality of symbols includes: (a) a plurality of draw symbols that are each associated with: (i) one of the set of shapes; and (ii) a different draw value, and (b) a plurality of reflector symbols that are each associated with one of the set of symbols (i.e., the set of second characteristics). In this example, when one of the draw symbols is included in a string of related symbols displayed along the payline path associated with a payline, the gaming system adds a quantity of symbols equal to the draw count value associated with the displayed draw symbol to the payline path associated with that payline.

As illustrated in FIG. 12A, upon initiation of a play of the primary wagering game for the maximum wager of 50 credits (i.e., a 50 credit wager on the single payline), the gaming system determined and displayed an outcome for the play of the primary wagering game by generating and displaying a plurality of the symbols at the symbol display areas. Specifically, the gaming system generated and displayed:

(a) symbol 1221*a*, which is associated with the number 4 and the square shape, at symbol display area 1220*a;*

(b) symbol 1221*b*, which is associated with the number 4 and the triangle shape, at symbol display area 1220*b;*

(c) symbol 1221*c*, which is associated with the number 7 and the triangle shape, at symbol display area 1220*c;*

(d) draw symbol 1221*d*, which is associated with the triangle shape and a draw count value of two, at symbol display area 1220*d*; and (e) symbol 1221*e*, which is associated with the number 3 and the triangle shape, at symbol display area 1220*e*.

Turning to payline A, in this example, the gaming system determined that a set of five symbols 1221*a*, 1221*b*, 1221*c*, 1221*d*, and 1221*e* displayed along the payline path associated with payline A formed a string of related symbols along the payline path associated with payline A. Specifically, the gaming system determined that each of symbols 1221*a*, 1221*b*, 1221*c*, 1221*d*, and 1221*e* of the set was related to at least one other symbol of the set displayed adjacent to that displayed symbol. That is, the gaming system determined that each of symbols 1221*a*, 1221*b*, 1221*c*, 1221*d*, and 1221*e* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

More particularly, the gaming system evaluated the symbols displayed along the payline path associated with payline A from left to right and determined that:

(a) symbol 1221*a* shared the number 4 with adjacently displayed symbol 1221*b;*

(b) symbol 1221*b* shared triangle shape with adjacently displayed symbol 1221*c;*

(c) symbol 1221*c* shared the triangle with adjacently displayed draw symbol 1221*d*; and (d) draw symbol 1221*d* shared the triangle shape with adjacently displayed symbol 1221*e.*

As explained above, in this example, when a draw symbol is included in a string of related symbols displayed along the payline path associated with a payline, the gaming system adds a quantity of symbols equal to the draw count value associated with the displayed draw symbol along the payline path associated with that payline. In this example, draw symbol 1221*d* is associated with a draw count value of two. Thus, in this example, the gaming system added two symbols along the payline path associated with payline A.

FIG. 12B illustrates the symbols added due to the inclusion of draw symbol 1221*d* in the string of related symbols displayed along the payline path associated with payline A. Specifically, the gaming system generated and displayed:

(a) reflector symbol 1221*f*, which is associated with the triangle shape, at symbol display area 1220*f*; and (b) symbol 1221*g*, which is associated with the number 2 and the square shape, at symbol display area 1220*g*.

After adding such symbols, the gaming system evaluated the symbols to determine whether to extend the string of related symbols displayed along the payline path associated with payline A. More particularly, the gaming system evaluated the additional symbols displayed along the payline path associated with payline A from left to right and determined that symbol 1221*e* shared the triangle shape with adjacently displayed reflector symbol 1221*f*. That is, the gaming system determined to add reflector symbol 1221*f* to the string of related symbols displayed along the payline path associated with payline A.

After adding such symbols, the gaming system determined that a reflector symbol (i.e., reflector symbol 1121*f*) was included in the string of related symbols displayed along the payline path associated with payline A. Accordingly, as explained above, the gaming system determined a reflected payline path associated with payline A that extended from symbol display area 1220*a* to symbol display area 1220*f* and back to symbol display area 1220*a*. That is, the reflected payline path associated with payline A included: symbol display area 1220*a*, symbol display area 1220*b*, symbol display area 1220*c*, symbol display area 1220*d*, symbol display area 1220*e*, symbol display area 1220*f*, symbol display area 1220*e*, symbol display area 1220*d*, symbol display area 1220*c*, symbol display area 1220*b*, and symbol display area 1220*a*.

Turning to payline A, in this example, the gaming system determined that a set of eleven symbols 1221*a*, 1221*b*, 1221*c*, 1221*d*, 1221*e*, 1221*f*, 1221*e*, 1221*d*, 1221*c*, 1221*b*, and 1221*a* displayed along the reflected payline path associated with payline A formed a string of related symbols along the reflected payline path associated with payline A. Specifically, the gaming system determined that each of symbols 1221*a*, 1221*b*, 1221*c*, 1221*d*, 1221*e*, 1221*f*, 1221*e*, 1221*d*, 1221*c*, 1221*b*, and 1221*a* of the set was related to at least one other symbol of the set displayed adjacent to that displayed symbol. That is, the gaming system determined that each of symbols 1221*a*, 1221*b*, 1221*c*, 1221*d*, 1221*e*, 1221*f*, 1221*e*, 1221*d*, 1221*c*, 1221*b*, and 1221*a* of the set shared at least one of: (a) a same one of the set of numbers (i.e., a same one of the set of first characteristics); and (b) a same one of the set of shapes (i.e., a same one of the set of second characteristics) with at least one other symbol of the set displayed adjacent to that displayed symbol.

The gaming system determined and displayed an award of 20,000 credits associated with the related symbol string length of eleven associated with the string of related symbols displayed along the reflected payline path associated with payline A.

It should be appreciated that, in another iteration of the above example, the gaming system would have added two additional symbols to either the payline path or the reflected payline path associated with payline A because the reflected payline path included two instances of the draw symbol (i.e., one when evaluating from left to right to the reflector symbol and another when evaluating from right to left back from the reflector symbol).

It should be appreciated that, in various embodiments, the plurality of symbols includes zero, one, or more than one of: (a) the skip symbol, (b) the wild symbol, (c) the draw symbol, (d) the wild/draw symbol, (e) the reflector or reverse symbol, (f) the skip/draw symbol It should also be appreciated that the wild symbol may be combined with any of the other symbols. For instance, the game may be associated with a wild/reflector symbol and/or a wild/skip symbol. In another embodiment, the wild symbol is associated with a multiplier, creating a wild/multiplier symbol.

In certain embodiments in which the game is a slot-type game, the gaming system enables the player to re-spin one or more of the reels. In one such embodiment, the gaming system enables the player to re-spin the reels up to a designated quantity times per play. In another such embodiment, the gaming system requires the player to pay a fee or place a supplemental wager to re-spin one or more of the reels.

In various embodiments, the gaming system provides relatively greater awards when symbols of a string of related symbols share relatively more characteristics with the adjacent symbol(s) in the string than if they share relatively fewer characteristics with the adjacent symbol(s) in the string. For instance, if each of the symbols in a string of three related symbols shares a single characteristic with the adjacent symbol(s) in the string, the gaming system provides a first award. If, on the other hand, each of the symbols in the string shares two characteristics with the adjacent symbol(s) in the string, the gaming system provides a second greater award. In one such embodiment, the gaming system provides a bonus award (such as an award of credits or currency or a multiplier) or a play of a bonus game when each of a designated quantity of symbols in a string shares at least a designated quantity of characteristics with the adjacent symbol(s) in the string.

Further embodiments of the present disclosure are directed to a gaming system and method employing a reflector symbol without employing award determinations based on lengths of strings of related symbols. In one embodiment, the gaming system is configured to operate a game associated with a plurality of symbols including a reflector symbol. The symbols are displayable at a plurality of symbol display areas. The game is also associated with a plurality of different paylines. Each of the paylines is associated with a different payline path extending along a plurality of the symbol display areas.

For a play of the game in this embodiment, the gaming system displays a plurality of the symbols at the symbol display areas. For each of at least one of the paylines, the gaming system determines whether the reflector symbol is displayed at one of the symbol display areas along the payline path associated with that payline. If the reflector symbol is displayed at one of the symbol display areas along the payline path associated with that payline, the gaming system determines a reflected payline path associated with that payline. The reflected payline path extends along the payline path associated with that payline to the displayed reflector symbol and back along the payline path. The gaming system determines whether the symbols displayed at the symbol display areas along the reflected payline path form one of a plurality of winning symbol combinations, and displays and provides any awards associated with any winning symbol combination displayed along the reflected payline path.

If the reflector symbol is not displayed at one of the symbol display areas along the payline path associated with that payline, the gaming system determines whether the symbols displayed at the symbol display areas along the payline path form one of the winning symbol combinations. The gaming system displays and provides any awards associated with any displayed winning symbol combination.

While the embodiments described below are directed to a primary wagering game, it should be appreciated that the present disclosure may additionally or alternatively be employed in association with a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1B:
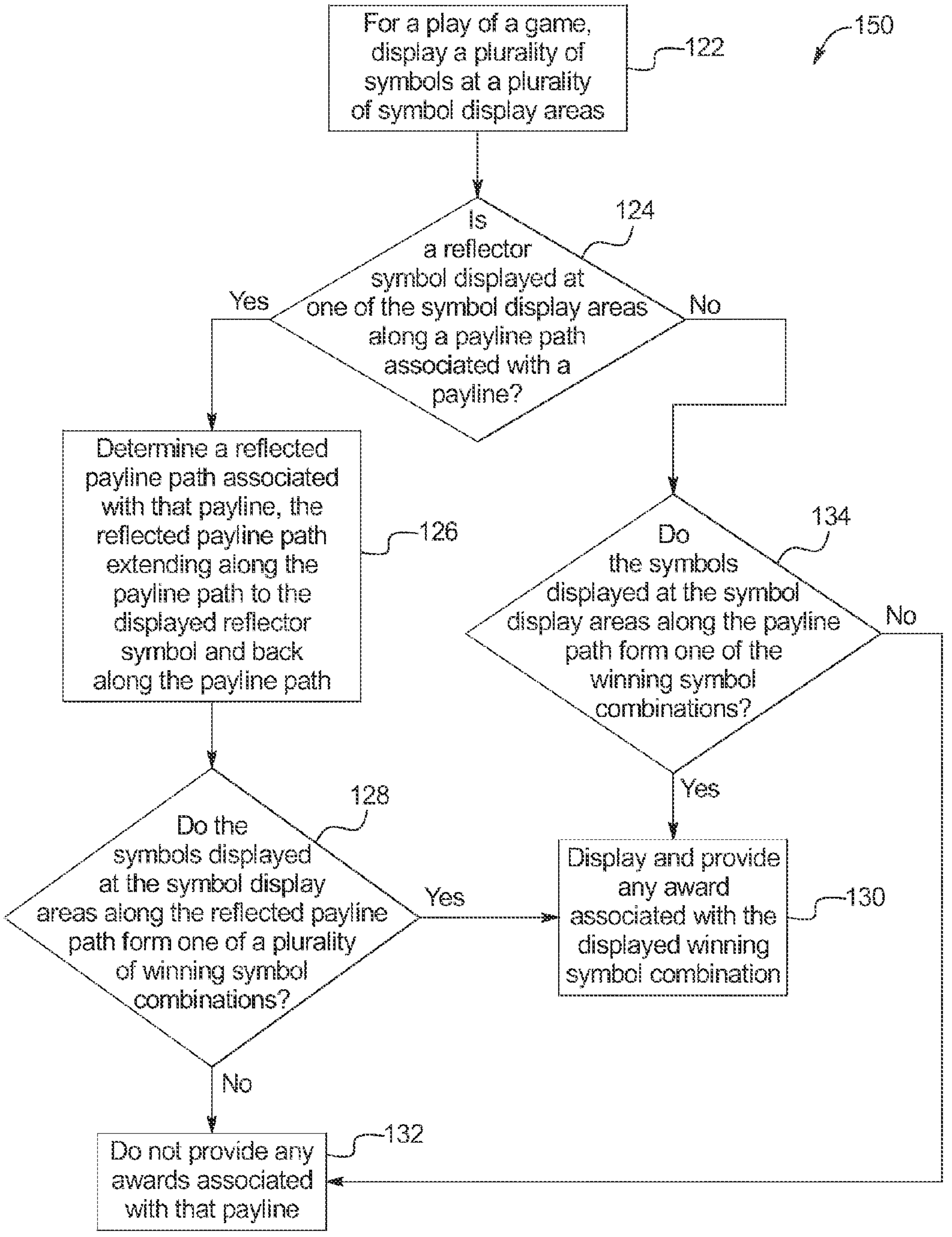
FIG. 1B is a flowchart illustrating an example method of operating an embodiment of the gaming system of the present disclosure configured to operate a game associated with a reflector symbol.

FIG. 1B illustrates a flowchart of a process or method 150 for operating an example embodiment of the gaming system of the present disclosure. In various embodiments, process 150 is represented by a set of instructions stored in one or more memories and executed by one or more processors. Although process 150 is described with reference to the flowchart shown in FIG. 1B, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, for a play of a game associated with a plurality of symbols, the gaming system displays a plurality of the symbols at a plurality of symbol display areas, as indicated by block 122. The gaming system also displays a plurality of different paylines. Each of the displayed paylines is associated with a different payline path along a different plurality of the symbol display areas. The gaming system determines if a reflector symbol was displayed at one of the symbol display areas along the payline path associated with one of the paylines, as indicated by diamond 124.

If the gaming system determines that a reflector symbol was displayed at one of the symbol display areas along the payline path associated with that payline, the gaming system determines a reflected payline path associated with that payline, as indicated by block 126. The reflected payline path extends along the payline path associated with that payline to the displayed reflector symbol and back along the payline path. The gaming system determines whether the symbols displayed at the symbol display areas along the reflected payline path form one of a plurality of winning symbol combinations, as indicated by diamond 128. If the gaming system determines that the symbols displayed at the symbol display areas along the reflected payline path associated with that payline form one of the winning symbol combinations, the gaming system displays and provides any award associated with that winning symbol combination, as indicated by block 130. If not, the gaming system does not provide any awards associated with that payline, as indicated by block 132.

If the gaming system determines in diamond 124 that a reflector symbol was not displayed at one of the symbol display areas along the payline path associated with that payline, the gaming system determines whether the symbols displayed at the symbol display areas along the payline path associated with that payline form one the winning symbol combinations, as indicated by diamond 134. If the gaming system determines that the symbols displayed at the symbol display areas along the payline path associated with that payline form one of the winning symbol combinations, the gaming system displays and provides any award associated with that winning symbol combination, as indicated by block 130. If not, the gaming system does not provide any awards associated with that payline, as indicated by block 132.

Figure 13:
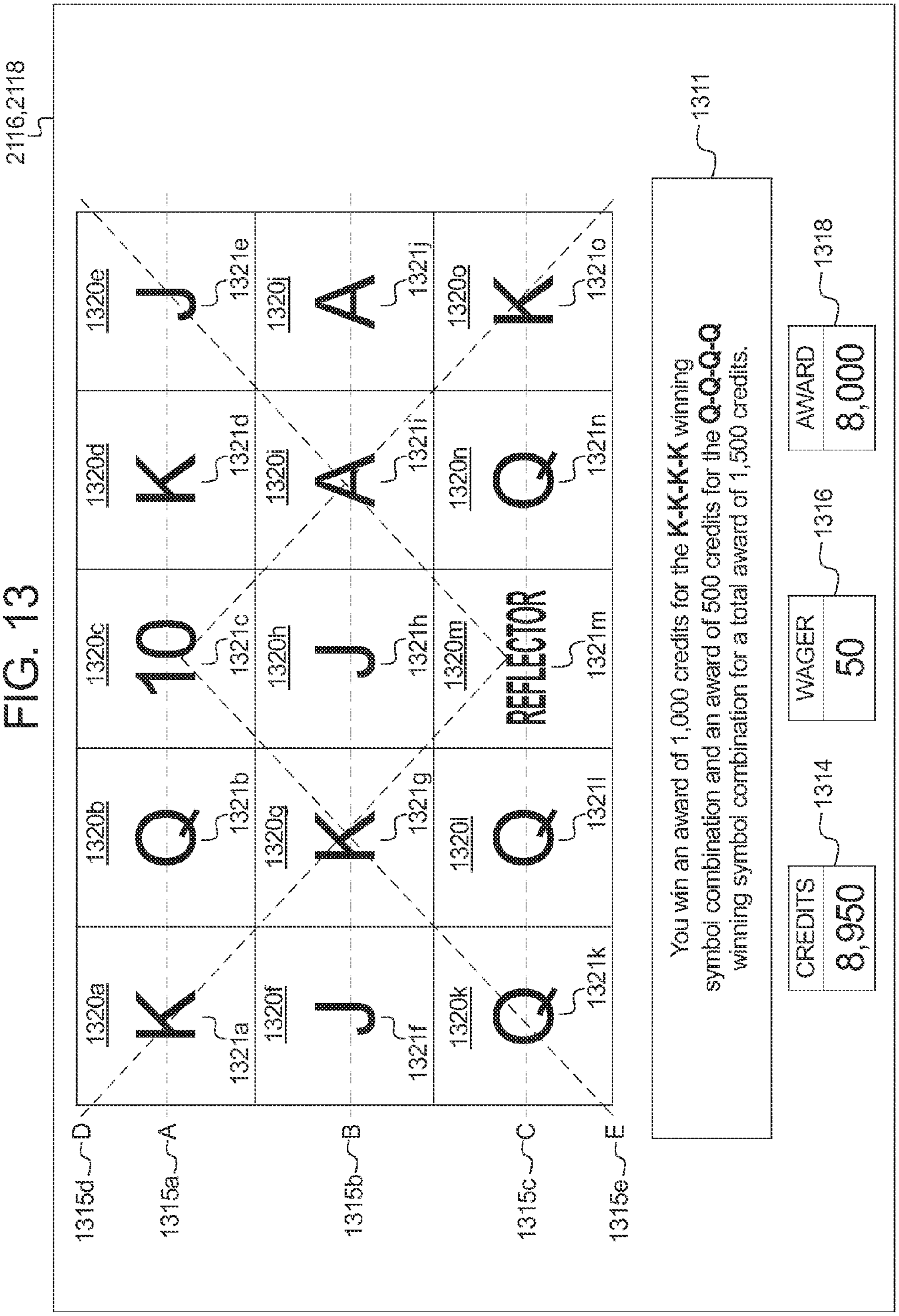
FIG. 13 illustrates a screen shot of an example embodiment of the gaming system of the present disclosure configured to operate a slot-type game associated with a plurality of symbols including reflector symbols configured to reverse the direction of evaluation of a payline.

FIG. 13 illustrates a screen shot of an example embodiment of the gaming system of the present disclosure. In this example, the gaming system is configured to operate a primary slot-type wagering game associated with a plurality of symbols including a reflector symbol. In this example, the gaming system does not employ award determinations based on lengths of strings of related symbols. It should be appreciated that, in this example, when a reflector symbol is displayed the gaming system does not include the reflector symbol when determining whether any winning symbol combinations are displayed; rather, the reflector symbol causes the gaming system to change the way it evaluates a given payline (i.e., by evaluating a reflected payline path rather than the payline path associated with that payline). It should also be appreciated that, in other embodiments, the plurality of symbols may include one or more of: (a) a skip symbol, (b) a draw symbol, (c) a wild symbol, (d) a wild/draw symbol; and (e) any of the other symbols described above.

The gaming system displays (such as on a display device 2110 or 2118, described below) a plurality of symbol display areas 1320*a*, 1320*b*, 1320*c*, 1320*d*, 1320*e*, 1320*f*, 1320*g*, 1320*h*, 1320*i*, 1320*j*, 1320*k*, 1320*l*, 1320*m*, 1320*n*, and 1320*o* arranged in a 3×5 matrix. The symbols are displayable at the symbol display areas. The gaming system also displays a plurality of different paylines for the primary wagering game. Each of the paylines is associated with a different payline path along a plurality of the symbol display areas. In this example, payline A 1315*a* is associated with a payline path along symbol display areas 1320*a*, 1320*b*, 1320*c*, 1320*d*, and 1320*e*; payline B 1315*b* is associated with a payline path along symbol display areas 1320*f*, 1320*g*, 1320*h*, 1320*i*, and 1320*j*; payline C 1315*c* is associated with a payline path along symbol display areas 1320*k*, 1320*l*, 1320*m*, 1320*n*, and 1320*o*; payline 1315*d* is associated with a payline path along symbol display areas 1320*a*, 1320*g*, 1320*m*, 1320*i*, and 1320*e*; and payline E 1315*e* is associated with a payline path along symbol display areas 1320*k*, 1320*g*, 1320*c*, 1320*i*, and 1320*o*. Payline A 1315*a*, payline B 1315*b*, payline C 1315*c*, payline D 1315*d*, and payline E 1315*e* are sometimes referred to herein as paylines A, B, C, D, and E.

The gaming system employs a paytable (not shown) for the primary wagering game that includes a plurality of winning symbol combinations and the credit payout associated with each respective winning symbol combination. Specifically, in this example, the paytable includes a credit payout associated with each respective related symbol string length when the maximum wager, which is 50 credits in this example (but could be any suitable amount), is placed for a play of the primary wagering game.

Additionally, in this example, the gaming system displays: a message display area 1311, which displays information, notifications, and/or messages before, during, or after play of the primary wagering game; a credit meter 1314, which displays a player's credit balance in the form of an amount of credits; a wager indicator 1316, which displays the player's wager for a play of the primary wagering game in the form of an amount of credits; and an award meter 1318, which displays any awards provided to the player in the form of an amount of credits. While in this illustrated example the gaming system indicates the player's credit balance; the player's wager, and any awards provided to the player in the form of amounts of credits, it should be appreciated that such indications may alternatively or additionally be made in the form of amounts of currency.

As illustrated in FIG. 13, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed: K symbol 1321*a* at symbol display area 1320*a*, Q symbol 1321*b* at symbol display area 1320*b*, 10 symbol 1321*c* at symbol display area 1320*c*, K symbol 1321*d* at symbol display area 1320*d*, J symbol 1321*e* at symbol display area 1320*e*, J symbol 1321*f* at symbol display area 1320*f*, K symbol 1321*g* at symbol display area 1320*g*, J symbol 1321*h* at symbol display area 1320*h*, A symbol 1321*i* at symbol display area 1320*i*; A symbol 1321*j* at symbol display area 1320*j*, Q symbol 1321*k* at symbol display area 1320*k*, Q symbol 1321*l* at symbol display area 1320*l*, reflector symbol 1321*m* at symbol display area 1320*m*, Q symbol 1321*n* at symbol display area 1320*n*, and K symbol 1321*o* at symbol display area 1320*o*.

In this example, for each wagered-on payline, the gaming system evaluates the symbols displayed along the payline path associated with that payline from left to right to determine whether any winning symbol combinations are displayed along the payline path. However, in this example, if the reflector symbol is displayed at one of the symbol display areas along the payline path associated with that payline, the gaming system determines a reflected payline path associated with that payline. The reflected payline path extends from left to right along the payline path associated with that payline to the displayed reflector symbol, and back from right to left along the payline path. The gaming system determines whether the symbols displayed at the symbol display areas along the reflected payline path form one of a plurality of winning symbol combinations, and displays and provides any awards associated with any winning symbol combination displayed along the reflected payline path.

Turning to payline C, the gaming system determined that reflector symbol 1321*m* was displayed at one of the symbol display areas along the payline path associated with payline C. Accordingly, the gaming system determined a reflected payline path associated with payline C, and the gaming system evaluated the symbols displayed at the symbol display areas along that reflected payline path to determine whether those symbols formed any winning symbol combinations. In this instance, the gaining system determined a reflected payline path associated with payline C that extended from left to right from symbol display area 1320*k* to symbol display area 1320*m*, and back from right to left from symbol display area 1320*m* to symbol display area 1320*m*.

The gaming system determined that a winning symbol combination of four Q symbols was displayed along the reflected payline path associated with payline C. Specifically, the gaming system evaluated Q symbol 1321*k* and Q symbol 1321*l* from left to right, and then evaluated Q symbol 1321*l* and Q symbol 1321*k* from right to left along the reflected payline path. The gaming system determined an award of 500 credits for the winning symbol combination of four Q symbols displayed along the reflected payline path associated with payline C.

Turning to payline D, the gaming system determined that reflector symbol 1321*m* was displayed at one of the symbol display areas along the payline path associated with payline D. Accordingly, the gaming system determined a reflected payline path associated with payline D, and the gaming system evaluated the symbols displayed at the symbol display areas along that reflected payline path to determine whether those symbols formed any winning symbol combinations. In this instance, the gaming system determined a reflected payline path associated with payline that extended from left to right from symbol display area 1320*a* to symbol display area 1320*m*, and back from right to left from symbol display area 1320*m* to symbol display area 1320*a*.

The gaming system determined that a winning symbol combination of four K symbols was displayed along the reflected payline path associated with payline D. Specifically, the gaming system evaluated K symbol 1321*a* and K symbol 1321*g* from left to right, and then evaluated K symbol 1321*g* and K symbol 1321*a* from right to left along the reflected payline path. The gaming system determined an award of 1,000 credits for the winning symbol combination of four K symbols displayed along the reflected payline path associated with payline D.

It should be appreciated that the reflector symbol may be employed in a game in which evaluations are made in multiple directions along paylines, such as from left to right and from right to left. For instance, if symbol 1321*e* in FIG. 13 was an A symbol rather than a J symbol, and evaluations were made from left to right and from right to left, the gaming system would determine and provide an award for the winning symbol combination of four A symbols displayed along the reflected payline path associated with payline D from right to left to the reflector symbol and back from left to right along the reflected payline path.

In certain embodiments, the reverse symbol is displayed with another one of the symbols at one of the symbol display areas in certain instances. In these embodiments, the gaming system includes the other symbol displayed at the same symbol display area as the reverse symbol when determining whether any winning symbol combinations are displayed along a reflected payline path.

Figure 14:
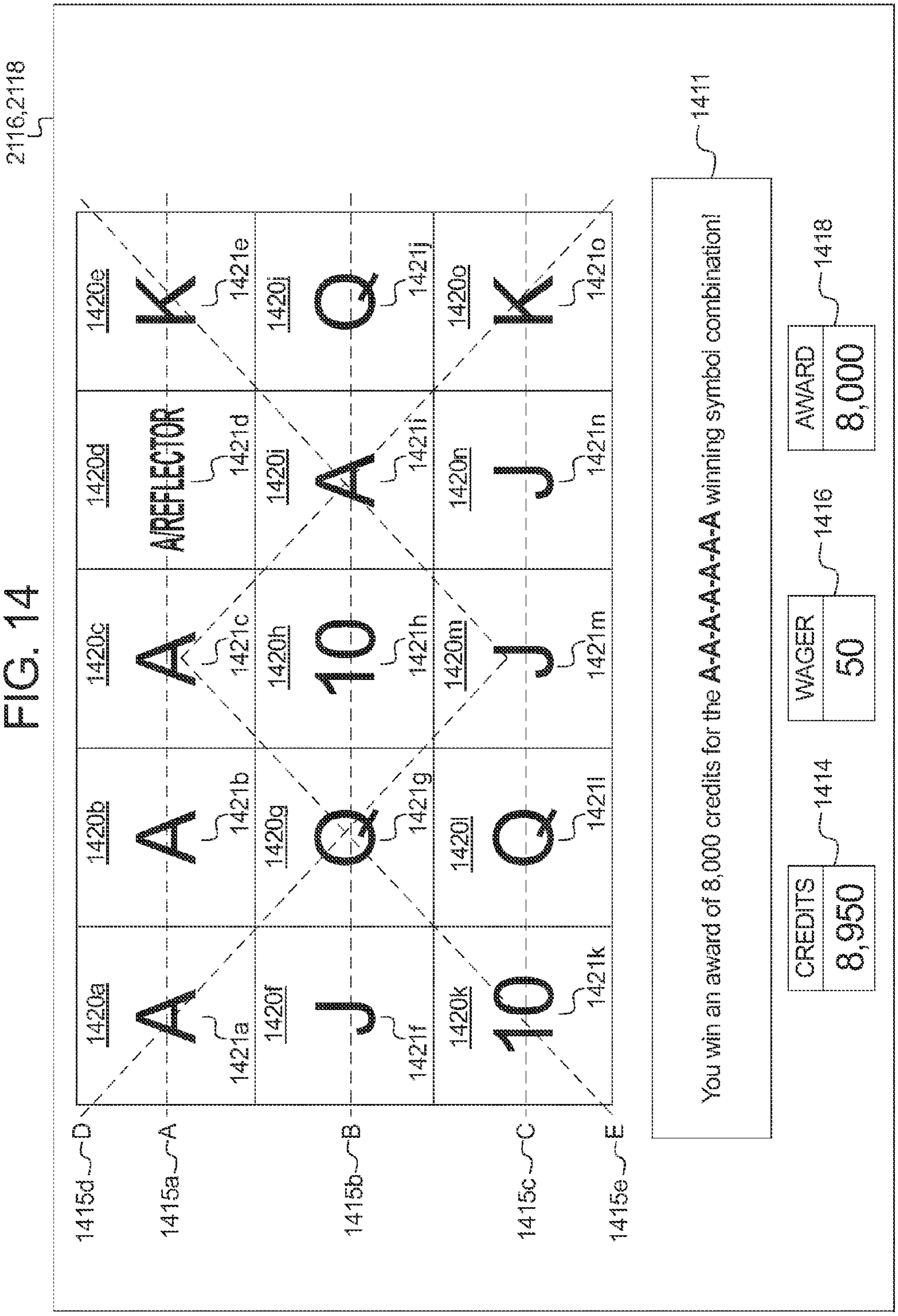
FIG. 14 illustrates a screen shot of an example embodiment of the gaming system of the present disclosure configured to operate a slot-type game associated with a plurality of symbols including reflector symbols configured to reverse the direction of evaluation of a payline, wherein the reflector symbols are displayable with another one of the symbols at a same symbol display area.

FIG. 14 illustrates a screen shot of an example embodiment of the gaming system of the present disclosure. In this example, the gaming system is configured to operate a primary slot-type wagering game associated with a plurality of symbols including a reflector symbol that is configured to be displayed at a same symbol display area as another one of the symbols. In this example, the gaming system does not employ award determinations based on lengths of strings of related symbols As illustrated in FIG. 14, upon initiation of a play of the primary wagering game for the maximum wager of 50 credits (i.e., a 10 credit wager on each payline), the gaming system determined and displayed an outcome for the play of the primary wagering game by generating and displaying a plurality of the symbols at the symbol display areas. Specifically, the gaming system generated and displayed: A symbol 1421*a* at symbol display area 1420*a*, A symbol 1421*b* at symbol display area 1420*b*, A symbol 1421*c* at symbol display area 1420*c*, A/reflector symbol 1421*d* at symbol display area 1420*d*, K symbol 1421*e* at symbol display area 1420*e*, J symbol 1421*f* at symbol display area 1420*f*, Q symbol 1421*g* at symbol display area 1420*g*, 10 symbol 1421*h* at symbol display area 1420*h*, A symbol 1421*i* at symbol display area 1420*i*; Q symbol 1421*j* at symbol display area 1420*j*, 10 symbol 1421*k* at symbol display area 1420*k*, Q symbol 1421*l* at symbol display area 1420*l*, J symbol 1421*m* at symbol display area 1420*m*, J symbol 1421*n* at symbol display area 1420*n*, and K symbol 1421*o* at symbol display area 1420*o*.

In this example, for each wagered-on payline, the gaming system evaluates the symbols displayed along the payline path associated with that payline from left to right to determine whether any winning symbol combinations are displayed along the payline path. However, in this example, if the reflector symbol is displayed at one of the symbol display areas along the payline path associated with that payline, the gaming system determines a reflected payline path associated with that payline. The reflected payline path extends from left to right along the payline path associated with that payline to the displayed reflector symbol, and back from right to left along the payline path. The gaming system determines whether the symbols displayed at the symbol display areas along the reflected payline path form one of a plurality of winning symbol combinations, and displays and provides any awards associated with any winning symbol combination displayed along the reflected payline path.

Turning to payline A, the gaming system determined that A/reflector symbol 1421*d* was displayed at one of the symbol display areas along the payline path associated with payline A. Accordingly, the gaming system determined a reflected payline path associated with payline A, and the gaming system evaluated the symbols displayed at the symbol display areas along that reflected payline path to determine whether those symbols formed any winning symbol combinations. In this instance, the gaming system determined a reflected payline path associated with payline A that extended from left to right from symbol display area 1420*a* to symbol display area 1420*d*, and back from right to left from symbol display area 1420*d* to symbol display area 1420*a*.

The gaming system determined that a winning symbol combination of seven A symbols was displayed along the reflected payline path associated with payline A. Specifically, the gaming system evaluated A symbol 1421*a*, A symbol 1421*b*, A symbol 1421*c*, and A/reflector symbol 1421*d* from left to right, and then evaluated A symbol 1421*c*, A symbol 1421*b*, and A symbol 1421*a* from right to left along the reflected payline path. The gaming system determined an award of 8,000 credits for the winning symbol combination of seven A symbols displayed along the reflected payline path associated with payline A.

Figure 15:
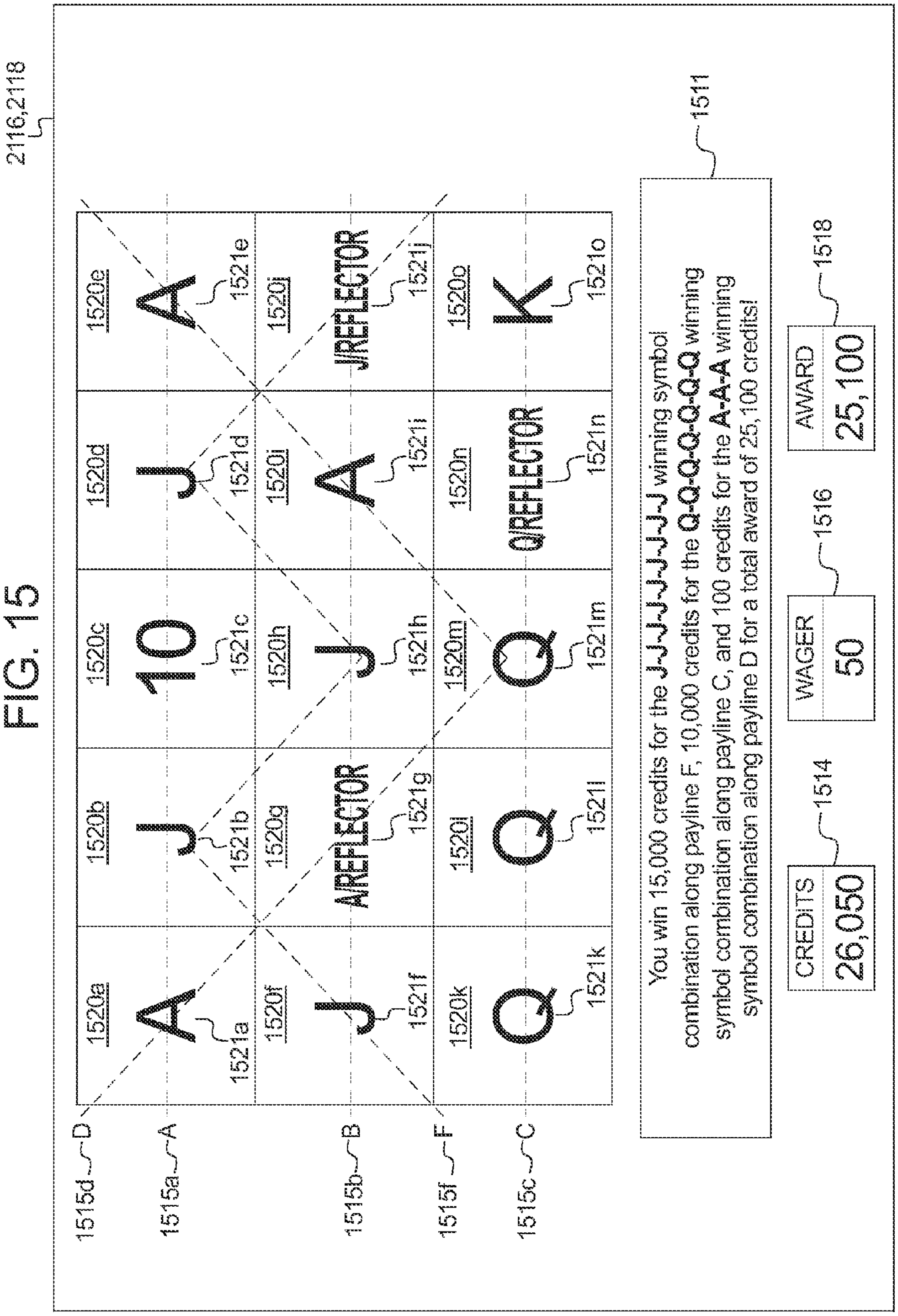
FIG. 15 illustrates a screen shot of another example embodiment of the gaming system of the present disclosure configured to operate a slot-type game associated with a plurality of symbols including reflector symbols configured to reverse the direction of evaluation of a payline, wherein the reflector symbols are displayable with another one of the symbols at a same symbol display area.

FIG. 15 illustrates a screen shot of another example embodiment of the gaming system of the present disclosure. In this example, the gaming system is configured to operate a primary slot-type wagering game associated with a plurality of symbols including a reflector symbol that is configured to be displayed at a same symbol display area as another one of the symbols. In this example, the gaming system does not employ award determinations based on lengths of strings of related symbols In this example, the gaming system determined that a winning symbol combination of nine J symbols was displayed along the reflected payline path associated with payline F. The gaming system determined an award of 15,000 credits for this winning symbol combination. The gaming system also determined that a winning symbol combination of seven Q symbols was displayed along the reflected payline path associated with payline C. The gaming system determined an award of 10,000 credits for this winning symbol combination. The gaming system also determined that a winning symbol combination of three A symbols was displayed along the reflected payline path associated with payline 0. The gaming system determined an award of 100 credits for this winning symbol combination.

In certain embodiments, the plurality of symbols includes a wild symbol. In one such embodiment, the wild symbol may be displayed at a same symbol display area as the reflector symbol.

In various embodiments, the wild/reflector symbol (or any of the above-described symbols, such as the wild symbol, the draw symbol, the skip symbol, or any of the combinations thereof) may be employed as a mystery wild feature. In these embodiments, the gaming system randomly determines to add one or more wild/reflector symbols to a reel outcome, which could cause additional awards to be provided to the player. In one such embodiment, the reels include the wild/reflector symbol and the mystery wild feature increases the player's odds or perceived odds of obtaining the wild/reflector symbol. In another such embodiment, the reels do not include the wild/reflector symbol and the mystery wild feature adds the wild/reflector symbols to the reels. In another such embodiment, after generating and displaying a plurality of symbols and providing any awards associated with the displayed symbols, the gaming system randomly determines to replace certain of the displayed symbols with the wild/reflector symbol and makes another award determination. In another such embodiment, after generating and displaying a plurality of symbols and before providing any awards associated with the displayed symbols, the gaming system randomly determines to replace certain of the displayed symbols with the wild/reflector symbol and subsequently makes an award determination.

In certain embodiments employing multiway reel evaluations, if a symbol being evaluated appears multiple times on the same reel, a multiplier value is applied to an award associated with a winning symbol combination including that symbol. In one such embodiment, if the symbol that appears multiple times on the same reel is evaluated twice due to a reflected payline path (e.g., once from left to right and once from right to left), the gaming system applies the multiplier value twice because that symbol was evaluated twice.

It should be appreciated that the present disclosure contemplates being employed in a tumbling or cascading reels-type game.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines (EGMs); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 16A:
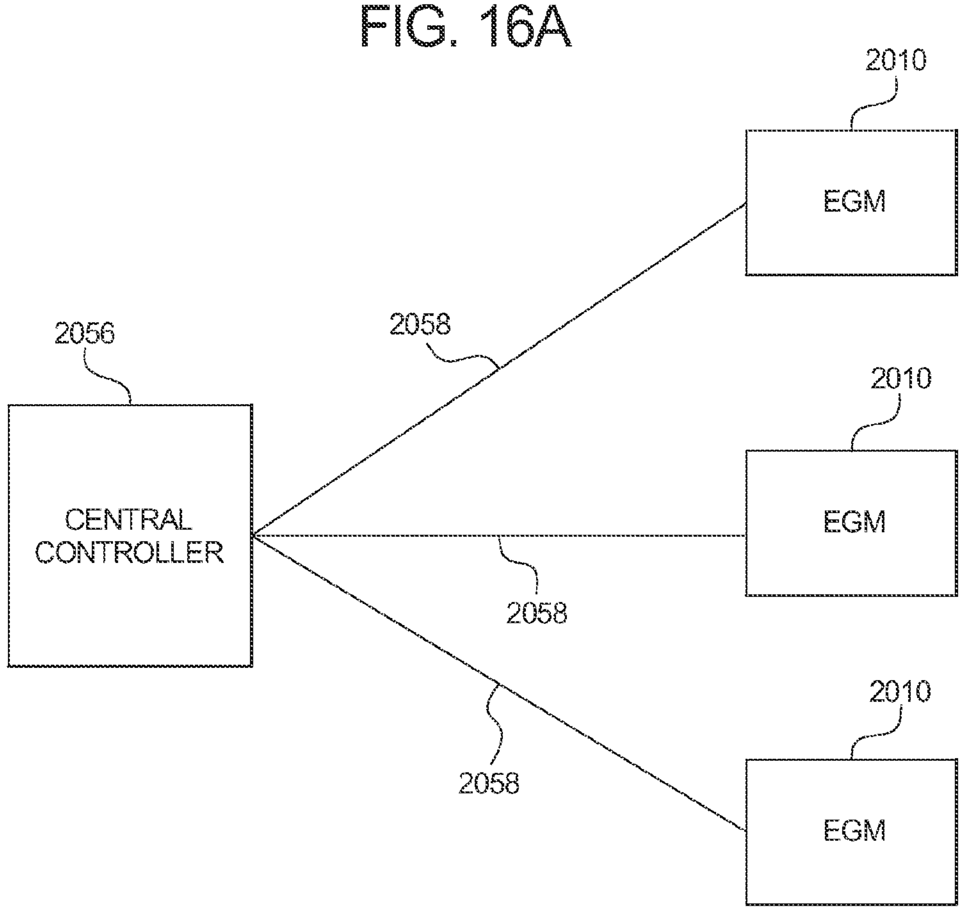
FIG. 16A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 16A includes a plurality of EGMs 2010 that are each configured to communicate with a central server, central controller, or remote host 2056 through a data network 2058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an Internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 16B:
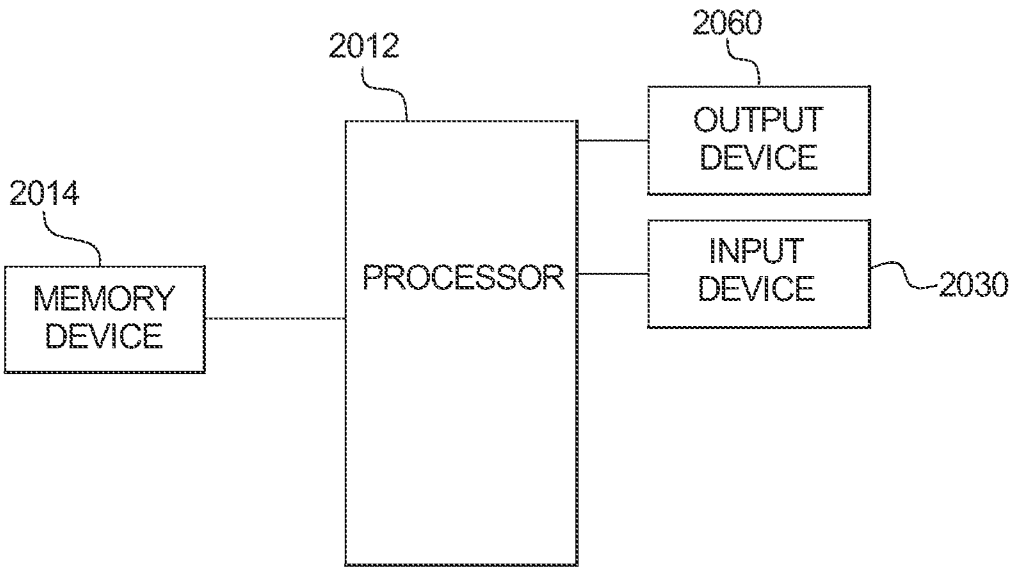
FIG. 16B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 16B illustrates an example EGM including a processor 2012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 16B includes a memory device 2014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 17A:
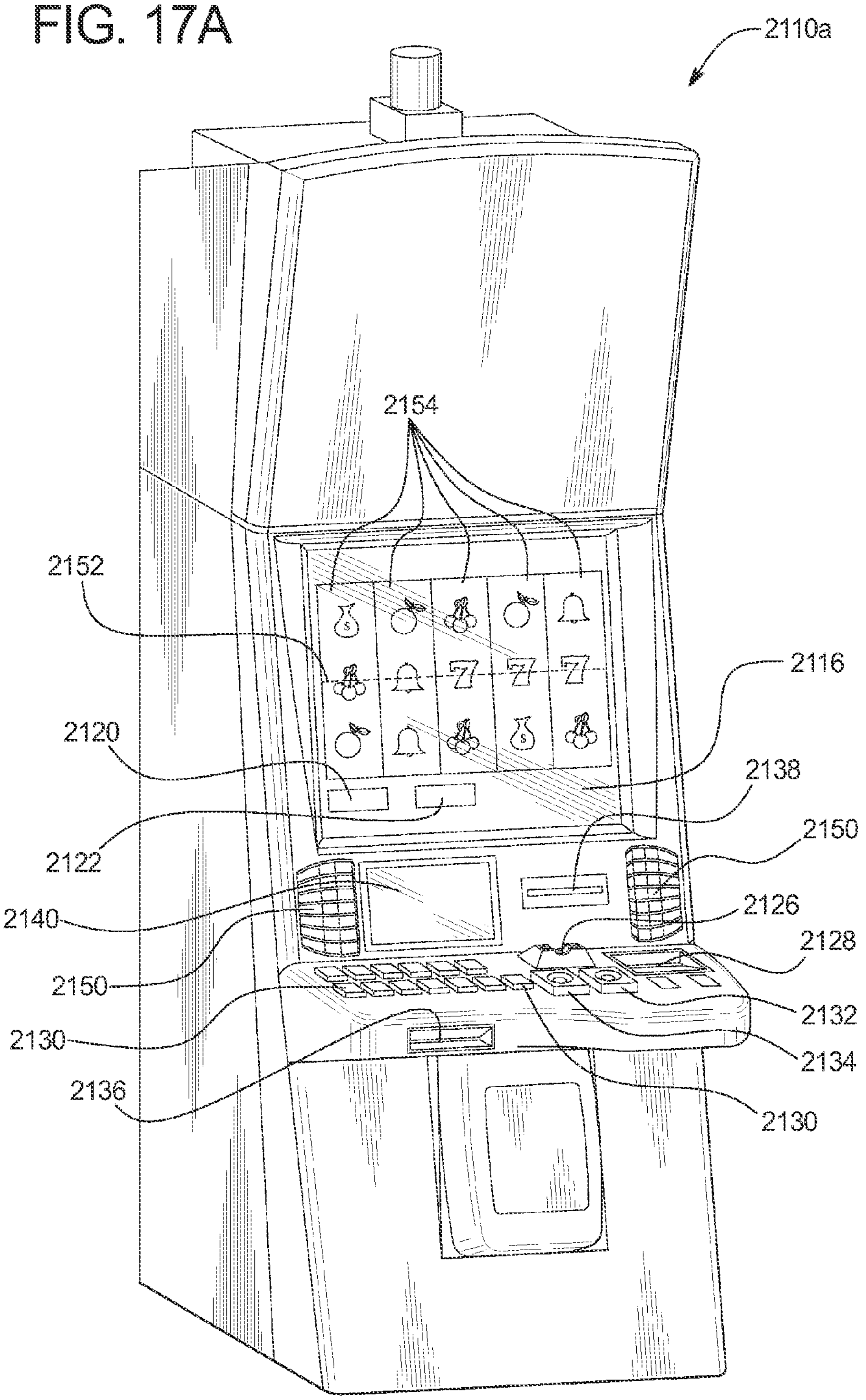
FIGS. 17A and 17B are perspective views of example alternative embodiments of the gaming system of the present disclosure.
Figure 17B:
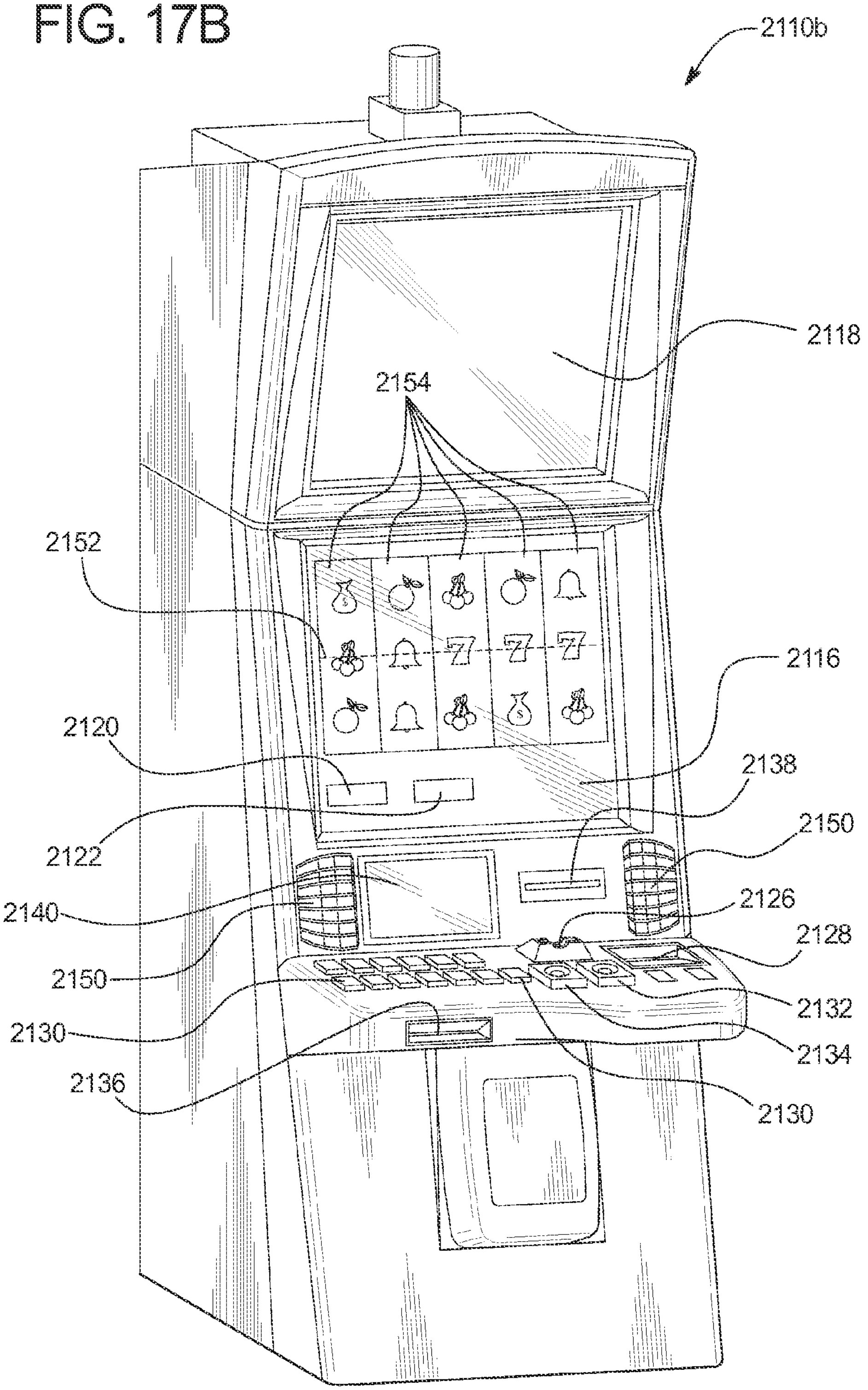

In various embodiments, the EGM includes one or more input devices. The input devices may include any suitable device that enables an input signal to be produced and received by the at least one processor of the EGM. The example EGM illustrated in FIG. 16B includes at least one input device 2030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 17A and 17B illustrate example EGMs that each include the following payment devices: (a) a combined bill and ticket acceptor 2128, and (b) a coin slot 2126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 17A and 17B each include a game play activation device in the form of a game play initiation button 2132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the be one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 17A and 17B each include a cash out device in the form of a cash out button 2134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 17A and 17B each include a card reader 2138. The card reader is configured to read a player identification card inserted into the card reader.

In various embodiments, the EGM includes one or more output devices. The example EGM illustrated in FIG. 16B includes at least one output device 2060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 16A includes a central display device 2116, a player tracking display 2140, a credit display 2120, and a bet display 2122. The example EGM illustrated in FIG. 16B includes a central display device 2116, an upper display device 2118, a player tracking display 2140, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or mnore dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 17A and 17B each include ticket generator 2136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 17A and 17B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 17A and 17B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 17A and 17B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as “primary games”) and/or any secondary or bonus games or other functions (referred to herein as “secondary games”) displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 200910181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack genies, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 17A and 17B each include a payline 1152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 200710123341, 2008/0070680, 200810176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a housing;

at least one processor;

at least one display device supported by the housing;

a plurality of input devices supported by the housing, the plurality of input devices including:

(i) an acceptor, (ii) a validator, and (iii) a cashout button; and at least one memory device storing a plurality of instructions which, when executed by the at least one processor, cause the at least one processor to operate with the at least one display device and the plurality of input devices to:

(a) receive, via the acceptor, a first physical item associated with a first monetary value;

(b) identify, via the validator, the received first physical item;

(c) establish a credit balance based at least in part on the first monetary value associated with the received first physical item;

(d) if a wager input is received via a wager button, place a wager on a play of a game, the wager being deductable from the credit balance, the game being associated with:

(i) a plurality of symbols, a plurality of the symbols each being associated with one of a set of a plurality of different first characteristics and one of a set of a plurality of different second characteristics, the symbols being displayable at a plurality of symbol display areas; and (ii) a plurality of different paylines, each of the paylines being associated with a different payline path extending along a plurality of the symbol display areas;

(e) for said play of the game:

(i) display a plurality of the symbols at the symbol display areas; and (ii) for each of at least one of the paylines:

(A) determine if a set of a plurality of the symbols displayed along the payline path associated with said payline forms a string of related symbols, wherein:

(1) the set of the symbols displayed along the payline path associated with said payline forms a string of related symbols: (a) when, for each displayed symbol of the set, said displayed symbol is related to each other symbol of the set displayed adjacent to said displayed symbol; and (b) regardless of whether any displayed symbol of the set is related to any other symbol of the set not displayed adjacent to said displayed symbol; and (2) two symbols are related if those two symbols share at least one of: (a) a same one of the set of first characteristics, and (b) a same one of the set of second characteristics; and (B) if the set of the displayed symbols forms a string of related symbols, determine any awards based on a quantity of symbols in said string; and (iii) display any determined awards and modify the credit balance based on any determined awards; and (f) if an actuation of the cashout button is received, initiate a payout based on the credit balance.

2. The gaming system of claim 1, wherein the plurality of symbols includes a skip symbol associated with at least one of: (a) one of the set of first characteristics, and (b) one of the set of second characteristics.

3. The gaming system of claim 2, wherein the plurality of instructions, when executed by the at least one processor, cause the at least one processor to, for each of at least one of the paylines, if a set of a plurality of the symbols displayed along the payline path associated with said payline forms a string of related symbols including the skip symbol, not include said skip symbol when determining the quantity of symbols in said string.

4. The gaming system of claim 2, wherein the plurality of instructions, when executed by the at least one processor, cause the at least one processor to, for each of at least one of the paylines, if the skip symbol is displayed along the payline path associated with said payline, not evaluate one of the symbols displayed along the payline path associated with said payline when determining whether a set of the symbols displayed along the payline path associated with said payline forms a string of related symbols.

5. The gaming system of claim 1, wherein the plurality of symbols includes a wild symbol associated with each of the first set of characteristics and each of the second set of characteristics.

6. The gaming system of claim 1, wherein the plurality of symbols includes a draw symbol associated with a draw count value and at least one of: (a) one of the set of first characteristics, and (b) one of the set of second characteristics.

7. The gaming system of claim 6, wherein the plurality of instructions, when executed by the at least one processor, cause the at least one processor to, for each of at least one of the paylines, if a set of a plurality of the symbols displayed along the payline path associated with said payline forms a string of related symbols including the draw symbol, determine any awards based on a sum of the draw count value associated with the draw symbol and the quantity of symbols in said string.

8. The gaming system of claim 6, wherein the plurality of instructions, when executed by the at least one processor, cause the at least one processor to, for each of at least one of the paylines, if a set of a plurality of the symbols displayed along the payline path associated with said payline forms a string of related symbols including the draw symbol, display a quantity of symbols equal to the draw count value associated with the draw symbol to the payline path associated with said payline.

9. The gaming system of claim 1, wherein the plurality of symbols includes a wild/draw symbol associated with a draw count value, each of the first set of characteristics, and each of the second set of characteristics.

10. The gaming system of claim 1, wherein the plurality of symbols includes a reflector symbol associated with at least one of:

(a) one of the set of first characteristics, and (b) one of the set of second characteristics.

11. The gaming system of claim 10, wherein the plurality of instructions, when executed by the at least one processor, cause the at least one processor to, for each of at least one of the paylines, if the reflector symbol is displayed along the payline path associated with said payline:

(a) determine a reflected payline path associated with said payline, wherein the reflected payline path extends along that payline path to the displayed reflector symbol and back along that payline path; and (b) determine whether a set of the symbols displayed along that reflected payline path forms a string of related symbols.

12. A method of operating a gaming system, said method comprising:

(1) receiving, via an acceptor, a first physical item associated with a first monetary value;

(2) identifying, via a validator, the received first physical item;

(3) causing at least one processor to execute a plurality of instructions stored in at least one memory device to establish a credit balance based at least in part on the first monetary value associated with the received first physical item;

(4) if a wager input is received via a wager button, causing the at least one processor to execute the plurality of instructions to place a wager on a play of a game, the wager being deductable from the credit balance, the game being associated with:

(a) a plurality of symbols, a plurality of the symbols each being associated with one of a set of a plurality of different first characteristics and one of a set of a plurality of different second characteristics, the symbols being displayable at a plurality of symbol display areas; and (b) a plurality of different paylines, each of the paylines being associated with a different payline path extending along a plurality of the symbol display areas;

(5) for said play of the game:

(a) causing the at least one processor to execute the plurality of instructions to operate with the at least one display device to display a plurality of the symbols at the symbol display areas;

(b) for each of at least one of the paylines, causing the at least one processor to execute the plurality of instructions to:

(i) determine if a set of a plurality of the symbols displayed along the payline path associated with said payline forms a string of related symbols, wherein:

(A) the set of the symbols displayed along the payline path associated with said payline forms a string of related symbols: (1) when, for each displayed symbol of the set, said displayed symbol is related to at least one other symbol of the set displayed adjacent to said displayed symbol; and (2) regardless of whether any displayed symbol of the set is related to any other symbol of the set not displayed adjacent to said displayed symbol; and (B) two symbols are related if those two symbols share at least one of: (1) a same one of the set of first characteristics, and (2) a same one of the set of second characteristics; and (ii) if the set of the displayed symbols forms a string of related symbols, determine any awards based on a quantity of symbols in said string;

(c) causing the at least one processor to execute the plurality of instructions to operate with the at least one display device to display any determined awards; and (d) causing the at least one processor to execute the plurality of instructions to modify the credit balance based on any determined awards; and (6) if an actuation of a cashout button is received, causing the at least one processor to execute the plurality of instructions to initiate a payout based on the credit balance.

13. The method of claim 12, wherein the plurality of symbols includes a skip symbol associated with at least one of: (a) one of the set of first characteristics, and (b) one of the set of second characteristics.

14. The method of claim 13, which includes causing the at least one processor to execute the plurality of instructions to, for each of at least one of the paylines, if a set of a plurality of the symbols displayed along the payline path associated with said payline forms a string of related symbols including the skip symbol, not include said skip symbol when determining the quantity of symbols in said string.

15. The method of claim 13, which includes causing the at least one processor to execute the plurality of instructions to, for each of at least one of the paylines, if the skip symbol is displayed along the payline path associated with said payline, not evaluate one of the symbols displayed along the payline path associated with said payline when determining whether a set of the symbols displayed along the payline path associated with said payline forms a string of related symbols.

16. The method of claim 12, wherein the plurality of symbols includes a wild symbol associated with each of the first set of characteristics and each of the second set of characteristics.

17. The method of claim 12, wherein the plurality of symbols includes a draw symbol associated with a draw count value and at least one of: (a) one of the set of first characteristics, and (b) one of the set of second characteristics.

18. The method of claim 17, which includes causing the at least one processor to execute the plurality of instructions to, for each of at least one of the paylines, if a set of a plurality of the symbols displayed along the payline path associated with said payline forms a string of related symbols including the draw symbol, determine any awards based on a sum of the draw count value associated with the draw symbol and the quantity of symbols in said string.

19. The method of claim 17, which includes causing the at least one processor to execute the plurality of instructions to operate with the at least one display device to, for each of at least one of the paylines, if a set of a plurality of the symbols displayed along the payline path associated with said payline forms a string of related symbols including the draw symbol, display a quantity of symbols equal to the draw count value associated with the draw symbol to the payline path associated with said payline.

20. The method of claim 12, wherein the plurality of symbols includes a wild/draw symbol associated with a draw count value, each of the first set of characteristics, and each of the second set of characteristics.

21. The method of claim 12, wherein the plurality of symbols includes a reflector symbol associated with at least one of: (a) one of the set of first characteristics, and (b) one of the set of second characteristics.

22. The method of claim 21, which includes causing the at least one processor to execute the plurality of instructions to, for each of at least one of the paylines, if the reflector symbol is displayed along the payline path associated with said payline:

(a) determine a reflected payline path associated with said payline, wherein the reflected payline path extends along that payline path to the displayed reflector symbol and back along that payline path; and (b) determine whether a set of the symbols displayed along that reflected payline path forms a string of related symbols.

23. The method of claim 12, which is provided through a data network.

24. The method of claim 23, wherein the data network is an internet.

25. A non-transitory computer readable medium storing a plurality of instructions which, when executed by at least one processor, cause the at least one processor to:

(a) after receipt, via an acceptor, of a first physical item associated with a first monetary value and identification, via a validator, of the received first physical item, establish a credit balance based at least in part on the first monetary value associated with the received first physical item;

(b) if a wager input is received via a wager button, place a wager on a play of a game, the wager being deductable from the credit balance, the game being associated with:

(i) a plurality of symbols, a plurality of the symbols each being associated with one of a set of a plurality of different first characteristics and one of a set of a plurality of different second characteristics, the symbols being displayable at a plurality of symbol display areas; and (ii) a plurality of different paylines, each of the paylines being associated with a different payline path extending along a plurality of the symbol display areas;

(c) for said play of the game:

(i) cause the at least one display device to display a plurality of the symbols at the symbol display areas; and (ii) for each of at least one of the paylines:

(A) determine if a set of a plurality of the symbols displayed along the payline path associated with said payline forms a string of related symbols, wherein:

(1) the set of the symbols displayed along the payline path associated with said payline forms a string of related symbols: (a) when, for each displayed symbol of the set, said displayed symbol is related to at least one other symbol of the set displayed adjacent to said displayed symbol; and (b) regardless of whether any displayed symbol of the set is related to any other symbol of the set not displayed adjacent to said displayed symbol; and (2) two symbols are related if those two symbols share at least one of: (a) a same one of the set of first characteristics, and (b) a same one of the set of second characteristics; and (B) if the set of the displayed symbols forms a string of related symbols, determine any awards based on a quantity of symbols in said string; and (iii) cause the at least one display device to display any determined awards and modify the credit balance based on any determined awards; and (d) if an actuation of a cashout button is received, cause an initiation of a payout associated with the credit balance.

26. The non-transitory computer readable medium of claim 25, wherein the plurality of symbols includes a skip symbol associated with at least one of: (a) one of the set of first characteristics, and (b) one of the set of second characteristics.

27. The non-transitory computer readable medium of claim 26, wherein the plurality of instructions, when executed by the at least one processor, cause the at least one processor to, for each of at least one of the paylines, if a set of a plurality of the symbols displayed along the payline path associated with said payline forms a string of related symbols including the skip symbol, not include said skip symbol when determining the quantity of symbols in said string.

28. The non-transitory computer readable medium of claim 26, wherein the plurality of instructions, when executed by the at least one processor, cause the at least one processor to, for each of at least one of the paylines, if the skip symbol is displayed along the payline path associated with said payline, not evaluate one of the symbols displayed along the payline path associated with said payline when determining whether a set of the symbols displayed along the payline path associated with said payline forms a string of related symbols.

29. The non-transitory computer readable medium of claim 25, wherein the plurality of symbols includes a wild symbol associated with each of the first set of characteristics and each of the second set of characteristics.

30. The non-transitory computer readable medium of claim 25, wherein the plurality of symbols includes a draw symbol associated with a draw count value and at least one of: (a) one of the set of first characteristics, and (b) one of the set of second characteristics.

31. The non-transitory computer readable medium of claim 30, wherein the plurality of instructions, when executed by the at least one processor, cause the at least one processor to, for each of at least one of the paylines, if a set of a plurality of the symbols displayed along the payline path associated with said payline forms a string of related symbols including the draw symbol, determine any awards based on a sum of the draw count value associated with the draw symbol and the quantity of symbols in said string.

32. The non-transitory computer readable medium of claim 30, wherein the plurality of instructions, when executed by the at least one processor, cause the at least one processor to, for each of at least one of the paylines, if a set of a plurality of the symbols displayed along the payline path associated with said payline forms a string of related symbols including the draw symbol, cause the at least one display device to display a quantity of symbols equal to the draw count value associated with the draw symbol to the payline path associated with said payline.

33. The non-transitory computer readable medium of claim 25, wherein the plurality of symbols includes a wild/draw symbol associated with a draw count value, each of the first set of characteristics, and each of the second set of characteristics.

34. The non-transitory computer readable medium of claim 25, wherein the plurality of symbols includes a reflector symbol associated with at least one of: (a) one of the set of first characteristics, and (b) one of the set of second characteristics.

35. The non-transitory computer readable medium of claim 34, wherein the plurality of instructions, when executed by the at least one processor, cause the at least one processor to, for each of at least one of the paylines, if the reflector symbol is displayed along the payline path associated with said payline:

(a) determine a reflected payline path associated with said payline, wherein the reflected payline path extends along that payline path to the displayed reflector symbol and back along that payline path; and (b) determine whether a set of the symbols displayed along that reflected payline path forms a string of related symbols.

* * * * *